(12) United States Patent
Irwin et al.

(10) Patent No.: US 10,281,931 B2
(45) Date of Patent: May 7, 2019

(54) SYSTEM AND METHOD OF CONTROL OF ELECTRONIC PARCEL LOCKERS

(71) Applicant: United States Postal Service, Washington, DC (US)

(72) Inventors: Donald E. Irwin, Fredericksburg, VA (US); Nan K. McKenzie, Garrett Park, MD (US); William A. Tartal, Baltimore, MD (US); Victoria K. Stephen, Burke, VA (US); Michael J. Amato, Reston, VA (US)

(73) Assignee: United States Postal Service, Washington, DC (US)

( * ) Notice: Subject to any disclaimer, the term of this patent is extended or adjusted under 35 U.S.C. 154(b) by 27 days.

(21) Appl. No.: 15/638,244

(22) Filed: Jun. 29, 2017

(65) Prior Publication Data
US 2017/0300069 A1    Oct. 19, 2017

Related U.S. Application Data

(63) Continuation of application No. 13/706,281, filed on Dec. 5, 2012, now Pat. No. 9,733,647.

(Continued)

(51) Int. Cl.
| | |
|---|---|
| G05B 19/00 | (2006.01) |
| G05D 3/00 | (2006.01) |
| B65G 1/04 | (2006.01) |
| G06F 17/00 | (2019.01) |
| G07F 7/08 | (2006.01) |
| G07F 17/10 | (2006.01) |
| G07F 17/12 | (2006.01) |
| G06Q 10/08 | (2012.01) |

(52) U.S. Cl.
CPC ............. *G05D 3/00* (2013.01); *B65G 1/0485* (2013.01); *G06F 17/00* (2013.01); *G06Q 10/0836* (2013.01); *G07F 7/08* (2013.01); *G07F 17/10* (2013.01); *G07F 17/12* (2013.01)

(58) Field of Classification Search
CPC ............ G07C 9/00896; G07C 9/00912; G07C 9/00571; G07C 9/00309; G07C 9/00103
USPC ............................................... 340/5.61–5.73
See application file for complete search history.

(56) References Cited

U.S. PATENT DOCUMENTS

| | | | |
|---|---|---|---|
| 4,826,115 A | 5/1989 | Novitski | |
| 4,978,145 A | 12/1990 | Mikhail | |

(Continued)

FOREIGN PATENT DOCUMENTS

| | | |
|---|---|---|
| AU | 2008/264216 A1 | 1/2009 |
| AU | 2011/224030 | 10/2011 |

(Continued)

*Primary Examiner* — Joseph H Feild
*Assistant Examiner* — Sharmin Akhter
(74) *Attorney, Agent, or Firm* — Knobbe Martens Olson & Bear LLP

(57) ABSTRACT

A system, apparatus, and method for use in delivery of items to a storage unit. The storage unit can include one or several storage receptacles and a control unit that controls and monitors the status of the one or several storage receptacles. The storage unit may be included in a storage unit system that can include one or several storage units and a central control unit. The central control unit can communicate with the one or several storage units, and can receive status and availability updates from the one or several storage units.

19 Claims, 32 Drawing Sheets

Related U.S. Application Data

(60) Provisional application No. 61/567,048, filed on Dec. 5, 2011.

(56) References Cited

U.S. PATENT DOCUMENTS

| | | | |
|---|---|---|---|
| 5,385,265 | A | 1/1995 | Lafreniere |
| 6,010,064 | A | 1/2000 | Umeda et al. |
| 6,845,909 | B2 | 1/2005 | Bong et al. |
| 7,068,149 | B2 | 6/2006 | Lee et al. |
| 7,133,743 | B2 | 11/2006 | Tilles et al. |
| 7,337,944 | B2 | 3/2008 | Devar |
| 2002/0035515 | A1 | 3/2002 | Moreno |
| 2002/0080030 | A1 | 6/2002 | Inomata |
| 2002/0147525 | A1 | 10/2002 | Cayne et al. |
| 2003/0025590 | A1 | 2/2003 | Gokcebay et al. |
| 2003/0101143 | A1 | 5/2003 | Montgomery et al. |
| 2004/0199284 | A1* | 10/2004 | Hara ............... G07C 9/00103 700/215 |
| 2005/0040932 | A1 | 2/2005 | Cayne et al. |
| 2005/0067486 | A1 | 3/2005 | Sansone et al. |
| 2005/0068178 | A1 | 3/2005 | Lee et al. |
| 2005/0075989 | A1 | 4/2005 | Biasi et al. |
| 2005/0083176 | A1 | 4/2005 | Yamada |
| 2005/0179349 | A1 | 8/2005 | Booth et al. |
| 2006/0020366 | A1 | 1/2006 | Bloom |
| 2006/0138912 | A1 | 6/2006 | Chen et al. |
| 2006/0152339 | A1 | 7/2006 | Mercier et al. |
| 2007/0221595 | A1 | 9/2007 | Chen |
| 2008/0128444 | A1 | 6/2008 | Schininger et al. |
| 2010/0223127 | A1 | 9/2010 | Bettez et al. |
| 2010/0282840 | A1 | 11/2010 | Henry |
| 2010/0332284 | A1 | 12/2010 | Hilbush et al. |
| 2012/0062362 | A1 | 3/2012 | Rudduck et al. |
| 2012/0089530 | A1 | 4/2012 | Klingenberg et al. |
| 2012/0326840 | A1 | 12/2012 | Frankenberg et al. |
| 2013/0119129 | A1 | 5/2013 | Amdahl et al. |

FOREIGN PATENT DOCUMENTS

| | | |
|---|---|---|
| BE | 680625 A | 10/1966 |
| CN | 1653477 A | 8/2005 |
| CN | 101789966 A | 7/2010 |
| CN | 101814215 A | 8/2010 |
| DE | 2506564 | 8/1976 |
| DE | 199 16 363 A1 | 10/2000 |
| DE | 10 2006 047797 A1 | 4/2008 |
| EP | 1 921 586 A1 | 5/2008 |
| JP | 2002 189797 A | 7/2002 |
| JP | 2007 130225 A | 5/2007 |
| WO | WO 02/07119 A1 | 1/2002 |
| WO | WO 02/074634 A2 | 9/2002 |
| WO | WO 01/31827 A2 | 4/2008 |
| WO | WO 2009/047780 A2 | 4/2009 |

\* cited by examiner

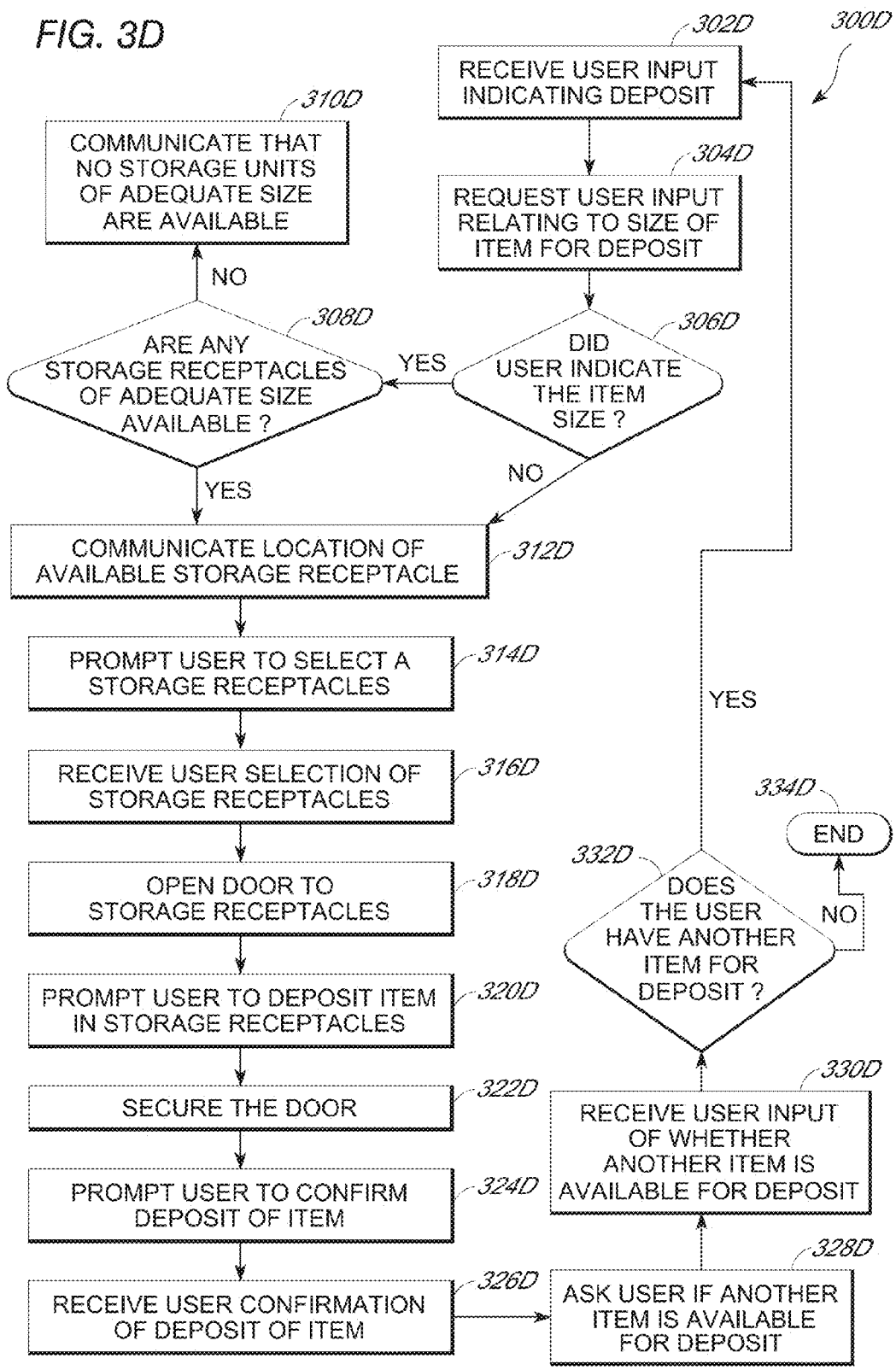

SYSTEM AND METHOD OF CONTROL OF ELECTRONIC PARCEL LOCKERS

CROSS REFERENCE TO RELATED APPLICATIONS

This application is a continuation of U.S. application Ser. No. 13/706,281, filed Dec. 5, 2012, now U.S. Pat. No. 9,733,647, which claims priority to U.S. Provisional Application 61/567,048, filed Dec. 5, 2011, the entire contents of which are herein incorporated by reference. This application is related to U.S. application Ser. Nos. 13/706,255 and 13/706,234, entitled "System and Method of Coordinating Electronic Parcel Locker Availability," and "System and Method of Controlling Item Delivery to an Electronic Parcel Locker," having U.S. Pat. Nos. 9,052,992 and 9,223,315 respectively. This application is related to U.S. Provisional Application No. 61/733,657, entitled "A Lock Mechanism for Securing a Lockable Volume," the entire contents of which are herein incorporated by reference. This application is related to U.S. application Ser. No. 15/638,198, filed, Jun. 29, 2017, now U.S. Pat. No. 9,958,877 entitled "System and Method of Control of Electronic Parcel Lockers," filed concurrently herewith. Any and all applications for which a foreign or domestic priority claim is identified in the Application Data Sheet as filed with the present application are hereby incorporated by reference under 37 CFR 1.57.

BACKGROUND

Field of the Development

This disclosure relates to the field of the transportation, delivery, and/or receipt of one or several items and the field of communication, tracking, and control of the transportation, delivery, and/or receipt of one or several items.

SUMMARY

Some embodiments described herein include a system for selectively receiving, storing, and dispensing one or more items, the system comprising a first receptacle comprising a securement feature a second receptacle comprising a securement feature; and a control unit comprising a storage device comprising stored instructions which, when executed, cause a processor to provide and deny access to the receptacles, and to track the availability of each of the receptacles, wherein an identifier indicative of the availability of the receptacles is stored in the storage element when the receptacle does not contain an item, and wherein an identifier indicative of the unavailability of the receptacles is stored in the storage element when the receptacle contains an item.

In some embodiments, the first receptacle further comprises a feature indicating when the first receptacle is unlocked.

In some embodiments, the feature indicating when the first receptacle is unlocked comprises a light.

In some embodiments, the securement features are controlled by the control unit and access to one of the receptacles is granted to deposit an item or to remove a deposited item.

In some embodiments, access to one of the receptacles is granted in response to providing verification to the control unit of user age or user identity.

In some embodiments, access to one of the receptacles to remove a deposited item is granted in response to receipt of item identification information and user identification information matching the item identification information and user identification information associated with the item.

In some embodiments, the control unit is configured receive dimensions of an item to be deposited and configured to determine which of the receptacles having a size sufficient to receive the item to be deposited is available, and granting access to the receptacle having a size sufficient to receive the item to be deposited.

In some embodiments, the first receptacle and the second receptacle are of different types or sizes, and the control unit is configured to receive input of a user preference as to type or size of the receptacle, and to provide access to the available receptacle matching the user's preferences.

In some embodiments, the system further comprises a database containing user information accessible by the control unit, wherein the control unit is configured to select the receptacle which corresponds to the user information.

Some embodiments described herein include a method of operating a storage unit comprising a plurality of receptacles and a control unit, the method comprising receiving a user input at the control unit of the storage unit; querying a database for a receptacle corresponding to the user input; displaying the location of a receptacle; receiving a user input selecting the indicated receptacle; unlocking the selected receptacle; receiving confirmation that the user has completed a transaction; and locking the receptacle following completion of the transaction.

In some embodiments, the user instruction comprises a request for retrieval of an item that is located in one of the receptacles.

In some embodiments, the storage unit displays the location of the receptacle containing the item.

In some embodiments, the user instruction comprises a request for depositing an item in one of the receptacles.

In some embodiments, the method further comprises requesting size information of the item.

In some embodiments, the method further comprises determining if one of the receptacles is available for receiving the item and displaying the location of at least one available receptacle.

In some embodiments, the method further comprises receiving user or item identification information.

In some embodiments, the user or item identification information is received via a scanner.

In some embodiments, the method further comprises receiving proof of postage purchase.

In some embodiments, the method further comprises printing postage.

Some embodiments described herein include a system for selectively receiving, storing, and dispensing one or more items, the system comprising a plurality of receptacles each configured to receive at least one item means for selectively controlling access to each of the plurality of receptacles in response to a user input; means for indicating which of the plurality of receptacles corresponding to the user input is available; and means for confirming whether an item has been deposited in or removed from one of the plurality of receptacles.

Some embodiments disclosed herein include a method of depositing an item comprising, issuing an item identification code configured to be read by a control unit which controls access to a plurality of receptacles, the item identification code associated to an item parameter, the item identification code and the item parameter being stored in a database; receiving the item identification code at the control unit; requesting user identification to initiate a deposit transaction; receiving user identification in the form of an electronic signature; receiving the identity of the intended recipient for the item; determining which of the plurality of receptacles is available to receive the item,; determining which of the available receptacles is configured to receive the item, based on the received item identification code and the associated item parameter; indicating which of the plurality of receptacles is available and is configured to receive the item; receiving user input selecting one of the indicated receptacles; generating and sending a control signal to a lock on the user selected receptacle thereby unlocking the user selected receptacle; receiving the item in the user selected receptacle; requesting deposit confirmation at the control unit; receiving deposit confirmation at the control unit; generating and sending a control signal to the lock on the selected receptacle in response to the receipt of the deposit confirmation, thereby locking the selected receptacle; and issuing a receipt documenting the deposit transaction.

In some embodiments, determining which of the plurality of receptacles is available to receive the item comprises the control unit querying a receptacle availability database.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
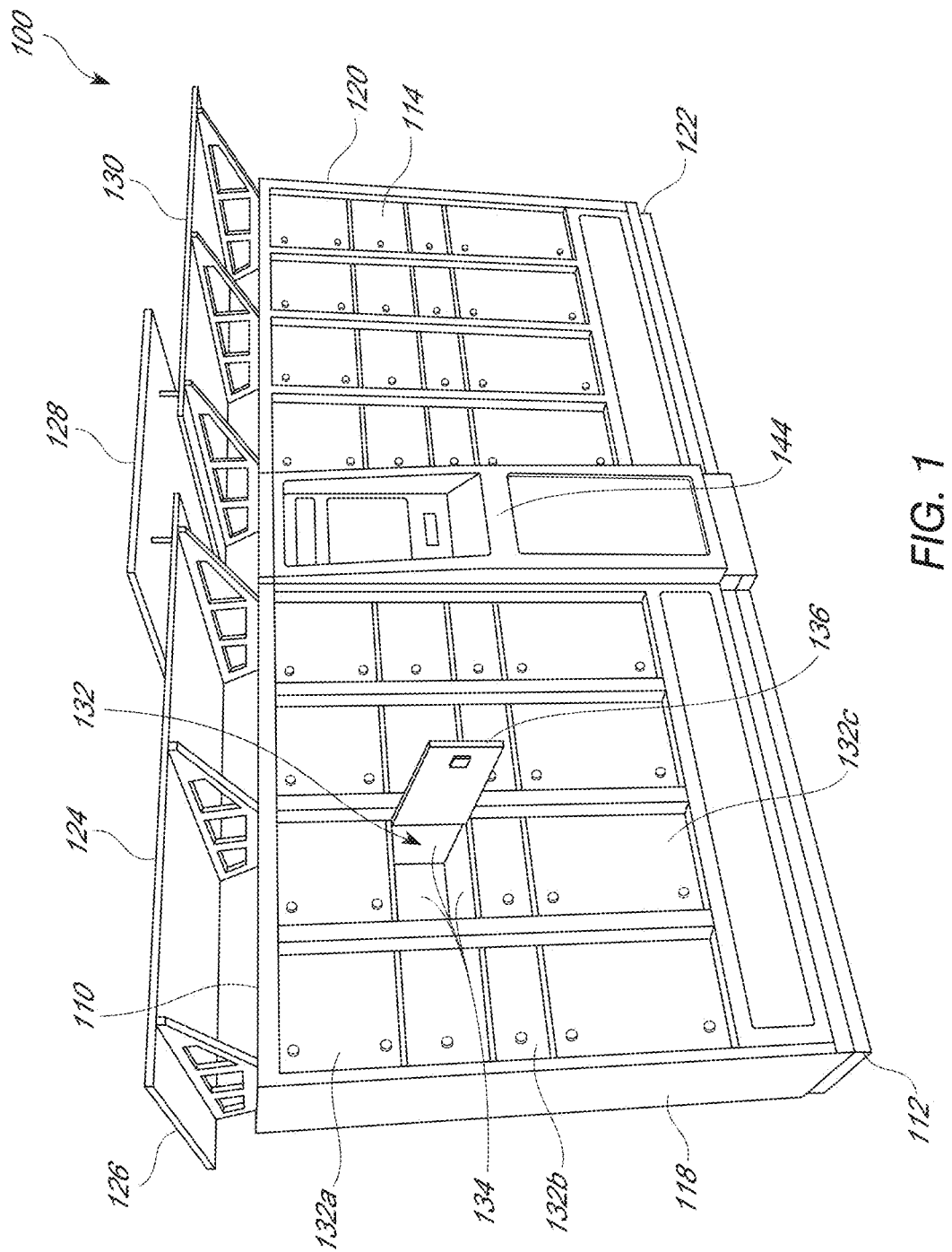
FIG. 1 depicts a perspective view of one embodiment of a storage unit.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, may be arranged, substituted, combined, and designed in a wide variety of different configurations, all of which are explicitly contemplated and make part of this disclosure.

Some embodiments disclosed herein relate generally to a storage unit configured for use in item distribution. The storage unit may be an electronic parcel locker which acts as a parcel exchange point where customers send paid parcels or retrieve delivered parcels from electronic parcel lockers located in convenient locations. The customers may be customers who have registered to use the storage unit system, or may be guest users who perform one or more discrete transactions without registration. In some embodiments, the storage unit includes, for example, a plurality of storage receptacles. In some embodiments, access to the storage receptacles of the storage unit is controlled by a control unit. The control unit, in some embodiments, is configured to communicate information to, and receive inputs from a user, which may be a customer or an agent, and may, in response to those inputs, provide user access to one or more of the storage receptacles. In some embodiments, the control unit of the storage receptacle may be further configured to allow the creation of labeling for placement on an item. This may include, for example, creation of identification labeling, mailing labeling, such as, for example, destination and/or return address, postage, or any other desired labeling.

Some embodiments disclosed herein relate to an item delivery system that includes a plurality of storage units. In some embodiments, the plurality of storage units each communicate with a central control unit. These communications relate to, for example, the availability of storage receptacles at each of the storage units. In some embodiments, the control unit uses this information relating to the availability of storage receptacles to direct the flow of items to thereby maximize usage of the storage receptacles. A person of skill in the art, having the instant specification, will appreciate that a storage unit, and a delivery system disclosed herein may be used with diverse items and in diverse ways.

Storage Unit

As used herein, the term storage unit denotes a place which facilitates pick-up and drop-off of items. In some embodiments, the storage unit is intended to provide a location for short term storage of an item after an item is dropped off or while the item is waiting to be picked up or received by an agent or customer.

FIG. 1 depicts one embodiment of a storage unit 100. As depicted in FIG. 1, a storage unit has a top 110, a bottom 112, a front 114, a back (not shown), a first end 118, and a second end 120.

Some embodiments of a storage unit 100 include features to facilitate placement of the storage unit 100 and protection of the storage unit 100 from the elements. In some embodiments, the storage unit 100 comprises a base 122. The base 122 is located at the bottom 112 of the storage unit 100. In some embodiments, the base 122 is configured for securing the storage unit 100 to a placement location, and is constructed of steel, concrete, aluminum, metal, a synthetic material, a natural material, or any other desired material. In some embodiments, the base 122 may include features for securement, such as, for example, screws, bolts, nuts, clips, hooks, or any other desired securement feature. These features may include any features capable of securing the storage unit 100 to the location at which the storage unit 100 is placed. In some embodiments, the base 122 is integrally formed as a non-removable portion of the storage unit 100, and provides a foundation or support for the storage unit as the storage unit 100 is installed or located at a site.

In some embodiments, the base 122 comprises an elevated base. An elevated base is configured to elevate the storage unit 100 above the surrounding ground level to thereby protect the storage unit 100 and the contents of the storage unit 100. In some embodiments, the elevated base is sized to prevent water from entering the storage unit 100. Specifically, the elevated base is sized to prevent water from precipitation, such as, from rain, or snow, from entering the storage unit 100, as well as to prevent any other liquids from flowing into or from entering into the storage unit 100.

As depicted in FIG. 1, some embodiments of the storage unit 100 include a roof 124. The roof 124 is positioned above the top 110 of the storage unit 100. The roof 124 is sized to cover some or all of the top 110 of the storage unit 100. In some embodiments, the roof 124 is sized so that the roof 124 covers a larger area than that occupied by the storage unit 100.

The roof 124 may be made of a variety of materials, including, for example, metal, man-made materials, natural materials, or any other desired material. The roof 124 may comprise a variety of shapes. In some embodiments, the roof 124 may comprise one or several substantially planar surfaces, rounded or curved surfaces, or surfaces having any other desired shape. The roof 124 may be positioned in any desired angular position relative to the top 110 of the storage unit 100. In some embodiments, the roof 124 is positioned parallel to the top 110 of the storage unit 100, or the roof is positioned non-parallel to the top 110 of the storage unit 100. In some embodiments, when the roof comprises a plurality of pieces, some pieces of the roof may be positioned parallel to the top 110 of the storage unit 100, and some pieces of the roof 124 is positioned non-parallel to the top 110 of the storage unit 100. The roof 124 as depicted in FIG. 1 comprises three substantially planar pieces angularly positioned relative to the top 110 of the storage unit 100, a first substantially planar piece 126, a second substantially planar piece 128, and a third substantially planar piece 130. As depicted in FIG. 1, a plurality of planar pieces are arranged so as to allow complete coverage of the top 110 of the storage unit 100.

The storage unit 100 may comprise one or several receptacle units each comprising a plurality of storage receptacles 132. Each storage receptacle 132 comprises a plurality of sides 134 and a door 136. The combination of the sides 134 and the door 136 defines a receiving volume configured to receive and hold a deposited item.

The storage receptacles 132 may comprise a variety of shapes and sizes. In some embodiments, the storage unit 100 comprises a plurality of storage receptacles 132 of different sizes. Thus, as depicted in FIG. 1, the storage unit 100 includes a first storage receptacle 132a, a second storage receptacle 132b that is smaller than the first storage receptacle 132a, and a third storage receptacle 132c that is larger than the first storage receptacle 132a.

Figure 1A:
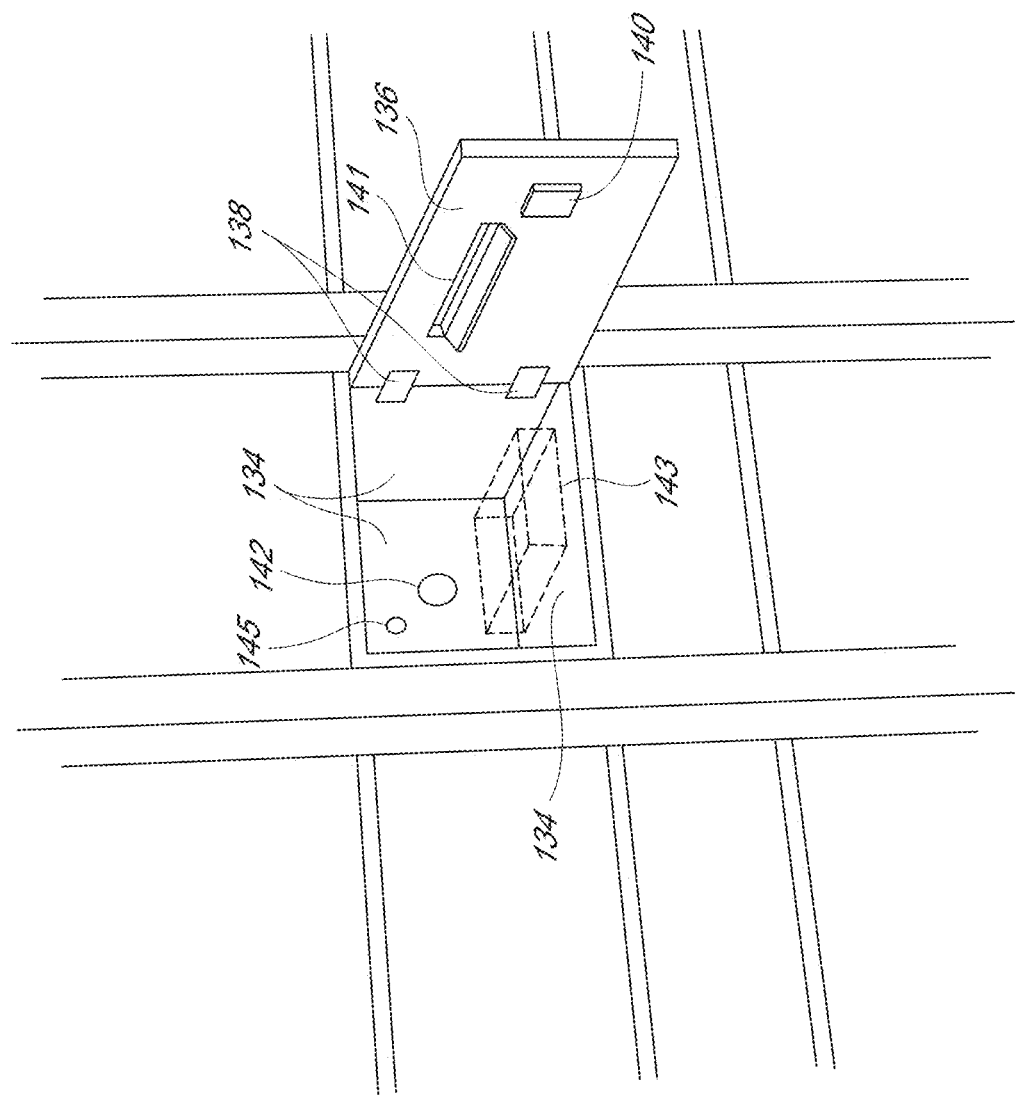
FIG. 1A depicts a perspective view of one embodiment of a storage receptacle.

In some embodiments, the door 136 of the storage receptacle 132 is dynamically connected to the storage unit 100. In some embodiments, the door 136 of the storage receptacle 132 is dynamically connected to the storage unit 100 so as to allow rotation of the door 136 relative to the storage unit 100, so as to allow sliding movement of the door 136 relative to the storage unit 100, or to allow any other desired movement of the door 136 relative to the storage unit 100. As depicted in FIG. 1A, in one embodiment, the door 136 of the storage receptacle 132 is rotationally connected to one of the walls 134 of the storage receptacle 132. In one specific embodiment, the door 136 of the storage receptacle 132 is rotationally connected to one of the walls 134 of the storage receptacle 132 via one or more hinges 138. As depicted in FIG. 1A, the connection of the door 136 to one of the walls of the storage receptacle 134 allow rotational displacement of the door 136 relative to the storage receptacle 134 and the storage unit 100.

In some embodiments, the storage receptacle 132 includes features configured to secure the door 136 of the storage receptacle. These features may include, for example, a lock, a latch, or any other securement feature. In some embodiments, the lock is one of a mechanical lock, an electrical lock, and magnetic lock, or any other type of lock.

The securement feature may interact with cooperating structures to secure the door 136. The securement feature may be located in any desired position on the storage receptacle. FIG. 1A shows one embodiment of a location of a securement feature 140 on the door 136 of the storage receptacle 132. As depicted in FIG. 1A, the securement feature 140 located on the door 136 of the storage receptacle 132 cooperates with features of the walls 134 of the storage receptacle 132 to secure the door. In some embodiments, the securement feature 140 may comprise a purpose built securement feature. In some embodiments, the securement feature may comprise a latching feature and a latch engagement and disengagement feature. The latching feature may be configured to obstruct movement of a locked item. In the case of a storage receptacle 132, the latch lockingly engages the door 136 of the storage receptacle 132 and obstructs movement of the door 136. In some embodiments, the latch engagement and disengagement feature may comprise components and/or a mechanism interacting together to selectively allow the engagement and/or disengagement of the latch. In some embodiments, the latch engagement and disengagement feature is a rotatable cylinder of a lock. In some embodiments, the latch engagement and disengagement feature may comprise an electrical actuator connected to the latch. A person of skill in the art will recognize that the present disclosure is not limited to any specific form of locking or any specific locking mechanism, but broadly encompasses any lock or form of locking used in connection with the storage unit.

In some embodiments, the securement feature is configured for remote operation. Specifically, in some embodiments, the securement feature 140 is controllable in response to received signals, such as, for example, electric, light, optical, radio, or any other signal. The received signals may come from a control unit including a controller as will be further described in more detail below. In some embodiments, for example, the securement feature 140 is controllably disengaged so as to allow access to the securement receptacle 132.

In some embodiments, the storage receptacles 132 may be configured with features to expedite recognition of an accessible storage receptacle 132. Thus, in some embodiments, the storage receptacle 132 may comprise one or several receptacle designating features that facilitate recognition of which of the several storage receptacles is accessible. In some embodiments, these receptacle features may include, for example, a feature configured to open the door 136 of the storage receptacle when the securement feature of the storage receptacle is disengaged such as, for example, a spring, a motor, or any other feature, a designator, such as, for example, a light, or any other desired feature.

In some embodiments, a storage receptacle includes a light 142. This light 142 may be any desired type of light emitting object, such as, for example, a light bulb, a LED, or any other light emitting object. In some embodiments, the operation of the light 142 changes based on the accessibility of any of the storage receptacles 132. Thus, if the light 142 is normally on, the light 142 may be turned off to indicate that the storage receptacle 132 is accessible. Similarly, if the light 142 light 142 is normally turned off, the light 142 light 142 may be turned on to indicate that the storage receptacle 132 is accessible. Similar techniques may be used with other indicators to designate which, if any, of the storage receptacles 132 are accessible. In some embodiments the light is located, for example, on one of the outside edges of the one of the walls 134 of the storage receptacle 136. In some embodiments, and as depicted in FIG. 1A, the light 142 is located along the outside edge of the wall 134 opposite the wall to which the hinges 138 are attached.

Figure 1B:
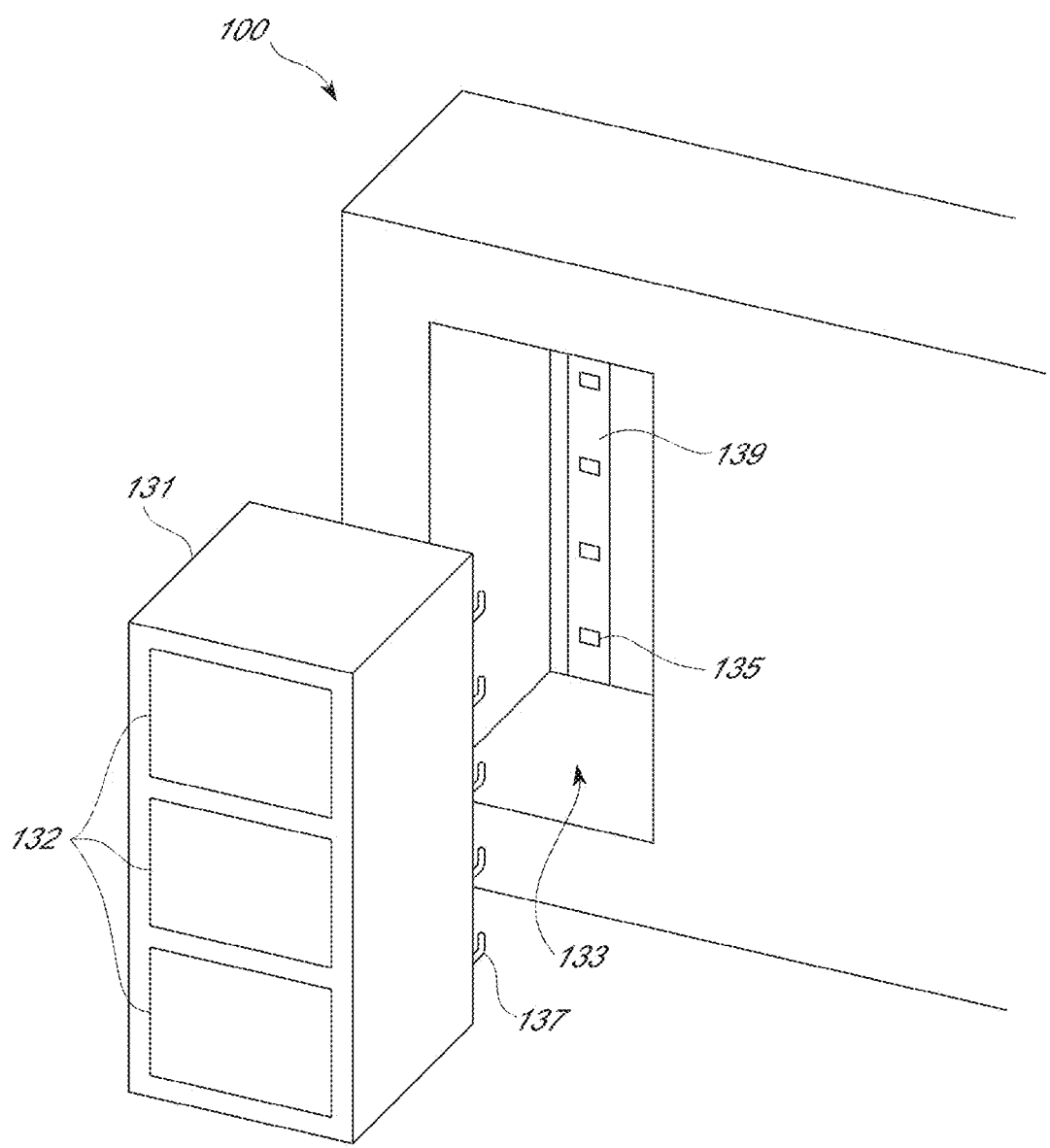
FIG. 1B depicts a perspective view of one embodiment of An interchangeable storage receptacle module with individual storage receptacles, and a module receiving area.

In some embodiments, light 142 may be disposed in the interior of storage receptacle 132. light 142. The light 142 is mounted on or within one of the walls 134 or the door 136 of the storage receptacle 132. As depicted in FIG. 1B, the light 142 is mounted on the wall 134 opposite the door 136 of the storage receptacle 132. The light 142 is configured for lighting when the storage receptacle 132 is accessible, and/or, when the door 136 of the storage receptacle 132 is opened, thereby linking the operation of the light 142 to the position of the door. Advantageously, the linking between the light 142 and the door 136 of the storage receptacle 132 allows lighting of the receiving area of the storage receptacle 132 when the door 136 of the storage receptacle 132 is opened, and thereby facilitate a user's ability to see the contents of the storage receptacle 132 when they are accessing the storage receptacle 132. In some embodiments, the light 142 may be used in connection with other features to allow easy identification of an accessible storage receptacle 132. Thus, in some embodiments, the light 142 is visible to a user when the storage receptacle is accessible.

In some embodiments the light 142 is disposed on an outer surface the door 136, such that the light 142 is visible to a user standing in front of the storage unit 100. In some embodiments, the light is a receptacle designating feature. The light 142 may indicate which of the storage receptacles 132 is available or is activated for use. The light 142

In some embodiments the storage receptacle 132 further includes, a feature configured to detect the position of the door 136, such as, for example, whether the door 136 is open or closed. In some embodiments, the door position detection feature comprises, for example, a sensor, a switch, or any other feature capable of detecting if the door 136 is open. In some embodiments, the door position detection feature is integrated into another feature of the storage receptacle, such as, for example, the securement feature 140, or a switch associated with the light 142.

The storage receptacle 132 further includes features configured to detect the presence or absence of an item within the receiving area of the storage receptacle 132. In some embodiments, the item detection feature configured to detect the presence or absence of an item within the receiving area of the storage receptacle 132 comprises, for example, a sensor 145. The sensor 145 may be a camera, or any other feature possessing the desired capabilities. The sensor 145 may be located on one of the walls 134 or on the door 136. In one embodiment, for example, the sensor comprises for example, a load cell or a strain gauge configured to sense when a load is applied to the storage receptacle 132.

In some embodiments, the storage receptacle 132 may be configured to maintain climatic conditions within the storage receptacle 132. Specifically, in some embodiments, the storage receptacle may be configured to allow maintenance of a temperature and relative humidity level that are different than the levels of the area in which the storage unit 100 containing the storage receptacle 132 is placed. In some such embodiments, the storage receptacle 132 may be climate controlled by connection to an HVAC system and/or air humidifier to facilitate the maintenance of desired climate conditions within the storage receptacle 132. Additionally, in some embodiments, the storage receptacle 132 is sealed and/or insulted to facilitate the maintenance of desired climatic conditions within the storage receptacle 132.

In some embodiments, the storage unit 100 is configured for collection of items deposited by a customer for delivery. In some embodiments, these features may include, for example, a storage receptacle 132 comprising a mail slot 141, disposed in the door 136, to allow collection of envelopes, postcards, flats, or any other thin item. In some embodiments, these features may comprise a storage receptacle associated with a collection bin 143. The collection bin 143 may be located inside the storage receptacle such that items placed in the storage receptacle 132 are deposited in the collection bin.

In some embodiments, a storage receptacle module is modularly installed into a storage unit 100. In some embodiments, a storage receptacle module comprises one or several connected storage receptacles 132. Advantageously, a storage receptacle module may facilitate adaptation of a storage unit 100 to meet a range of customer needs. In some embodiments, for example, a first storage receptacle module may be removed from the storage unit 100 and replaced by a second storage receptacle module having storage receptacles 132 different storage area dimensions. The dimensions of the storage receptacles 132 of the second storage receptacle module may be selected based on customer demand for specific sizes of storage receptacles 132 in a particular storage unit 100 depending on use patterns, specific customer requests, and the location of the storage unit 100.

In some embodiments, the storage sets are configured with features configured for modular use with the storage unit 100. In some embodiments, these features cooperatively interact with features of the storage unit 100 to selectively secure the storage set in the storage unit 100. In one embodiment, and as depicted in FIG. 1B, a storage receptacle module 131 is shown removed from the module receiving area 133 of the storage unit 100. As seen, the storage receptacle module 131 and the module receiving area 133 comprise corresponding shapes and dimensions, such that the storage receptacle module 131 fits within the module receiving area 133. In some embodiments, the storage receptacle module 131 is secured within the module receiving area 133. In some embodiments, the storage receptacle module 131 is secured within the module receiving area 133 through the interaction of features of the storage receptacle module 131 with features of the module receiving area 133.

In some embodiments, and as depicted in FIG. 1B, the storage receptacle module 131 comprises a plurality of features 137 configured to securingly connect to an attachment or connection mechanism 135 of the module receiving area 133. In some embodiments, and as depicted in FIG. 1B, the storage receptacle module features 137 comprises a plurality of hooks attached to the back of the storage receptacle modules 131, configured to engage the attachment or connection mechanism 135 disposed in the module receiving area 133. The first and second set of storage receptacles have the same features 137, such that each storage set, although it may comprise variously sized storage receptacles 132, each fits the standardized installing hardware.

In some embodiments, one or both of the storage receptacle module 131 and the module receiving area 133 comprise features to facilitate engagement between the plurality of features of the storage receptacle module 131 and the plurality of features of the module receiving area 133. The storage receptacle modules 131 may comprise varying types and/or sizes of individual storage receptacles 132. The storage receptacle modules are configured to be interchangeable within storage unit 100. For example, if desired, a storage receptacle module 131 having small storage receptacles 132 may be removed, and interchanged with a storage receptacle module 131 having large storage receptacles 132. To facilitate interchangeability, the varying storage receptacle modules 131 have identical mounting hardware and electrical connections such that each storage receptacle module 131 fits within any module receiving area 133 and provides electrical connection to the control unit 144.

To facilitate interchanging the storage receptacle modules 131, each storage receptacle module 131 has features configured to attach or connect the storage receptacle module 132 with the attachment or connection mechanism 135 disposed within the module receiving area 133. As was indicated above, in some embodiments, as the storage receptacle module 131 is inserted into module receiving area 133, the storage receptacle module features 137 engage with attachment or connection points 135. A slidable plate 139 is attached to a vertical surface within module receiveing area 133, and is vertically displaceable between a first position in which the storage receptacle module features 137 do not securingly engage the module receiving area features 135, and a second position in which the storage receptacle module features 137 do securingly engage the module receiving area features 135 within the module receiving area 133. In one embodiment, the storage receptacle module 131 is installed into the module receiving area 133 when the slidable plate 139 is located in its first position. After installation of the storage receptacle module 131 into the module receiving area 133, the slidable plate 139 is moved into its second position, during which movement, the storage receptacle module features 137 engage with the module receiving area features 135 and secure the storage receptacle module 131 in the module receiving area 133.

In some embodiments, the slidable plate is moved from a first position to a second position, or vice versa, by operating, for example, a screw, a ratchet, a jack, a mechanical lift, a hydraulic lift, a pneumatic lift, or any other mechanism, feature, or system capable of facilitating engagement between the plurality of features 137 on the storage receptacle module 131 and the plurality of features 135 in the module receiving area 133. In one embodiment, and as depicted in FIG. 1B, the module receiving area features 135 are located in a slidable plate 139. The slidable plate 139 is positioned substantially planar with any of the walls of the module receiving area 133. In some embodiments, and as depicted in FIG. 1B, the slidable plate 139 is located on the wall opposite to the open side of the module receiving area 133.

Referring again to FIG. 1, some embodiments of a storage unit 100 further include a control unit 144. As more clearly depicted in FIG. 1C, the control unit 144 includes, for example, a control cabinet 146 including a screen 148, a scanner 150, a printer 152, a payment feature 154, a security camera 155, and a service door 156.

In some embodiments, the control cabinet 146 of the control unit 144 is connected to the plurality of storage receptacles 132 of the storage unit 100. The storage cabinet has a front 158, back 160, top 162, bottom 164, first side (not shown), and second side 165. In some embodiments, the control cabinet 146 is integrally formed with portions of some of the plurality of storage receptacles 132 of the control unit 144. In some embodiments, the first side and the second side 165 of the control cabinet 146 is adjacent to and/or affixed to a plurality of the storage receptacles 132.

The control cabinet 146 may comprise a variety of shapes and sizes, and may be made of a variety of materials. In some embodiments, the control cabinet 146 includes features and is made of materials to protect the contents of the control cabinet 146 from man-made and natural risks. In some embodiments the control cabinet 146 is configured to allow selective access to the contents of the control cabinet 146. In some embodiments, such configuration may advantageously allow the maintenance, repair, and general upkeep of the contents of the control cabinet 146. In some embodiments, access to the control cabinet 146 is provided through, for example, the service door 156.

The service door 156 is configured for movement between a first open position and a second closed position. In some embodiments, the service door 156 is connected with the control cabinet 146 so as to allow movement to and between the first open position and the second closed position. In some embodiments, the dynamic connection of the service door 156 to the control cabinet 146 is achieved, for example, through the use of hinges, clasps, lips, protrusion, engaging members, or a variety of other features. In some embodiments, these features may cooperate with corresponding features on the control cabinet 146 to secure the service door 156.

In some embodiments, the service door 156 further includes one or more locking mechanisms. The locking mechanism is configured to secure the service door 156 when the service door is in its second, closed position. The locking mechanism may comprise a variety of mechanisms, including, for example, a mechanical lock, an electric lock, a magnetic lock, or any other type of locking mechanism. In some embodiments, the lock is controlled via the control unit 144, with a key, or in any other desired fashion.

In some embodiments, the control cabinet 146 includes, for example, a service door 156. The service door 156 is located, for example, on an exposed face of the control cabinet 146. In one embodiment, the service door 156 is located, for example, on the front of the control cabinet 146.

In some embodiments, the front 158 of the control cabinet 146 is openable to reveal the internal components of the control cabinet 146. The front 158 of the control cabinet 146 may be attached to the control cabinet 146 via a hinge or a plurality of hinges, Thus, as the front 158 of the control cabinet 146 opens on the hinge or plurality of hinges, each of the components disposed on the front 158 of the control cabinet 146 moves with the front 158 of the control cabinet 146. In some embodiments, a lock or plurality of locks (not shown) is located on the front 158 of the control cabinet 146 configured to lock and secure the front 158 and prevent unauthorized access into the internal area of the control cabinet 146.

Figure 1C:
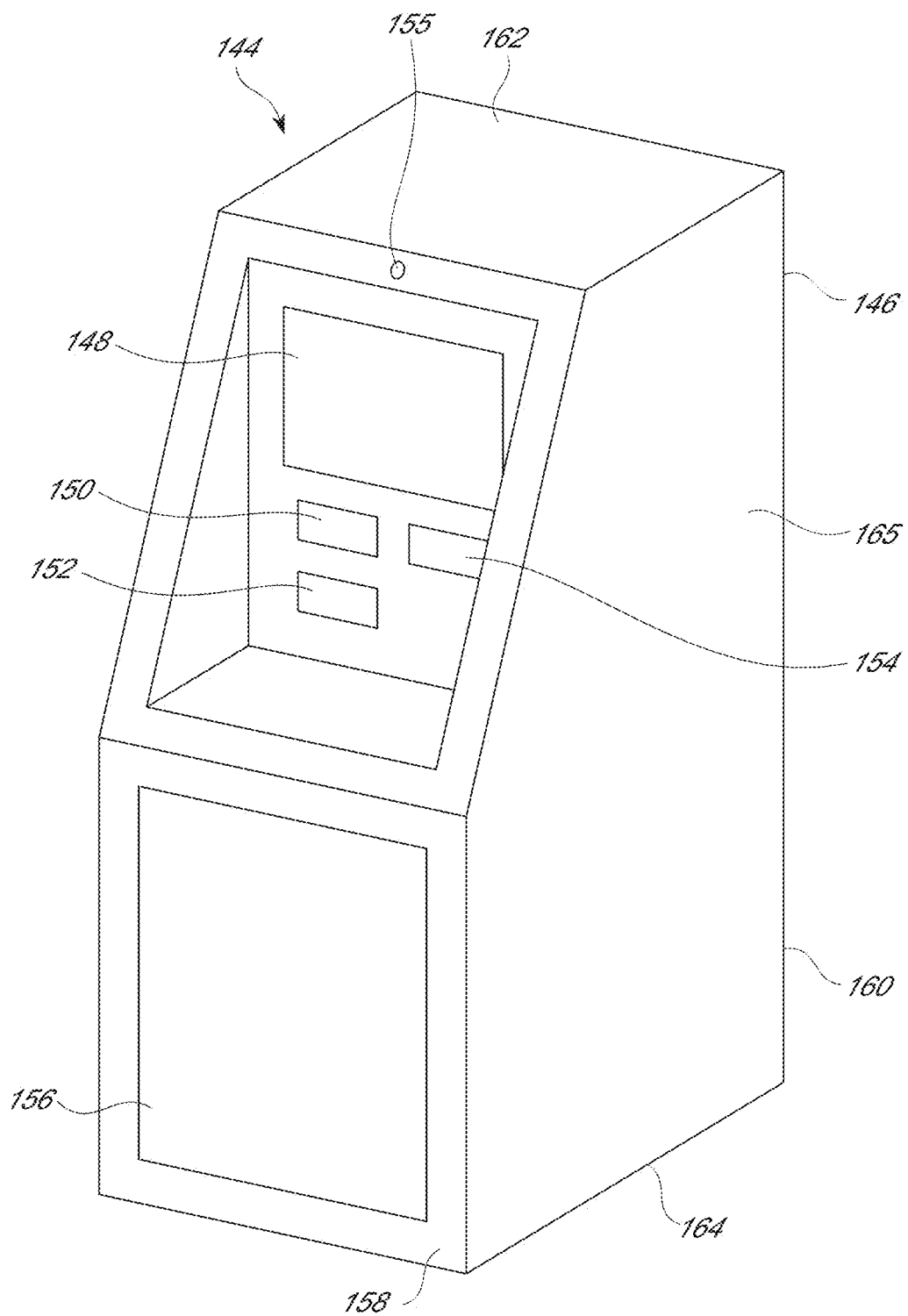
FIG. 1C depicts a perspective view of one embodiment of a control unit.

The control unit 144 depicted in FIG. 1C includes a screen 148. The screen 148 is configured to display information to a user. The screen 148 may comprise a CRT screen, a plasma screen, a LCD screen, or any other desired screen type. In some embodiments the screen 148 is paired with other output features configured to transmit information to a user, such as, for example, a speaker, a display, or any other information transmitting feature. In some embodiments the screen 148 has a touch-screen functionality. In some embodiments, the screen 148 is configured to receive an electronic signature from a user using a signature capture process. In some embodiments, the screen 148 is paired with an input feature configured to allow a user to input information and/or commands to the control unit 144. In some embodiments, the input feature may comprise, for example, a touch-screen, a keypad, a microphone, or any other user input device.

Figure 1D:
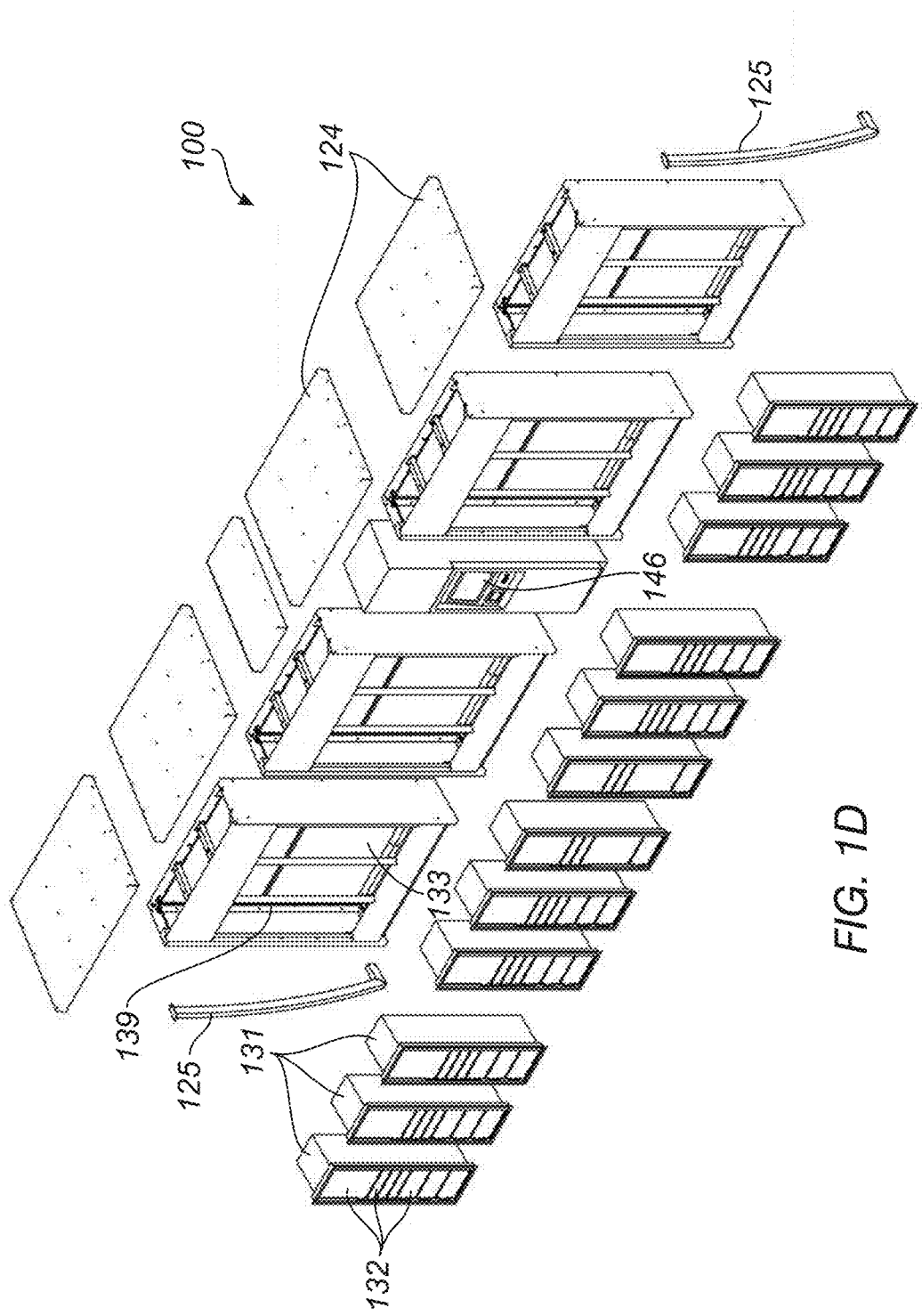
FIG. 1D depicts an exploded view of an embodiment of a storage unit.

Referring now to FIG. 1D, in some embodiments, the roof 124 comprises a plurality of planar pieces attached to the top 110 of storage unit 100, and positioned close together. The roof 124 extends past the vertical plane of the front 114 of the storage unit 100. The roof 124 may comprise an overhang canopy which is resistant to weather. For example, the roof 124 may be constructed of a material which is impervious to water or wind, such that storage unit 100 is not subjected to rain or snow falling onto the roof 124. In some embodiments, roof 124 is supported by legs 125.

In some embodiments, the roof 124 may comprise solar panels configured to generate electricity for storage in a battery or to provide electrical energy to the storage unit 100, or both.

Figure 1E:
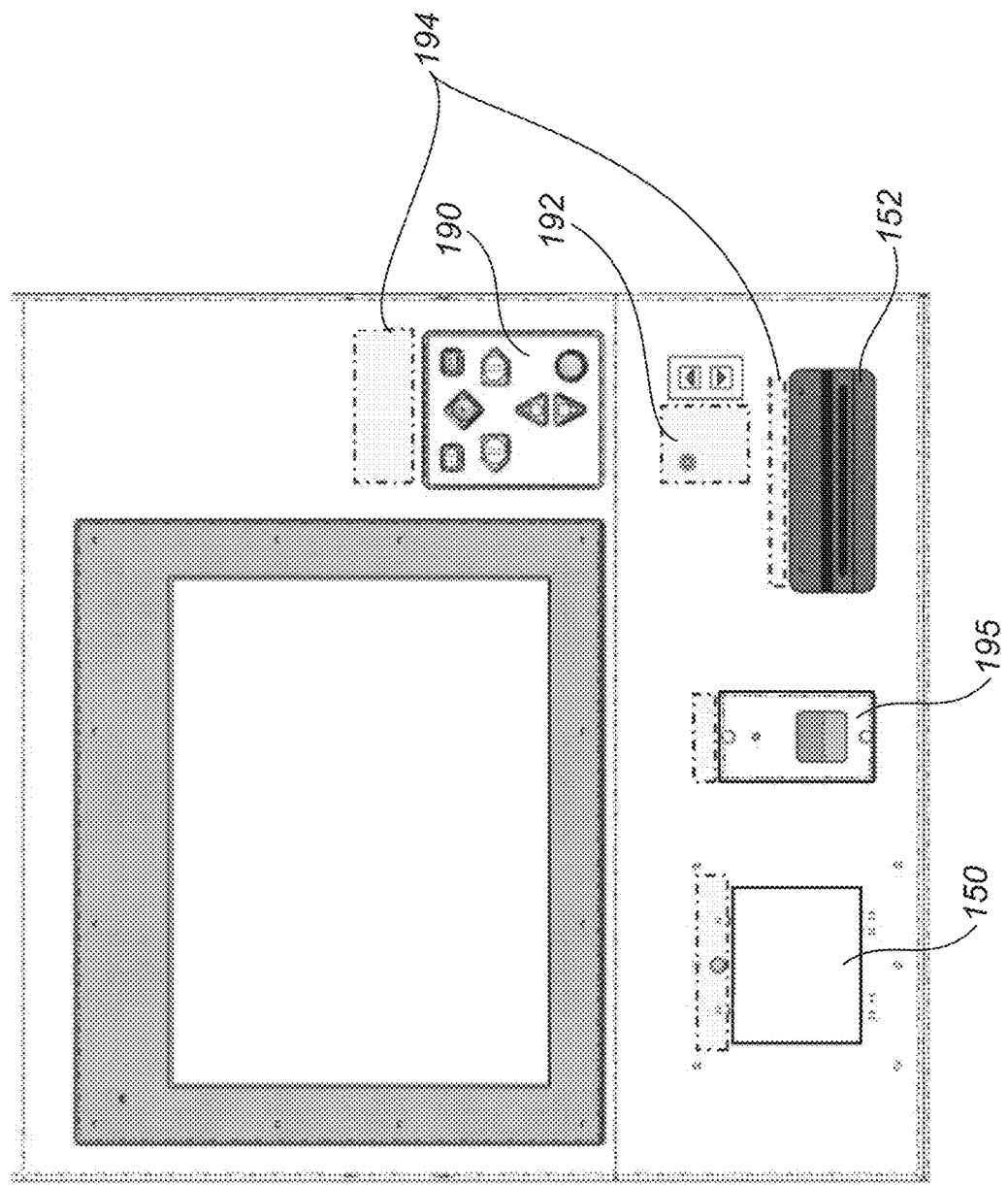
FIG. 1E depicts a front view of an embodiment of a control unit having additional accessibility features.

In some embodiments, and as shown in FIG. 1E, the control cabinet 146 may comprise additional features which increase user accessibility to using control cabinet 146. For example, the control cabinet 146 may comprise an easy access keypad 190, a headset jack for TDD/TTY communication 192, braille labels 194, a near field communication module 195, a printer 152 for printing receipts and/or postage, and an audio system comprising external speakers (not shown). In some embodiments, a receipt is generated for every transaction, which may be emailed or otherwise sent to the customer or user. In some embodiments, a customer or user can elect to receive a receipt, for example following a drop-off or deposit transaction, which may be printed by the printer 152.

The control unit 144 further includes a scanner 150. A scanner 150 may comprise features configured to read a visual identifier including, for example, a text string, a computer readable code such as, for example, a barcode, a 1-D barcode, a 2-D barcode, a QR-code, an RFID tag, or any other desired computer readable code, a biometric identification feature, a color pattern, and image, or any other visual identifier. A scanner may comprise a reader such as, for example, a barcode reader, a pen-type reader, a laser scanner, a CCD reader, a camera based reader, an omni-directional barcode scanner, or any other reader type. The scanner 150 is configured to receive control signals and to transmit signals corresponding to information from the scanned item. In some embodiments, the scanner 150 may comprise a near field communication (NFC) module. In this embodiment, the NFC module facilitates using a mobile device to provide information to the storage unit 100.

The control unit 144 further comprises a printer 152. The printer is configured to print any desired items, including, for example, text strings, images, computer readable codes, or any other desired item. In some embodiments, the printer 152 is configured to print labels, such as, for example, address labels, postage, description labels, computer-readable code labels, or any other desired label. The printer 152 is configured to for printing in response to received control signals. In some embodiments printer 152 may be configured to print receipts. In various steps of the processes described herein, for example, upon payment of postage or insurance on a package, a printed receipt may be generated and provided to the user. A receipt may also be generated with confirmation of pick-up or delivery of an item.

The control unit 144 further comprises a payment feature 154. The payment feature 154 is configured to receive payment from a user. The payment feature may comprise features configured to receive cash from a user, to conduct an electronic transaction with a user, including, for example, credit card, bank card, or any other form of electronic payment, or to conduct any other desired transaction with the user. The payment feature 154 may be configured to receive control signals and to transmit signals relating to the transaction. In some embodiments, the payment feature 154 may comprise a credit card reader such as, for example, the Dynamag Magnetic Stripe Credit Card Reader by Magtek. In some embodiments, the payment feature 154 comprises a near field communication module, which facilitates payments using a mobile/digital wallet, a tablet computer, a smart phone, or other similar devices with NFC capability.

The control unit 144 further comprises a camera 155. The camera 155 may be configured to provide photographic and/or video documentation of the users of the control panel. In some embodiments, the camera 155 is configured to capture and save all recorded images. In one embodiment, the camera 155, and associated picture memory, is configured to capture and record one or several images taken when a user enters, for example, their user identification or user password. In some embodiments, the camera 155 is configured to capture and record one or several images when a user confirms deposit of an item to the storage receptacle 132, or removal of an item from the storage receptacle 132. In some embodiments, the camera 155 may comprise a plurality of cameras located on different positions on the storage unit 100. These cameras are positioned and directed to provide complete camera coverage of the entire storage unit. Similar to camera 155, the images recorded by these cameras are constantly stored, or specific images are stored from these cameras. In some embodiments, a camera may be installed on the roof 124. The roof camera may be positioned such that the roof camera's field of vision encompasses the front of the storage unit 100, including the control cabinet 146 and the storage receptacles 132. This positioning of the roof camera allows for photographic and video monitoring of the storage receptacles themselves, including recording user's access to the storage receptacles. This may provide evidence that a pick-up or drop off occurred, or evidence of the identity of a user who picks up or drops off an item.

In some embodiments, the features of the storage unit 100 may be configured so as to allow identification of a user based on a driver's license or other government issued form of identification. Beneficially, this capability may allow the storage unit 100 to determine the identity of the user and the age of the user. In some embodiments, the picture of the owner of the government issued identification that is found on the identification may be compared with the image of the user taken at log-in. Facial recognition techniques may be used to determine if the user is the same person identified by the government issued identification. In some embodiments, the use of government issued identification to identify the user may allow non-registered users to use the storage unit to send and/or receive items. In some embodiments, use of government issued identification to identify the user may be used to enable delivery of restricted delivery items which require that the person identified on the item is the only recipient of the item, and age-restricted items such as, for example, alcohol, tobacco, ammunition, weapons, medication, or any other age restricted items.

Figure 2:
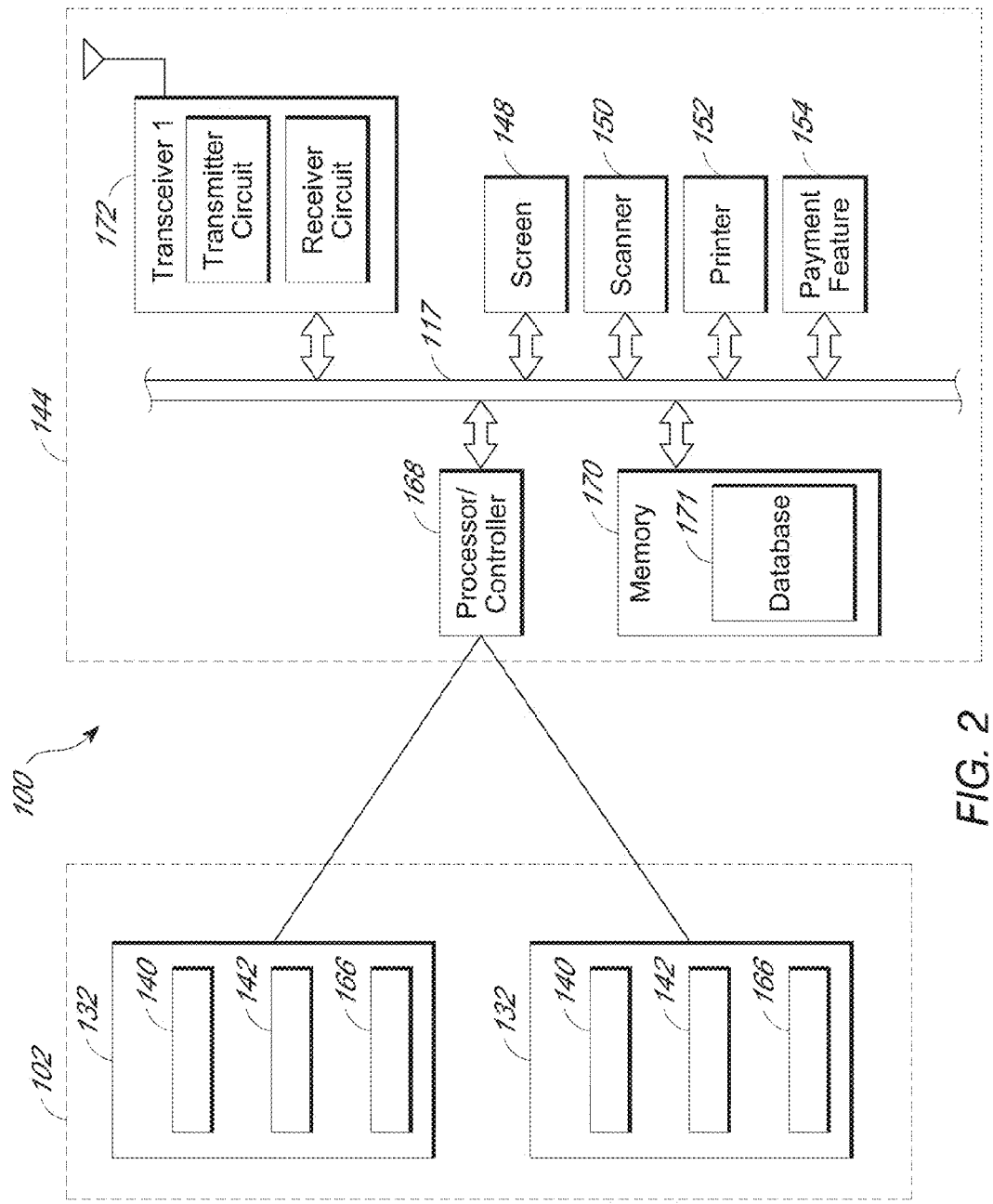
FIG. 2 depicts a schematic illustration of one embodiment of a storage unit.

The features of the storage receptacles 132 and the control unit 144 communicatingly interact. FIG. 2 depicts a schematic illustration showing one exemplary embodiment of the communicating interactions within the storage unit 100.

The storage unit 100 shown in FIG. 2 includes a receptacle unit 102 and a control unit 144. The receptacle unit 102 may comprise a plurality of storage receptacles 132. The receptacle unit 102 depicted in FIG. 2 comprises three storage receptacles 132. The storage receptacles 132 each comprise a plurality of features that may include, for example, securement feature 140, light 142, and/or any other desired features, such as, for example, an interior light, a door position detection feature, and/or an item detection feature.

The control unit 144 may comprise a variety of features performing a variety of functions. In some embodiments, and as depicted in FIG. 2, the control unit 144 comprises, for example, a processor 168, memory 170, a communication feature 172, a screen 148, a scanner 150, a printer 152, and a payment feature 154. The control unit 144 may include a central bus 117 linking the several features together.

The processor 168 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processor 168 may comprise, for example, a microprocessor, such as a Pentium® processor, a Pentium® Pro processor, a 8051 processor, a MIPS® processor, a Power PC® processor, an Alpha® processor, or the like. The processor 168 typically has conventional address lines, conventional data lines, and one or more conventional control lines.

The processor 168 is in communicating connection with memory 170. The memory 170 may include, for example, RAM memory, flash memory, ROM memory, EPROM memory, EEPROM memory, registers, hard disk, a removable disk, a CD-ROM, or any other form of storage medium known in the art. The memory may include, for example, software, at least one software module, instructions, steps of an algorithm, or any other information. In some embodiments, the processor 168 performs processes in accordance with instruction stored in the memory 170. These processes may include, for example, controlling features and/or components of the receptacle unit 102, controlling features and/or components of the control unit 144, requesting information from features and/or components of the receptacle unit 102, requesting information from features and/or components of the control unit 144, transmitting instruction and/or control signals to the features and/or components of the receptacle unit 102, transmitting instructions and/or control signals to features and/or components of the control unit, requesting information from the user, transmitting information to the user, processing information received from features and/or components of the receptacle unit 102 and/or of the control unit 144, processing information received from the user, and/or any other desired processes.

In some embodiments, memory 170 comprises one or more databases 171. In one embodiment, the database may contain register user identification information, including, for example, the user identification and user password for registered users, storage receptacle information, including whether a storage receptacle 132 is available, and the location, item identification, and recipient identification of items stored in the storage unit 100.

In some embodiments, the processor 168 is in communicating connection with a communication feature 172. The communication feature 172 is configured for wired, and/or wireless communication. In some embodiments, the communication feature 172 communicates via telephone, cable, fiber-optic, or any other wired communication network. In some embodiments, the communication feature 172 may communicate via cellular networks, WLAN networks, or any other wireless network. The communication feature 172 is configured to receive instructions and to transmit and receive information. This information may relate to, for example, required maintenance of the storage unit 100, availability of storage receptacles 132 in the storage unit 100, status of items in the storage receptacles 132, such as, for example, whether an item is awaiting retrieval, transaction information, and/or any other desired information. In some embodiments, the communication feature 172 communicates via a wired or wireless communication network with one or more network services (e.g., web services) on one or more network servers (not shown). For example, some of the functionality described with respect to the control unit and other functionality as described further below may be performed by a remote network service, remote from the control unit 144. The control unit 144 may communicate via the communication feature 172 with the remote network service to exchange data and provide the interactivity necessary with a user of the storage unit 100. In one embodiment, the network service may be cloud service that may include processors, memory, and the like as described above. In one embodiment, the network service may include NFC modules configured to communicate information from mobile devices, such as smart phones, as described above.

As depicted in FIG. 2, the processor 168 is in communicating connection with the screen 148. In some embodiments, the processor 168 is configured to transmit control signals to the screen 148 to control the transmission of information to the user, and to receive signals corresponding to user inputs from the screen 148.

The processor 168 is further in communicating connection with each of the scanner 150, the printer 152, and the payment feature 154. The processor 168 is configured to transmit control signals to the scanner 150 and to receive information relating to a scanned item from the scanner 150, to transmit control signals to the printer 152 corresponding to, for example, to instructions to print a label, and to transmit control signals to the payment feature 154 and receive information relating to the transaction from the payment feature 154.

In some embodiments, and as depicted in FIG. 2, the processor 168 communicates via a communication link with some or all of the storage receptacles 132 for sending control signals to the storage receptacles 132. In some embodiments, the communication with some or all of the storage receptacles 132 may comprise sending control signals to control the features of each of the storage receptacles 132, including, for example, the securement feature 140, and the light 142. In some embodiments, the processor 168 is configured to send control signals to the securement feature 140 to secure and/or to unsecure the door 136 of the storage receptacle 132, and to receive signals from the securement feature 140 relating to the securement status of the securement feature 140, such as, whether the securement feature is securing the storage receptacle 132.

In some embodiments, the processor 168 is configured to send control signals to the light 142. In some embodiments, these control signals correspond to turning the light 142 on, or to shutting the light 142 off In some embodiments, the processor 168 is configured to send control signals to the sensor 145, or the climate control equipment.

In some embodiments, the processor 168 is configured to send control signals to the receptacle designating feature 166 or the light 142. These signals may correspond to activating the receptacle designating feature 166 or the light 142 when the associated storage receptacle 132 is unsecured, and to de-activating the receptacle designating feature 166 or the light 142 when the associated storage receptacle has been re-secured.

In some embodiments, an address is provided for the storage unit 100. This address may be a text string, standard address comprising a street and a number, or a modified address that may identify the storage unit 100 without reference to a standard address. In some embodiments, this modified address may comprise a unique number, the zipcode in which the storage unit 100 is located and a unique number. In some embodiments, each of the storage receptacles may comprise a unique address. This address may be the same as the address for the storage unit 100, plus additional digits to allow unique identification of the storage receptacle 132. In some further embodiments, and using similar principals, customers registered for use of the storage unit may be assigned a storage unit address. This address may be tied to a preferred storage unit, such that the user's address is the address of the storage unit 100 plus additional text, or may be independent of any storage unit. In some embodiments, this storage unit address may allow deliveries addressed, not to the recipient, but to the recipient's storage unit address. Advantageously, such addressing may prevent the originator of the item from knowing the identity and physical address of the recipient.

In some embodiments, the address may be utilized by a user associated with a social media network. For example, the address may be assigned to a user of a social network site, such as Facebook, or Twitter, or a dating service, and may facilitate physical delivery of items to the social media user, while maintaining anonymity of the social media user. In some embodiments, the address may facilitate the physical exchange of items between more than one user of a social media network. In some embodiments, the address may be assigned to a user who buys from vendors who cater or sell to users of social media networks. This mechanism allows for vendors or businesses to interact and deliver items through social media while maintaining the anonymity of the users who buy from such vendors or businesses.

A person of skill in the art will recognize that the processor 168 is configured for communicating interaction with other features of the receptacle unit 102 and/or of the control unit 144.

The memory 170 of the control unit 144 may comprise a variety of instructions configured for different item delivery scenarios.

Processes for Operating and Using Storage Units

Figure 3:
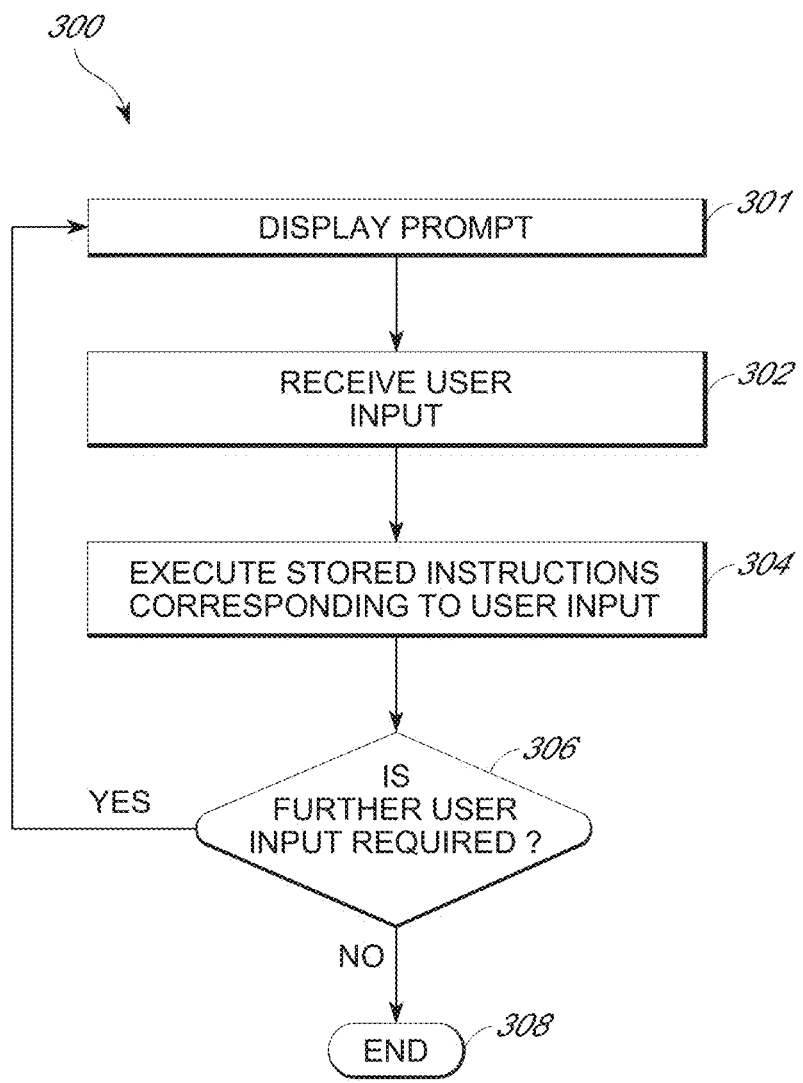
FIGS. 3-3F depict flow charts of different embodiments of operation of the control of a storage unit.
Figure 3A:
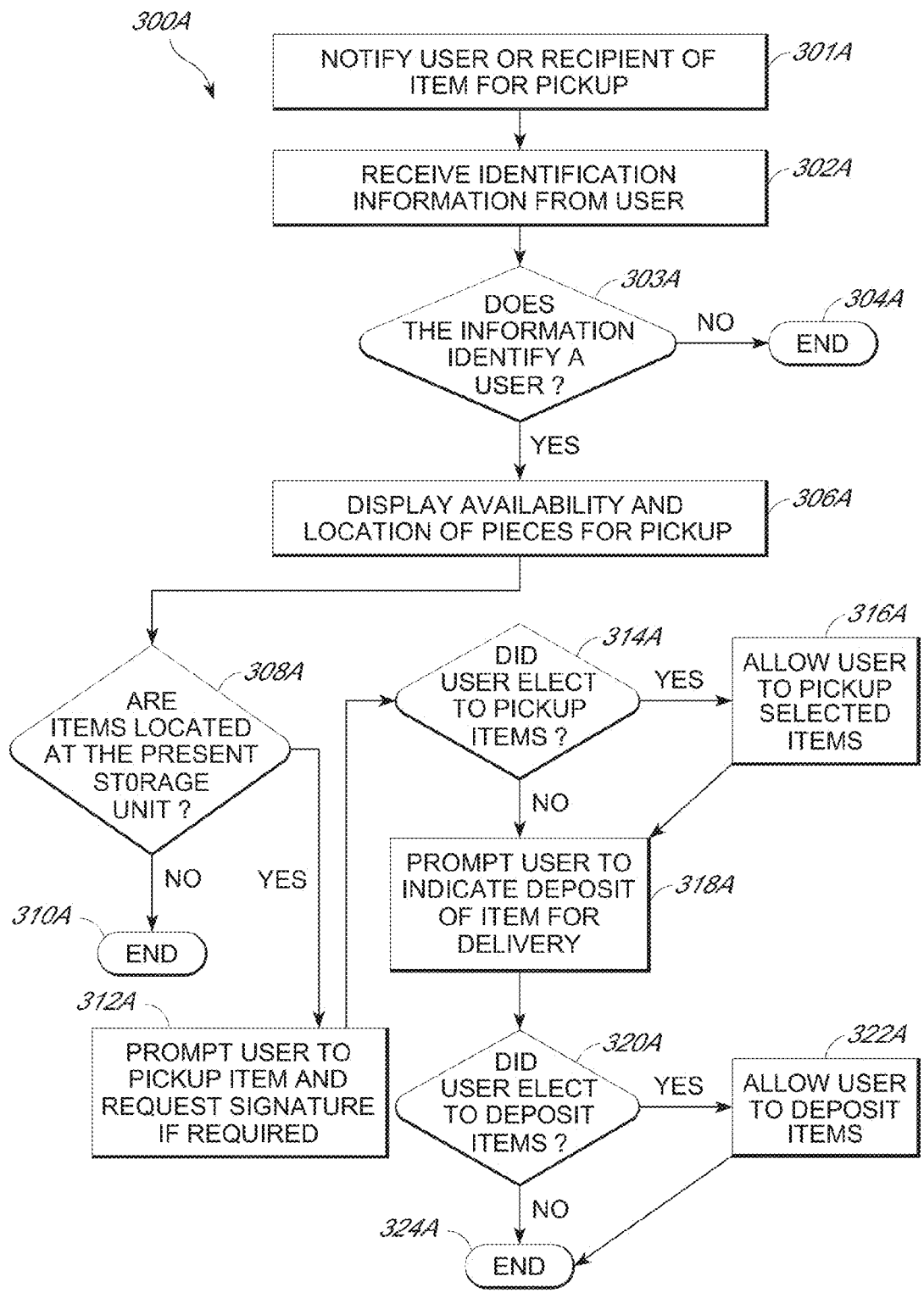
Figure 3B:
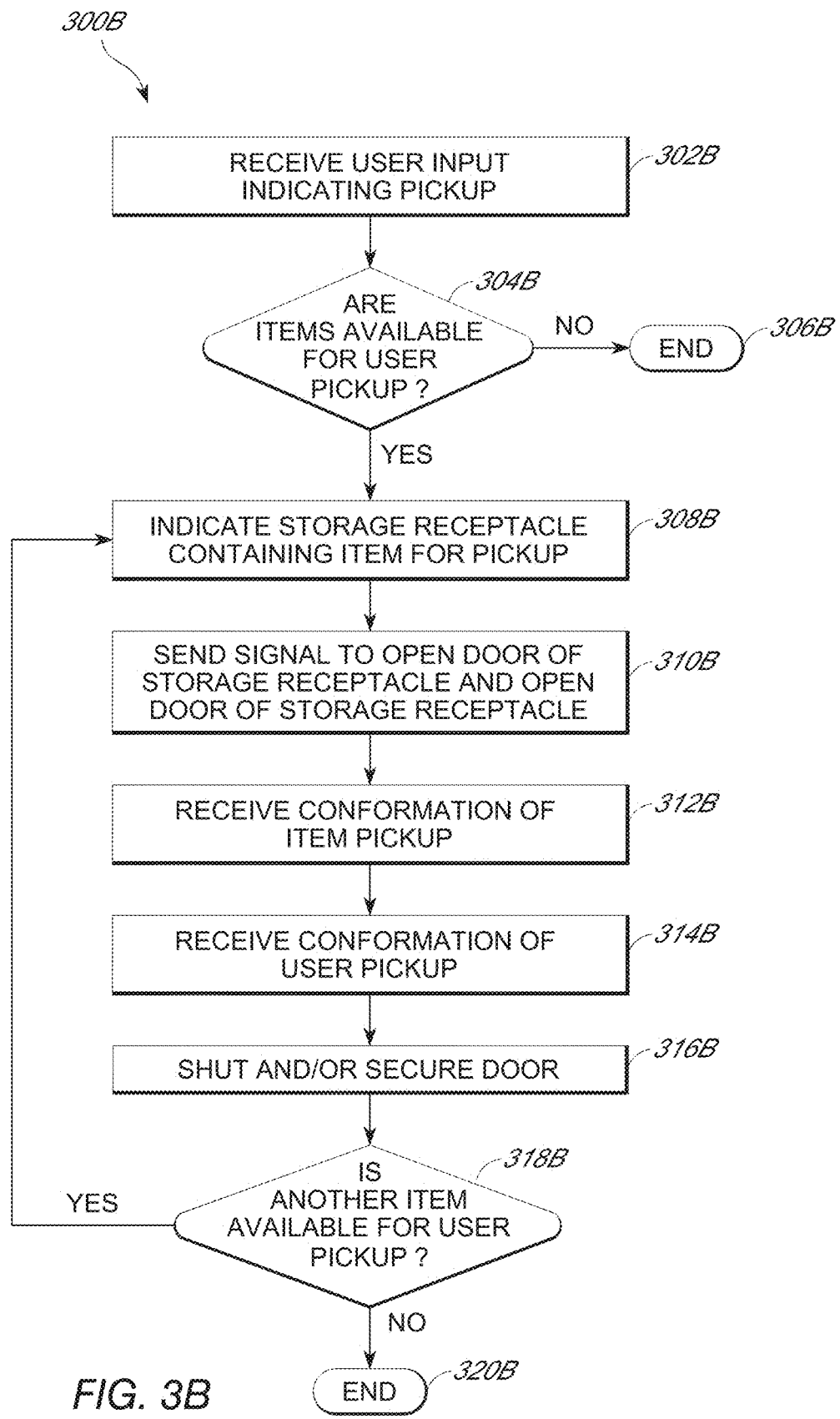
Figure 3C:
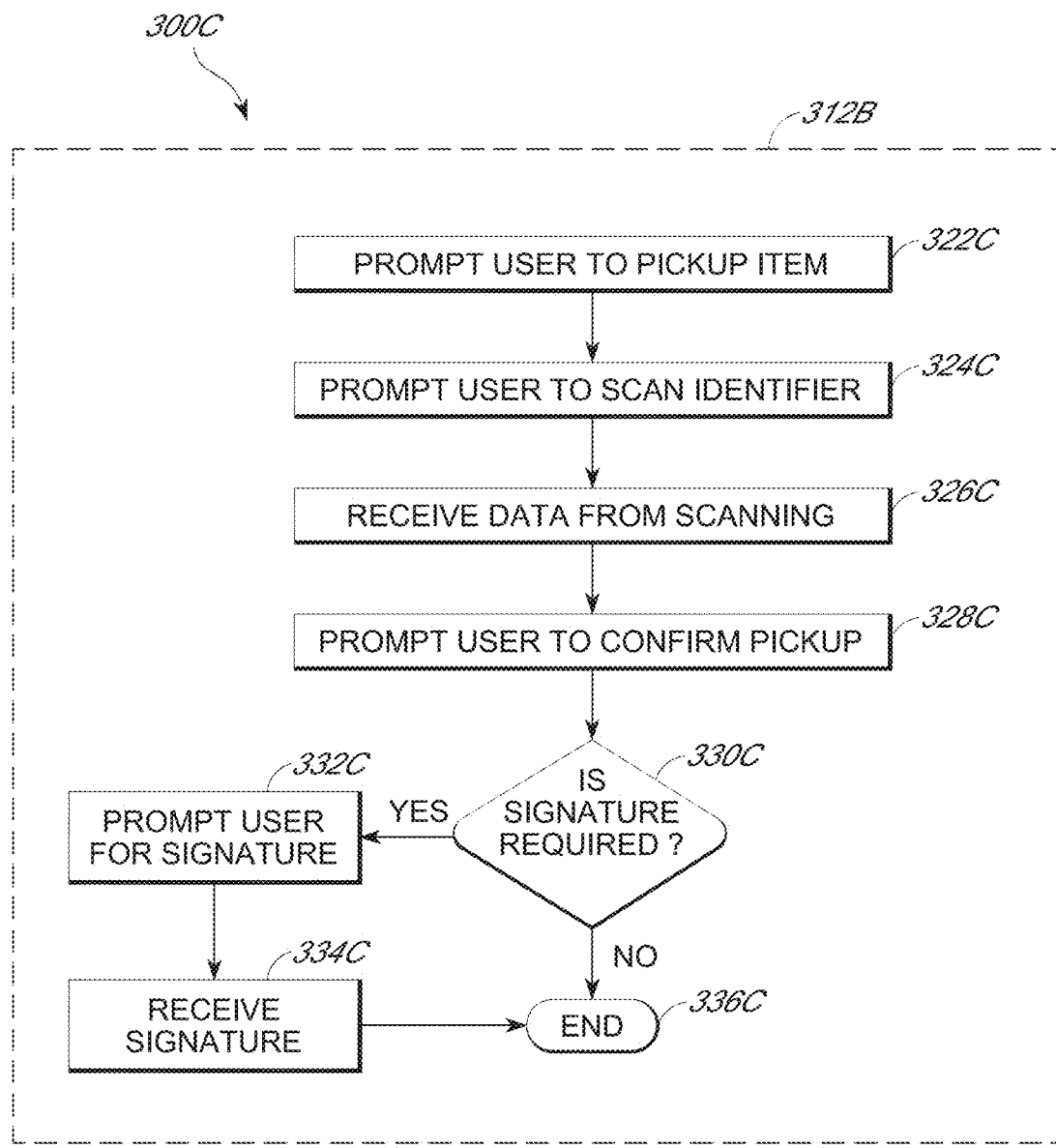

FIGS. 3-3C illustrate different methods of operating a storage unit 100. FIG. 3 depicts one embodiment of a process 300 of controlling a storage unit 100. The process 300 begins by displaying a prompt to a user as depicted at block 301. This prompt or message may be a request for input such as, for example, user identification, item identification, task identification, item delivery, item retrieval, payment, an instruction, storage receptacle selection, or any other input, or may be an information display.

The process 300 continues to block 302 and receives a user input. In some embodiments, this input is in response to the prompt displayed in block 300. This input may correspond to, for example, user identification, item identification, task identification, payment, item delivery, item retrieval, storage receptacle selection, or any other input.

The process 300 continues to block 304 and executes stored instructions corresponding to the user input. These instructions may correspond to, for example, the functions of the storage unit 100, including, for example, requesting information, transmitting information, disengaging a lock, engaging a lock, receiving an input, scanning an identifier, and receiving payment.

After execution of stored instructions corresponding to the user input at block 304, the process 300 moves to decision state 306 and determines whether additional user input is required. If additional user input is required, the process moves to block 300. If no additional user input is required, the process terminates at block 308.

The general method of operation outlined in FIG. 3 is generally applied in all of the other processes performed with the storage unit 100. Thus, this general method is applied in, for example, the process of FIG. 3A which depicts one embodiment of a process 300A of controlling the storage unit 100 during item pickup and item delivery. The process 300A begins at block 301A, when an item is deposited in a storage unit, which triggers a sending notification to a user or the intended recipient of the item. The notification may be sent as an email, an SMS text message, a written notice, or by any other notification method. After notification is sent, process 300A moves to block 302A when control unit 144 receives identification information from the user. The identification may comprise a broad range of information and may be received by the control unit in a variety of formats. In some embodiments, the identification comprises, for example, a username and password, a unique account number, and unique information stored in a computer readable medium. In some embodiments, the identification information provides input to the control unit by a user action, such as, typing, speaking, selecting, or scanning. In some embodiments, for example, a user can enter a username and password by typing the username and password, by speaking his username and password into a microphone, by spelling his username and password into a microphone, by scanning a computer readable code, or by any other desired method.

After receiving identification information from the user, the process 300A moves to decision state 303A and determines whether the information identifies a user. In some embodiments, this step can comprise a comparison of received identification information with stored user identification information. If the identification information does not identify a user, the process 300A terminates as depicted at block 304A.

If the identification information identifies a user, the process 300A moves to block 306A and the storage unit 100 displays the availability and location of items scheduled for pickup by the user. In some embodiments, these items may be at the instant storage unit 100, and in other embodiments, these items may be located at a different storage unit 100.

After displaying the availability and location of an item scheduled for pickup by the user, in some embodiments, the process 300A moves to decision state 308A and determines whether the item is located at the present storage unit 100. If the item is not at the present storage unit 100, then the process ends at block 310A.

If the item is at the present storage unit 100, the process 300A moves to block 312A and the user is prompted to pick-up the item. The process 300A moves to decision state 314A and determines if the user has elected to pick-up the item. If the user has elected to pick-up the item, then the user is allowed to pick-up the item at block 316A.

After the user picks-up the item at block 316A, or if the storage unit determines at decision state 314A that the user has not elected to pick-up the item, the process moves to block 318A, where the user is prompted to indicate whether they will deposit an item for delivery. The process 300A moves to decision state 320A and determines if the user elected to deposit the item for delivery. If it is determined that the user elected to deposit the item for delivery, the user is allowed to deposit the item at block 322A. After the user has deposited the item at block 322A, or if the storage unit 100 determines that the user did not elect to deposit the item for delivery, the process ends at block 324A. Although the processes herein are described with regard to a single item, the processes could be carried out with multiple items and multiple users.

The process of controlling the storage unit during item pick-up and/or delivery may include further sub-processes. These sub-processes may include, for example, processing further steps relating to the item pick-up and relating to the item delivery. FIG. 3B depicts one embodiment of a process for item pick-up 300B. The process 300B begins at block 302B when the storage unit 100 receives a user input indicating intent to pick-up an item. After receiving this input, the process 300B moves to decision state 304B to determine if there is an item available for pick-up by the user. This determination can, in some embodiments, be performed locally at the storage unit 100, or in some embodiments, this determination may comprise transmitting a request to the storage unit system control unit for whether the user has an item available for pick-up at the storage unit. If no item is available for pick-up, the process terminates at block 306B

If an item is available for pick-up at the storage unit 100, the process 300B indicates the storage receptacle 132 containing the item available for pick-up. This indication may be achieved in a variety of ways. In some embodiments, for example, the screen 148 shows a depiction of the storage unit 100, and visually indicates the storage receptacle 132 in which the item is being stored. In some embodiments, the visual indication of the location of the item may include, for example, a schematic illustration of the storage unit with a visual indication, such as highlighting, one or several storage receptacles containing items for pick-up. In some other embodiments, the position of storage receptacles 132 containing an item available for pick-up may be indicated through, for example, activation of a light, or any other desired method.

The process continues at step 310B, where control unit sends a signal to open the door 136 of the storage receptacle 132, and the door 136 of the receptacle 132 opens or is made accessible to the user by the control unit 114. In some embodiments, opening of the door comprises, for example, unlocking of the securement feature 140, or causing the door 136 of the receptacle to move to an opened position.

After opening the door 136 of the storage receptacle 132 as depicted in block 310B, the process moves to block 312B, and the storage unit 100 requests confirmation by the user that he picked-up the item in the designated storage receptacle 132.

The storage unit 100 receives confirmation that the user picked-up the item in the designated storage receptacle 132 at block 314B. In some embodiments, for example, the user provides a signature if required for pick-up, and additionally confirms the pick-up via signature, or other input to the storage unit 100. In some embodiments, the user signs in a signature capture space located on a touch screen, and the signature is electronically captured. In some embodiments, storage receptacle 132 comprises a scale or other device to detect a change in the weight within the volume of the storage receptacle. If a user picks up an item, the scale senses the reduction in weight, and the reduction in weight may be a pick-up confirmation provided to the storage unit 100. In some embodiments, sensor 145 may provide a sensing function to sense when an item has been removed from the storage unit 132, and may provide confirmation of item pickup to storage unit 100.

Upon receiving confirmation that the user picked-up the item in the designated storage receptacle 132 as depicted in block 314B, the process 300B, advances to block 316B, where the door 136 of the storage receptacle 132 is closed and/or secured. In some embodiments, the door 136 of the storage receptacle 132 is configured to automatically close. In some embodiments, the door 136 of the storage receptacle 132 is configured to controllably close. In some embodiments, the door 136 of the storage receptacle 132 may not be configured to controllably or automatically close.

In some embodiments, the securement feature 140 of the storage receptacle 132 is configured for activation upon user confirmation of pick-up, or upon the elapsing of a specified time, such as an automatic log-off In some embodiments, the securement feature 140 is activated as depicted in block 314B to re-secure the door 136 of the storage receptacle 132.

After the door 136 of the storage receptacle 132 has been closed and/or secured as depicted in FIG. 3B, the process 300B advances to decision state 318B, where it determines if another item is available for pick-up by the user. If another item is available for pick-up by the user, the process returns to block 308B. If another item is not available for pick-up by the user, then the process 300B terminates at block 320B.

FIG. 3C provides further detail into the steps of some processes used in picking-up an item from a storage unit. Specifically, FIG. 3C depicts one embodiment of a process 300C for requesting confirmation of item pick-up as depicted in Block 312B of FIG. 3B. Accordingly, the steps of the present process 300C occur within block 312B of FIG. 3B.

As depicted in FIG. 3C, the process 300C for requesting confirmation of item pick-up begins at block 322C by prompting the user to pick-up the item. This prompt may be, for example, in addition to an indication of which storage receptacle 132 contains the item, and in addition to opening of the storage receptacle 132 containing the item.

After prompting the user to pick-up the item, the process 300C advances to block 324C where the user is prompted to scan an identifier on the item. In some embodiments, this may comprise, for example, scanning a computer readable code, receiving a radio frequency transmission, scanning a text string, or scanning any other identifying feature of the item.

After prompting the user to scan the identifier as depicted in block 324C, the process 300C advances to block 326C, where the storage unit 100 receives data from the scanning of the identifier.

After receiving data from the scanning of the identifier as depicted in block 326C, the storage unit 100 prompts the user to confirm the pick-up of the item at block 328C. The process 300C then advances to decision state 330C where it determines whether a user signature is required. If a signature is required, the storage unit 100 prompts the user to provide a signature as depicted in block 332C. The storage unit then receives the signature as depicted in block 334C. After receiving the signature as depicted in block 334C, or after determining that no signature is required in decision state 330C, the process 300C terminates at block 336C.

The steps of process 300C as depicted are illustrative, and need not be performed in the order described. For example, steps 324C and 325C may be performed prior to step 322C.

FIG. 3D depicts one embodiment of a process 300D for deposit of an item. The process 300D begins at block 302D when the storage unit 100 receives a user input indicating a user's intent to deposit an item at the storage unit 100.

The process 300D then moves to block 304D, where the user input is requested relating to the size of the item for deposit. In some embodiments, the user may respond to this request by inputting, for example, the dimensions of the item for deposit, or specifying the general item size, such as, for example, small, medium, or large. In some embodiments, the request to input the size of the item for deposit may provide general guidance as to how to classify an item as small, medium, or large.

In some embodiments, a scale, a sensor, or measuring device may be located at the storage unit 100, or may be incorporated into storage unit 100, providing a user with an opportunity to measure the size and weight of an item and provide the measurements to the storage unit 100. A user may manually input the measured item dimensions into the control unit 144, or the scale, sensor, or measuring device may communicate the measured item dimensions to control unit 144. In some embodiments, the item may be provided in a flat-rate box, or one of a set of standard size boxes. In this embodiment, the user may select or input an identifier from the flat-rate or standard size box. The control unit 144 recognizes the identifier for the flat rate or standard size box, and selects appropriately sized storage receptacles 132 for deposit of the item in the flat-rate or standard size box.

After requesting that the user input information relating to the dimensions of the item for deposit, the process 300D moves to decision state 306D and determines whether the user indicated the item size. In some embodiments, the item size may be indicated to the control unit 144 according to the postage required or paid, where the postage required corresponds to a flat-rate or standard size box.

If the user indicated the item size, the process 300D advances to decision state 308D, and determines whether any storage receptacles 132 of adequate size to hold the deposited item are available. In some embodiments, this determination includes, for example, a query of the receptacle database 171 to determine which receptacles are available and the sizes of the available receptacles.

If no storage unit of adequate size is available, the process moves to block 310D and communicates to the user that no storage receptacles 132 of adequate size are available in the storage unit 100. In some embodiments, the control unit 144 may display on screen 148 the location of the nearest storage unit 100 having an available storage receptacle 132 appropriate to the item or item size. In some embodiments, screen 148 may display the location of the nearest delivery or pick-up points, such as the nearest post offices to the storage unit 100. In some embodiments, this information may be provided on a print out, a receipt, email, or SMS message to the user.

If storage units of adequate size are available, or if the user does not indicate the item size as determined at decision state 306D, the process 300D moves to block 312D and communicates the location of available storage receptacles. In some embodiments, for example, the screen 148 shows a depiction of the storage unit 100, and visually indicate, by, for example, highlighting, available storage receptacles 132.

The process 300D then moves to block 314D where the user is prompted to select a storage receptacle. After receiving the user selection of the storage receptacle 132 as depicted in block 316D, the door to the selected storage receptacle is opened as depicted in block 318D.

The process 300D then proceeds to block 320D, where the user is prompted to deposit the item in the storage receptacle 132. In some embodiments, the door 136 may automatically shut after the item is deposited, or the door may be controllably shut after the item is deposited. In some embodiments, the user may be additionally prompted to shut the door 136. In some embodiments, a sensor incorporated into securement feature 140 provides confirmation to the control unit 144 that the door has been secured and locked. In some embodiments, sensor 145 provides a signal to the control unit 144 that the door is closed, secured, and/or locked.

The process then moves to block 322D, and the door 136 is secured. In some embodiments in which the presence of an item in the storage receptacle is not automatically detected, after the door is secured, the user is prompted, as depicted in block 324D, to confirm that the item was deposited in the storage receptacle 132. After receiving the user confirmation that the item was deposited in the storage receptacle as depicted in block 326D, or after receiving sensing information indicating that the item was deposited in the storage receptacle, the process moves to block 328 where the user is asked if he has another item to deposit.

After receiving the user input as to whether he has another item for deposit as depicted in block 330D, the process 300D moves to decision state 322 and determines whether the user has another item for deposit. If the user has another item for deposit, the process 300D moves to block 302D and continues through the flow chart. If the user does not have another item for deposit, then the process 300D ends at block 334D.

Figure 3E:
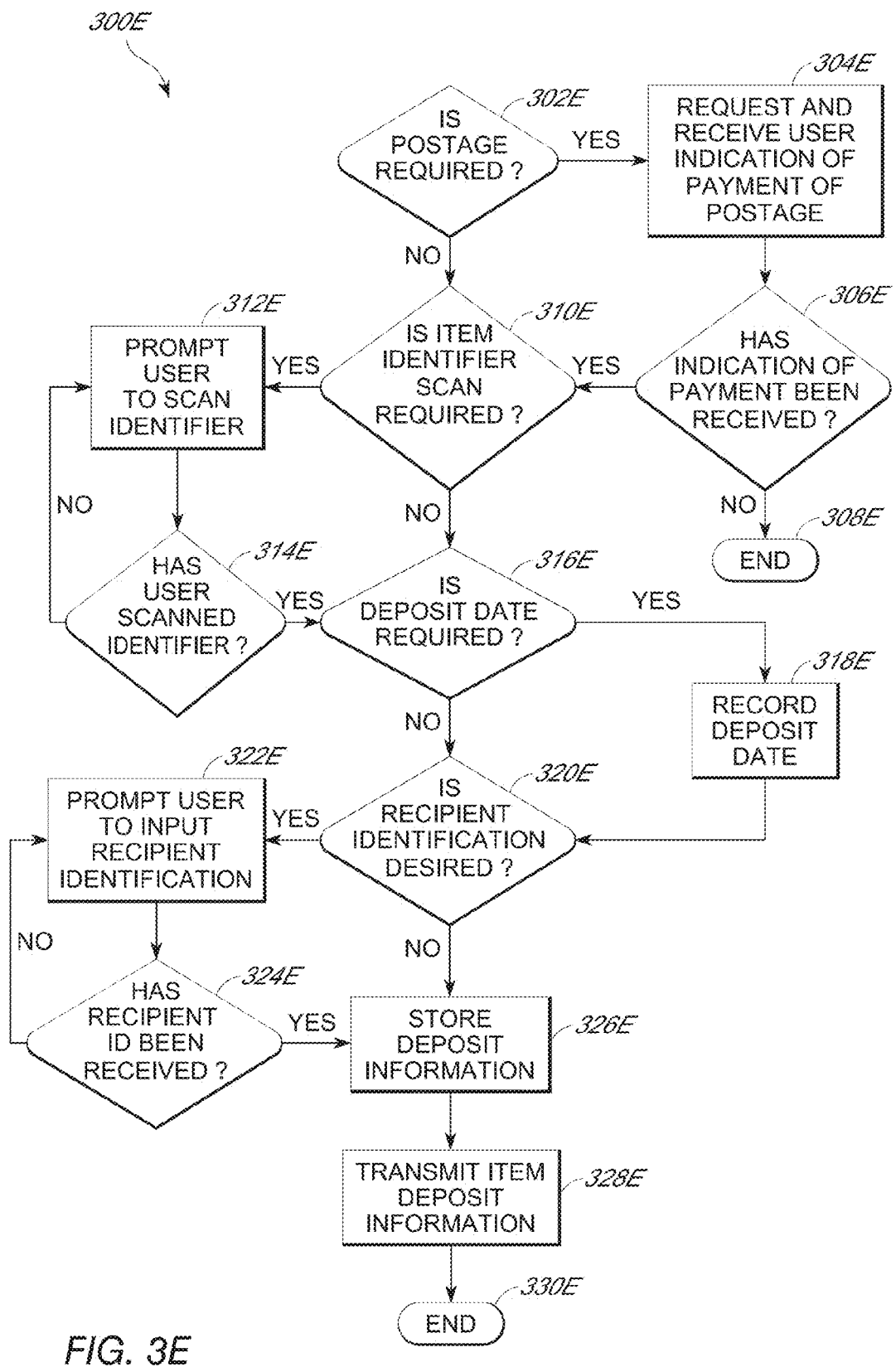

FIG. 3E depicts one embodiment of the process 300E associated with prompting the user to deposit an item in the storage receptacle 132 as depicted in block 320D of FIG. 3D. As depicted in FIG. 3E, the process 300E moves to decision state 302E and determines if postage is required. In some embodiments, determining if postage is required may comprise evaluating whether a certain item or identifier input by a user qualifies for deposit into storage unit 100. For example, a user may generate an identifier, such as a postage bar code, and provide the barcode to the storage unit 100 via scanner 150. The process, in decicision state 302E may evaluate whether the provided postage barcode is eligible for use at the storage unit 100. This determination may be based on the identification of the user and an input from the user identifying the item is a mail item to be sent to a particular recipient or location. In decision block 302E, the determination of whether postage is required may also be made based on input or scanned dimensions and weight of the item. In some embodiments the user inputs a description of the item, any special delivery instructions, delivery destination, value of item being deposited, and other similar parameters. Based on these parameters, control unit may determine how much postage is required for the item to be deposited. In some embodiments in which the user is the agent, no postage may be required. In contrast, in some embodiments in which the customer is the user, postage may be required.

If postage is required, the process 300E moves to block 304E and requests and receives User indication of payment of postage. In some embodiments, this comprises completion of a postage purchase transaction at the storage unit 100. In some embodiments, this may provide providing an indication of a previously completed postage purchase transaction. In some embodiments, this indication may comprise scanning a unique identifier associated with the postage purchase transaction, entering a unique identifier associated with the postage purchase transaction, scanning postage located on the item, or any other method of identifying a completed postage transaction. Upon each transaction, control unit 144 may update a database maintained on a central controller or server, which will be described in more detail below.

The process 300E then moves to decision state 306E and determines if an indication of payment has been received from the control unit 144. If the indication of payment has not been received, then the process terminates at block 308E. If the indication of payment has been received, then the process moves to decision state 310E and determines if scanning of an item identifier is required. Advantageously, the scanning of a unique item identifier may allow the storage unit 100 to track each individual item that is placed in a storage receptacle.

This identifier may comprise a range of identifiers, and may include a computer readable code, a barcode, a text string, a radio-frequency emitter such as an RFID tag, or any other identifier.

If scanning of an identifier is required, the process 300E moves to block 312E and prompts the user to scan the identifier. The process 300E then moves to decision state 314E and determines if the user scanned the identifier. If the user did not scan the identifier, then the process returns to block 312E and prompts the user again to scan the identifier. If the user scanned the identifier, or if no identifier scan was required, the process 300E moves to decision state 316E and determines if an item deposit date is required. If an item deposit date is required, the process 300E moves to block 318E and records the deposit date. In some embodiments, the storage unit 100 is configured to track the date, and so will be able to store the deposit date without user input. In other embodiments in which the storage unit 100 is not configured to track the date, the user may be prompted to input a deposit date, which entered date is stored at block 318E.

After the deposit date has been stored in block 318E, or if no deposit date is required, the process 300E moves to decision state 320E and determines if recipient identification is desired. In some embodiments in which an agent is depositing an item in a storage unit, the recipient information may be requested so that the recipient is notified that his item is in the storage unit 100 and so that the recipient can identify himself to retrieve the item from the storage unit 100. In other embodiments in which the customer is depositing an item in the storage unit 100, the identification of the recipient may not be requested.

If the recipient information is desired, the process 300E moves to block 322E and the user is prompted to input recipient information. In some embodiments, the user may manually input the recipient information, may scan an identifier containing the recipient information, or may use any other technique to enter the recipient information.

The process 300E then moves to decision state 324E and determines if the recipient identification information has been received. If the recipient identification information has not been received, the process moves to block 322E and the user is again prompted to enter the recipient identification information. If the recipient identification information has been entered, or if the recipient identification information is not required, then the process moves to block 326E and the deposit information is stored at the storage unit 100. The process then moves to block 328E and transmits the item deposit information. In some embodiments, this transmission is from the storage unit 100 and to the storage unit system 400. Specifically, this transmission is from the storage unit 100 and to the central management system 404. The process then terminates at block 330E.

Figure 3F:
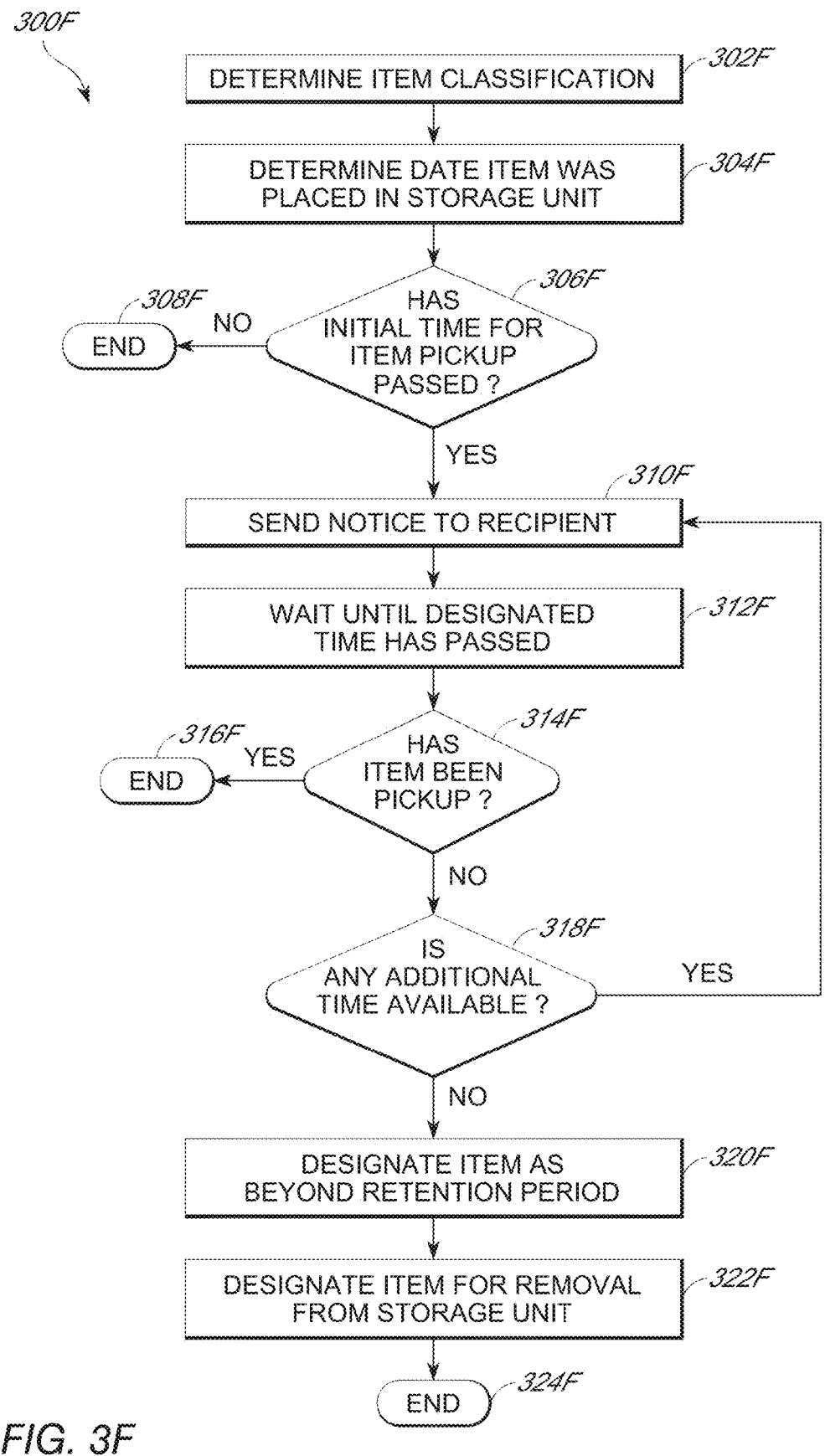

In some embodiments of a storage unit 100, the storage unit is configured to track the amount of time that an item has been in a storage receptacle 132, and designate the item for removal from the storage receptacle 132 if the item has been in the storage receptacle 132 in excess of some duration. FIG. 3F depicts one embodiment of a process 300F for determining whether an item should be classified for removal based on the time it has been in the storage receptacle 132. In some embodiments, the time an item may be stored in the storage unit 132 may be input by a user into control unit 144 upon deposit. In some embodiments, the time an item may be stored may be determined by the storage unit 100 based on the category of the item, input by the user at time of deposit. In some embodiments, when time an item may be stored is not specified, control unit 144 may select a default time for storage of a unit such as 1 hour, 2 hours, 4 hours, 12 hours, 1 day, 2 days, 1 week, 2 weeks, 1 month, 2 months, or any other amount of time. In some embodiments, the control unit 144 records the time of deposit regardless of user input. The time of deposit may initiate a standard allowed time for an item to remain in a storage receptacle 132 according to a pre-determined storage time.

The process 300F depicted in FIG. 3F starts at block 302F by determining the classification of the item. This classification may relate to a characteristic of the delivery service provided for the item, such as, for example, mail class and/or mail type, the nature of the item, such as, for example, its degree of perishability or size, economic or market factors, such as the relative demand for the storage receptacle occupied by the item, or any other factor relevant to the time that an item should be allowed to remain in the storage receptacle 132.

The process 300F moves to block 304F and determines the date that the item was placed in the storage unit 100. In some embodiments, the storage unit 100 is configured to track the date, and so this date may be retrieved from storage unit 100 resources. In other embodiments in which the storage unit 100 is not configured to track the date, this date may be retrieved from remote resources located within a storage unit system.

After determining the date that the item was placed in the storage unit 100 at block 304F, the process 300F moves to decision state 306F and determines if the initial time for item pick-up has passed, or if the item has been stored longer than input or predetermined time for an item to be stored in the storage receptacle 132 has elapsed. If the initial time period for item pick-up has not passed, the process 300F terminates at block 308F.

If the initial time period for item pickup has passed, the process 300F proceeds to block 310F and a notice is sent to the intended recipient of the item to pick-up the item. In some embodiments, this notice provides the address of the storage unit 100, identify the storage receptacle 132 holding the item within the storage unit 100, provide a date before which the item must be picked-up, provide notice procedures if the item is not retrieved, and any other desired information. In some embodiments, this notice comprises an electronic communication to, for example, an email account, a telephone number, a social network homepage, or any other electronic communication. In some embodiments, the notice comprises a voice communication sent to a telephone number or other account capable of receiving a voice communication. In some embodiments, the notice comprises a paper communication sent to the address of the intended recipient of the item. The notice may be generated upon a user request, or automatically by the storage unit 100.

After sending the notice to the user at block 310F, the process 300F advances to block 312F and waits until the designated time period has passed. After the time period has passed, the process 300F advances to decision state 314F and determines whether the item has been picked-up. If the item has been picked-up, the process 300F terminates at block 316F. If the item has not been picked-up, the process 300F moves to block 318F and determines if any additional time is available for picking-up the item. In some embodiments, the user may specify whether there is an extended time for pick-up of the item, or that the item may be stored in the storage unit 132. In some embodiments, the storage unit 100 may determine two time periods, the first period being the initial time for storage, and the second period being an extended or additional time for item pickup, which may be available upon payment of an additional fee. In some embodiments, the user may indicate whether the item should be provided to another storage unit 100 upon the first period elapsing.

If additional time is available to pick-up the item, the process 300F moves to block 310F, and continues through the flow-chart until the process is terminated. If the item is not picked up within a first time period, the above notice is sent. If the item is not picked up within the second extended or additional time period, a second notice is sent.

If there is no additional time period available for picking-up of the item, the process 300F advances to block 320F where the item is identified as being held beyond its allowed retention period. In some embodiments, this designation is stored in a local database at the storage unit 100, and in other embodiments, this designation is stored at a central database in a storage unit system. In addition to designating the item as being held beyond its allowed retention period at block 320F, the process 300F designates the item for removal from the storage unit at block 322F. In some embodiments, this designation is stored in a local database at the storage unit 100, and in other embodiments, this designation is stored at a central database in a storage unit system. In some embodiments, once the allowed storage time has elapsed, the item is returned to the sender, or the depositor is notified to come retrieve the item.

Storage Unit System

Figure 4:
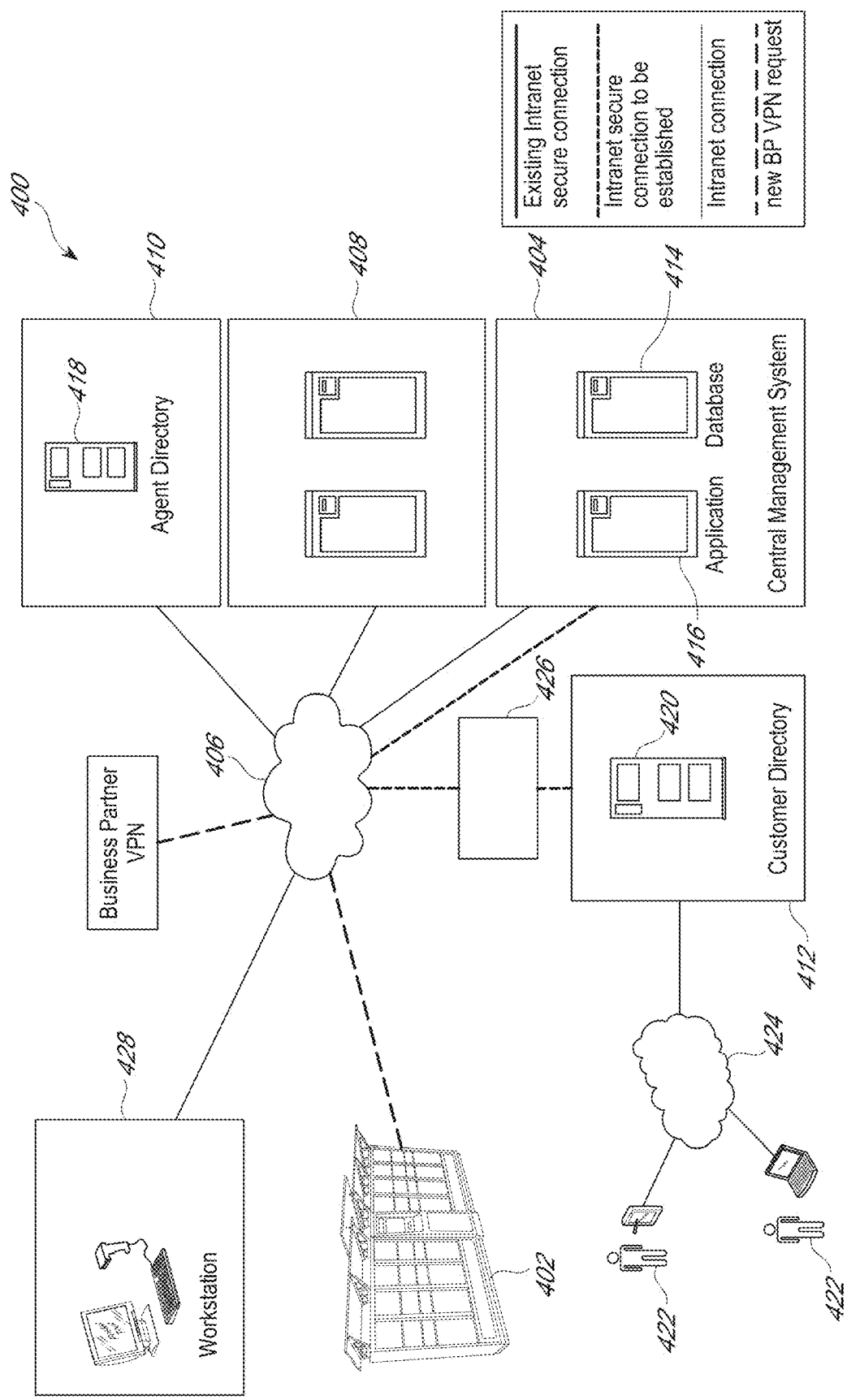
FIGS. 4-4A depict functional layouts of one embodiment of a storage unit system.

As discussed above, in some embodiments, the storage unit 100 is a standalone unit. In some embodiments, however, a plurality of storage units 100 may be integrated into a single storage unit system. FIGS. 4 through 4D depict schematic illustrations of embodiments of storage unit systems 400. As depicted in FIG. 4, a storage unit system 400 comprises a storage unit 402. In one embodiment, the storage unit 402 of the storage unit system 400 comprises a storage unit 402 as described with respect to item 100 in FIGS. 1-2. In some embodiments, the storage unit system 400 comprises a plurality of storage units 402. The storage units 402 are configured for communication with other features of the storage unit system 400 across a network 406. In some embodiments, the network may comprise a local area network (LAN) or a wide-area network (WAN). The storage units 402 is wired to or wirelessly communicate with the network, via, for example, a cellular network.

The storage unit system 400 further comprises computing and memory resources. These computing resources may include one or several processors, computers, servers, or other computing resources. The memory resources may include, for example different types of volatile or non-volatile memory. A user or customer may sign up or register to be a user of the storage unit system 400. By doing so, a customer can select that particular items the customer orders be sent to a specific location. A customer may also provide pick-up and delivery preferences at the time of registration. The information provided at registration may be stored in a customer database as described herein. A customer may sign up by accessing the network, establishing user identification and password, and other information that may be useful to facilitate pick-up and delivery of items. Vendors, sellers, merchants, and other similar parties may also register to use the storage unit system 400. By so doing, they can provide a convenient delivery option for a customer or user who orders an item from them. The vendors may establish preferences for pick-up and delivery items for users of the storage system 400. In some embodiments, the customer may not be a registered user, but may be identified as a guest user. A guest user may be provided with a unique code or identifier, appropriate for a single or limited number of uses, and provide this code at a storage unit 100 in order to complete a transaction.

In the embodiment depicted in FIG. 4, the computing and memory resources include, for example, a central management system 404, one or several engineering support servers 408, and an agent directory 410. In some of embodiments, each of these computing resources may comprise memory including stored instructions and one or more databases.

In some embodiments the central management system 404 comprises a computing resource such as, for example, a computer, a computer system, a server, one or several processors, or any other feature configured to receive and transmit information and instructions to and from the storage units 402, receive and transmit information and instructions relating to item status and delivery, and receive and transmit information and instructions to and from other components of the storage unit system 400. In some embodiments, and as depicted FIG. 4, the central management system 404 comprises a database 414 comprising information relating to the storage unit 100 and the item status. In some embodiments, and as depicted in FIG. 4, the central management system 404 comprises memory 416 comprising instructions for the operation of the aspects of the storage unit system 400.

As depicted in FIG. 4, the storage unit system 400 further comprises one or more engineering support servers 408. The engineering support servers may comprise a computing resource such as, for example, a computer, a computer system, a server, one or several processors, or any other desired computing resource capable. The engineering support servers may comprise software located on the computing resource configured to maintain the functionality, security, and updatedness of storage unit software. In some embodiments, the engineering support servers 408 may utilize commercial security products to maintain the security of the storage unit system 400. These products may include anti-virus products, anti-malware products, firewalls, and any other product or software configured to provide or improve security. In some embodiments, the engineering support servers 408 comprise software configured to monitor the functionality of software in different components of the storage unit system 400, and specifically in the storage units 402. In some embodiments, the software configured to monitor the functionality of software throughout the storage unit system 400 is configured to detect and repair issues in individual components of the storage unit system 400 or across the entire storage unit system 400. Thus, in some embodiments, this feature is used to repair, upgrade, or replace the software used by components of the storage unit system 400.

The storage unit system may additionally comprise an agent directory 410. The agent directory 410 may comprise stand-alone computing capability, or the information of the agent directory 410 is located in computing capability shared with one or more other components of the storage unit system 400.

In one embodiment, the agent directory 410 comprises a database 418 of individuals. In one embodiment, these individuals are affiliated through the operation and maintenance of the storage unit system 400. In one embodiment, these individuals may be employees or contractors of the entity owning and controlling the storage unit system 400. In some embodiments, the database 418 comprises information relating to the access provided to each individual. Thus, individuals within the database 418 are provided with different levels of access to the components of the storage unit system 400 or to the storage unit system 400 based on, for example, their responsibilities or any other factor.

The storage unit system 400 further comprises a customer directory 412. The customer directory 412 may comprise stand-alone computing capability, or the information of the customer directory 412 may be located in computing capability shared with one or more other components of the storage unit system 400.

In one embodiment, the customer directory 412 comprises a database 420 of individuals. In one embodiment, the individuals is, for example, individuals who have successfully completed the registration process for use of the storage unit system 400, individuals who have begun the registration process for use of the storage unit system 400, or individuals who have been invited to register for use of the storage unit system 400. In some embodiments, information stored in the database 420 may include, for example, account and customer identification information, account preferences, payment information, and any other information associated with the customer and/or the account.

In some embodiments, the customer identification information may include, for example, an account number, a user name, a password, a name, an address, or any other user identifying information.

In some embodiments, the account preferences may include, for example, preferred delivery method, contact information, preferred contact method, preferred delivery locations, including, for example, a preference list identifying different storage units 402 and their comparative preference as delivery locations, and any other account preferences.

In some embodiments, the information stored on database 420 is received from customer 422 during the registration process. In one embodiment, and as depicted in FIG. 4, the customer 422 provides this information during the registration process across a network 424, such as the internet. In some embodiments, the customer 422 may provide this information to a web-site during the registration process. A person of skill in the art will recognize that a customer 422 will be able to access a web-site using a range of technologies and devices, including, for example, a computer, a Smartphone, a tablet, or any other device configured for internet access. In some embodiments, a web-site may handle customer related interactions such as customer registration, electronic parcel locker selection, contact information, and access management.

In some embodiments in which the database 420 is associated with a network, the customer directory 412 and the associated database 420 is separated from other components of the network by a security feature 426. In some embodiments, the security feature may comprise, for example, a firewall, a filter, or any other feature, product, or software stored on the hardware configured to allow controlled and secure access of information from the database 420 by components of the storage unit system 400.

The storage unit system 400 further comprises an agent access point 428. An agent access point 428 is configured to allow an agent to access the storage unit system 400. The agent access point 428 may comprise a variety of devices, including a PC, a laptop, a mobile device, a handheld device, a Smartphone, or any other device capable of requesting and receiving information across a network. In some embodiments, the agent access point 428 is configured to transmit information to the central management system 404 relating to items for delivery to a storage unit 402. The agent access point 428 is further configured to receive information from the storage unit system 402 relating to capacity for receiving the item at one or several storage units. In some embodiments, the agent access point 428 is configured to send a request to the storage unit system 400 to reserve a storage receptacle 132 for delivery at a storage unit 402.

The different components of the storage unit system 400 may communicate via a communication link with each other. In some embodiments, the communication link is a wired or wireless connection. In some embodiments, the different components of the storage unit system 400 is redundantly connected, with a combination of different wired and/or wireless connections and links.

Figure 4A:
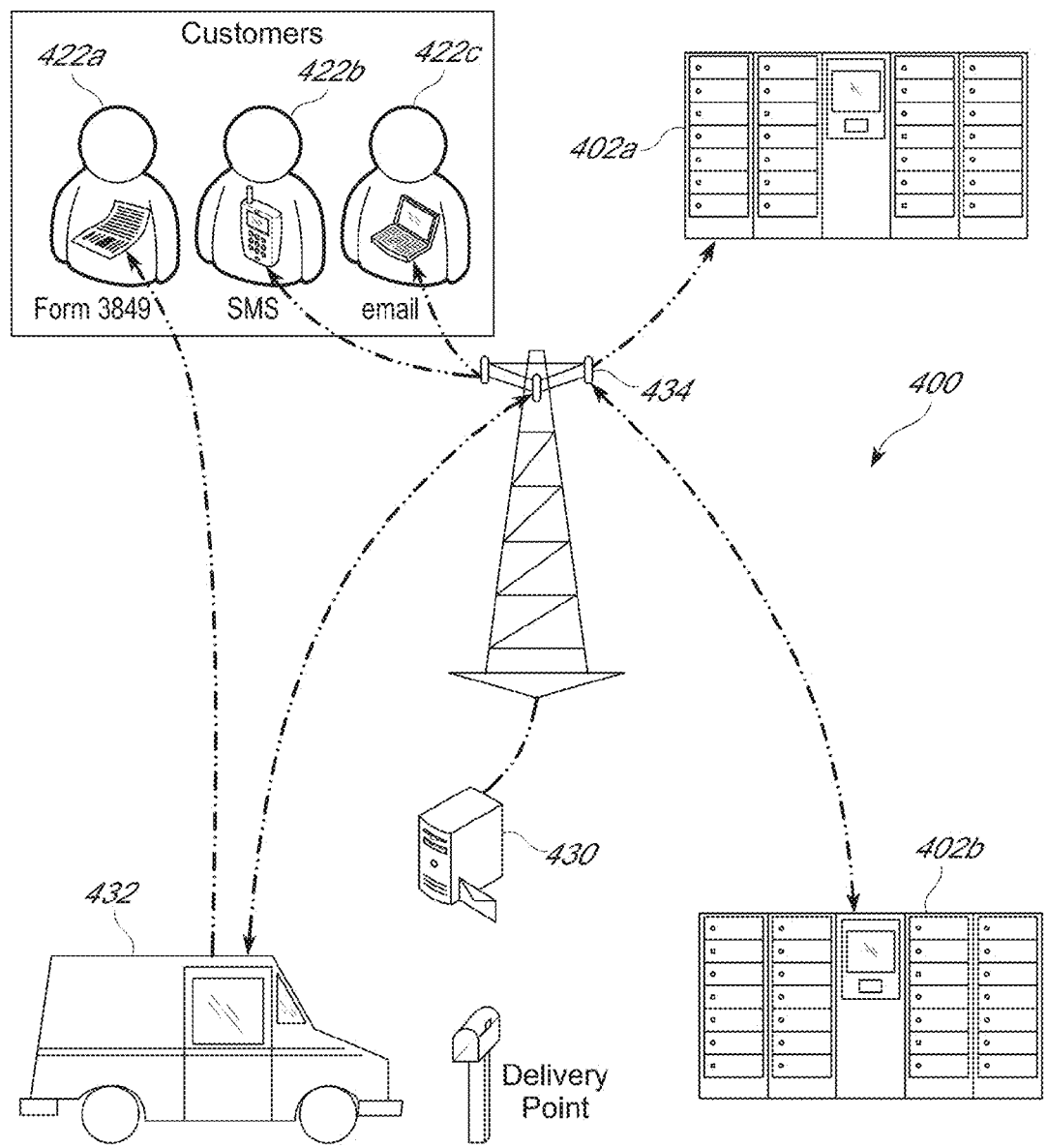

FIG. 4A depicts a schematic illustration of one embodiment of the storage unit system 400. As depicted in FIG. 4A, the storage unit system 400 comprises a first storage unit 402a, a second storage unit 402, and a central server 430. The central server 430 depicted in FIG. 4A comprises a variety of features, including the databases and capabilities of the system as discussed in relation to FIG. 4. Central server 430 provides a central control station for the system 400. For example, as requests for storage receptacle availability are received either at individual storage units 100 or via the network 424, the request may be provided to are received As further depicted in FIG. 4A, the storage units 402a, 402b and the central server 430 are communicatingly connected. This communicating connection is wired or wireless, or a combination thereof. As depicted in FIG. 4A, this connection includes a transmission feature 434 capable of sending and receiving wireless communications.

As further depicted in FIG. 4A, the storage unit system 400 is communicatingly connected with a plurality of customers 422a, 422b, 422c, and an agent 432. As further depicted, the communication to the customers 422a, 422b, and 422c may be achieved through a variety of means, including, for example, an electronic communication such as an email 422c or an SMS 422b, or through delivery of written notification 422a.

In some embodiments, the customer 422 receives and transmits information to the storage unit system 422. In some embodiments, the customer 422 accesses the storage unit system 422 using a computing device via the network and request information relating to the status of a delivery, the location of an item, the availability of specified storage units 402, locations of storage units 402, or any other desired information.

In some embodiments, and as depicted in FIG. 4A, an agent 432 delivering items can communicate with customers 422a, 422b, 422c, with a central server 430 and with other components of the storage unit system 400. In some embodiments, this communication is via a wireless device, such as, for example, a handheld device, a Smartphone, a mobile device, or any other device capable of wireless network communications. In some embodiments, the wireless device communicates with the storage unit system via, for example, a transmission feature 434. Advantageously, such communication may allow an agent to receive and transmit realtime information relating to the availability status of storage units 402 and relating to the delivery of items.

In some embodiments, the customer 422 may access the central server 430 via network 424 via a user interface existing on network 424. Using the user interface, the customer 422 may check availability of one or more storage receptacles 132 in one or more storage units 100 located in a user-specified geographic area, capable of receiving a particular item. The customer 422 receives a report of storage units available to receive the particular item. The customer 422 may reserve a particular storage receptacle 132 via the user interface over the network, and then the customer 422 may physically go to the particular storage receptacle 132 and deposit an item as described herein.

In some embodiments, a storage unit 100 containing an item designated for an intended recipient can send a notification or information about the item to the central server 430, which can then route the notification or information to the customer 422 for whom the item is designated or intended. In some embodiments, the agent 432 may communicate its position continuously or at periodic intervals to the central server 430. The central server may also receive periodic updates about deposits and items in storage receptacles 132. When the central server 430 receives information regarding an item to be picked-up from or delivered to a particular storage unit 100, the central server 430 sends a notification to the agent 432 directing the agent to pick up an item from or deliver an item to a particular storage unit 100. This notification may be coordinated by the central server 430 such that notifications are preferably sent to the agents 432 who are nearest in proximity to the storage unit containing the item to be picked-up or the storage unit to which the item is to be delivered. In some embodiments, the central server notifies the agent 432 whose planned route passes in proximity to the storage unit 100 where the item is to be picked up or delivered.

Figure 5:
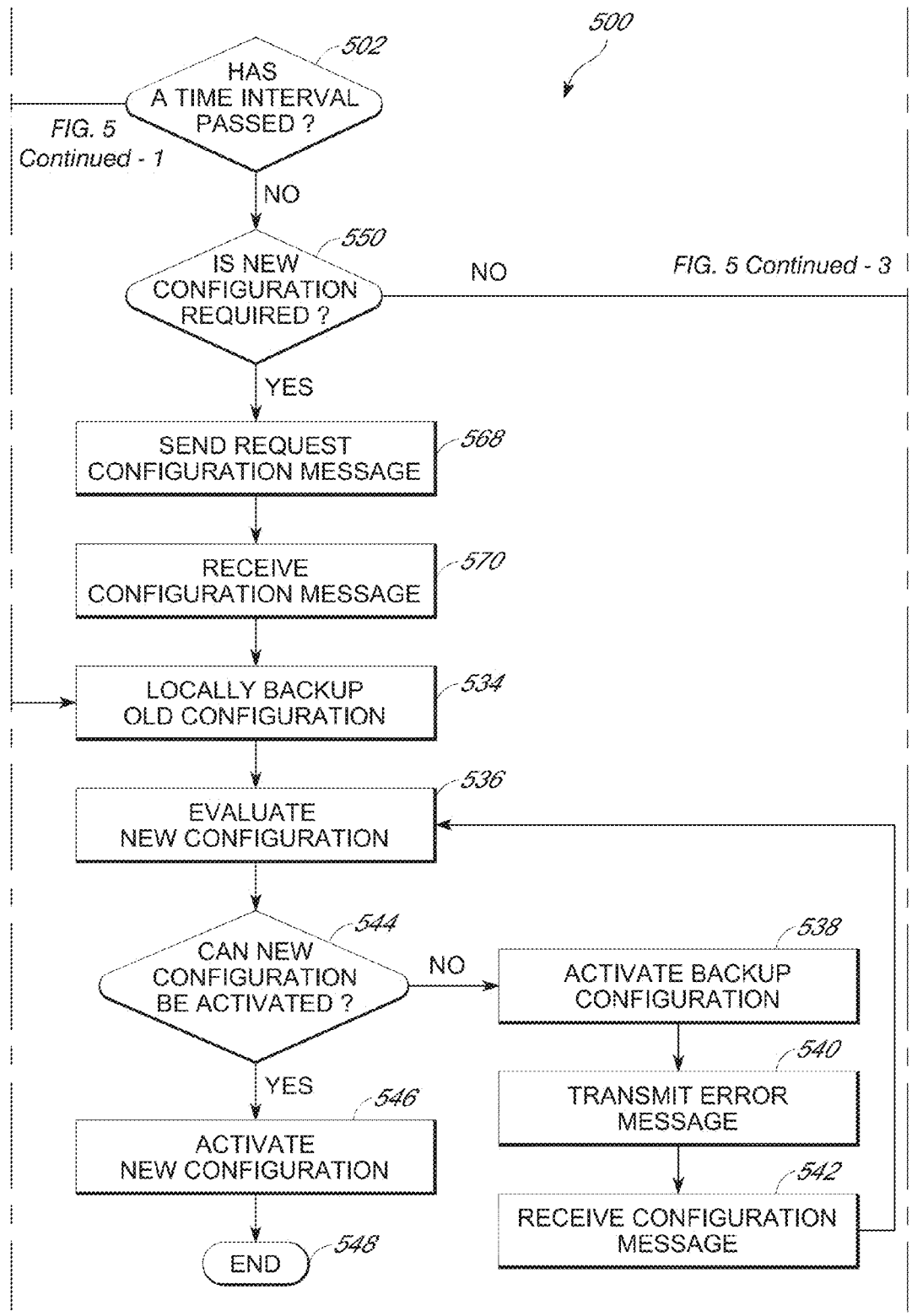
FIGS. 5-5F depict flow charts of different embodiments of operation of the control of the storage unit system.
Figure 5:
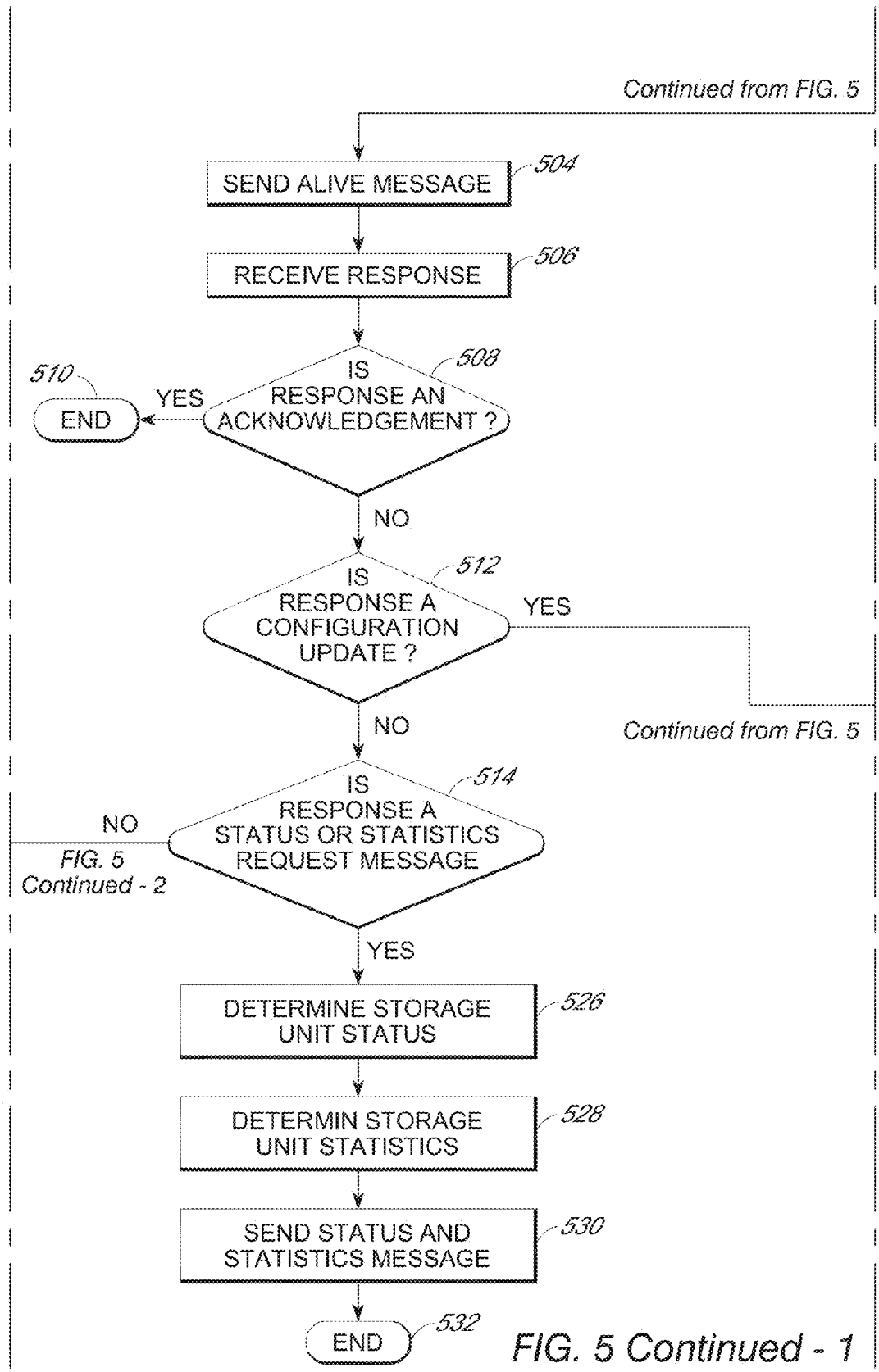
Figure 5:
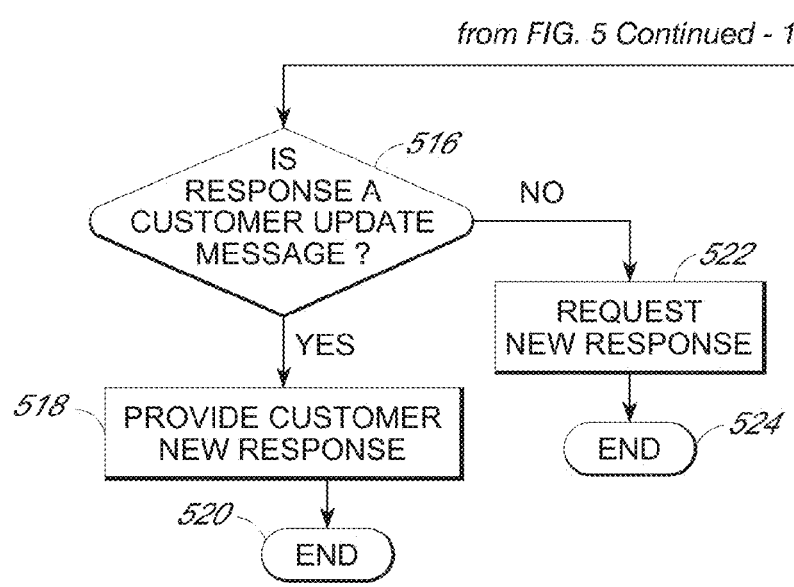
Figure 5:
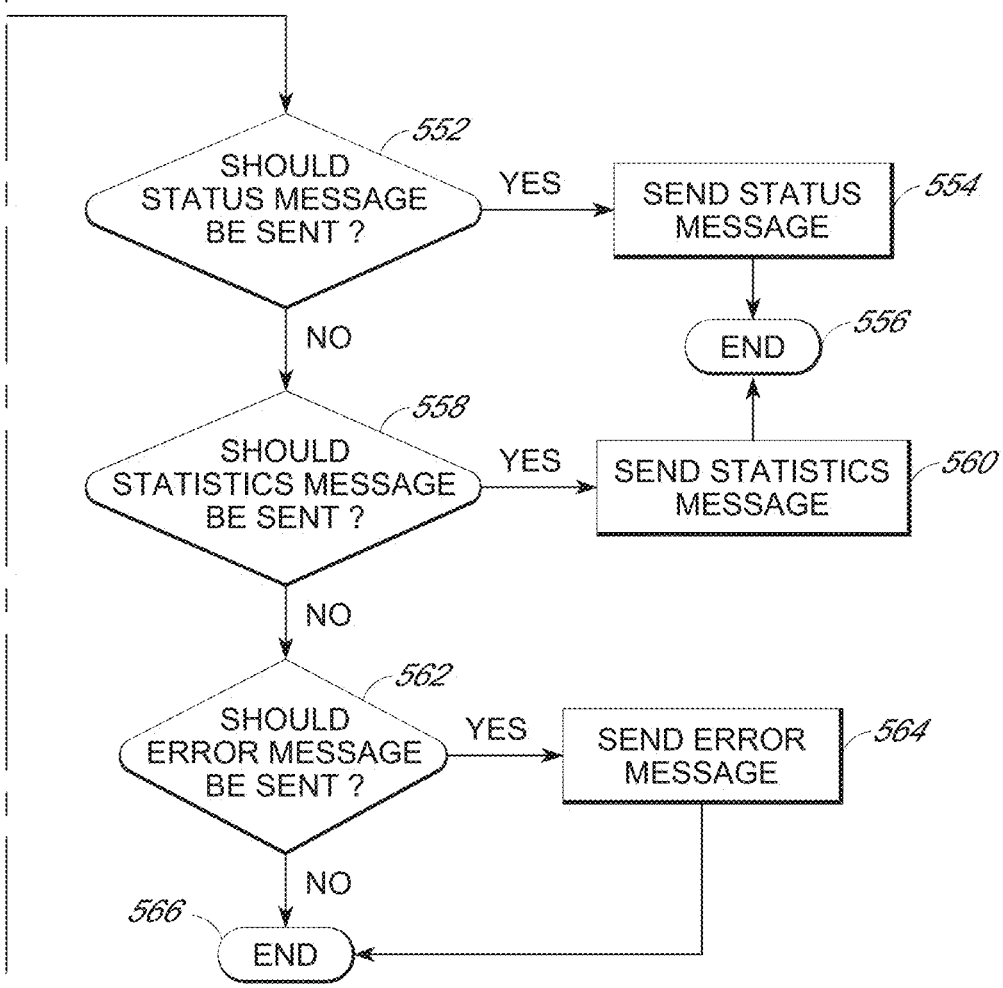

FIG. 5 depicts one embodiment of a process 500 of controlling a storage unit system 100. In some embodiments, the process 500 is performed at the storage unit 100, and a cooperating process is performed by computing resources elsewhere in the storage unit system 400. Although FIG. 5 depicts steps specifically performed by the storage unit, a person of skill in the art will recognize that any other component of the storage unit system 400 can perform similar or identical steps. As described herein, when messages are sent and/or received, the messages may originate in the control unit 144 or in the central server 430, as the circumstances require. The central server 430 may control the process 500, and may direct the operations of other components, including the sending of messages by the control units 144. The central server 430 may facilitate message and information sending between various components of the storage unit system 400 according to the processes and methods described herein.

The process 500 moves to decision state 502 and determines if a designated time interval has passed. The time interval may be any specified time interval. In some embodiments, the time interval may be, for example, 1 second, 1 minute, 5 minutes 15 minutes, 30 minutes 1 hour, 12 hours, 1 day, 1 week, or any other desired time interval. The time interval may be determined by a number of factors, including, for example, the frequency with which customers use the storage unit 100, the frequency with which software updates of hardware maintenance is required, the location of the storage unit 100, the system bandwidth and/or processing capabilities, and/or any other factor.

If the time interval has passed, an alive message is sent as depicted at block 504. This message indicates that the storage unit 100 is properly functioning, and has no specific needs.

After sending the alive message at block 504, the process 500 moves to block 506 and await receipt of a response to the alive message. Once the response to the alive message is received, the process 500 moves to decision state 508 and determines if the response is an acknowledgement. An acknowledgement may comprise a message indicating that the alive message was received. In some embodiments, an acknowledgement may include further instructions for execution by the storage unit. In some embodiments, the acknowledgement may not include any instructions. If the response is an acknowledgment, then the process terminates at block 510.

If the response is not an acknowledgement, then the process moves to decision state 512 and determines if the response is a configuration update. A configuration update may provide a software update or software patch to maintain and improve the operating system of the storage unit 100.

If the response is not a configuration update, the process moves to decision state 514 and determines if the response is a status or statistics request message. In some embodiments, a status or statistics request message is periodically requested to provide an update on usage of the storage unit 100, usage of the individual storage receptacles 132 of the storage unit 100, any maintenance requests, present availability of storage receptacles, and/or any other information relating to the storage unit.

If the message is not a status or statistics request message, the process moves to decision state 516 and determines if the response is a customer update message. A customer update message may provide, for example, an update relating to customers who have used the storage unit 100. This may include, for example, user identification information, user passwords, user pictures, and identification of user transactions with the storage unit 100 such as, for example, the picking-up or depositing of one or several items.

If the message is a customer update message, the process moves to block 518 and a customer update is provided. After providing the customer update, the process terminates at block 520. Returning again to block 516, if the response is not a customer update message, the process moves to block 522 and requests a new response as the response was not of an expected type, in an expected format, or otherwise not readable. After requesting a new response, the process terminates at block 524.

Returning again to block 514, if the response is a status or statistics request message, the process moves to block 526 and determines the status of the storage unit 100. This may include, for example, determining the availability of storage receptacles 132, determining whether any maintenance or updates are required, determining how many storage receptacles 132 are occupied, determining how many storage receptacles 132 are reserved, and making any other determination relating to the status of the storage unit 100.

The process then moves to block 528 and determines storage unit 100 statistics. These statistics may include, for example, the average number of available storage receptacles 132, the average number of occupied storage receptacles 132, the average number of reserved storage receptacles, the number of customers who have used the storage receptacle, the average number of customers using the storage receptacle in a specified time period, the actual number of customers using the storage receptacle in a specified time period, the average amount of time an item is left in the storage receptacle 132 before being picked-up, or any other desired statistic relating to the storage unit 100.

The process 500 then moves to block 530 and the status and statistics message is sent. In some embodiments, the status and statistics messages are sent to the central server 430. The process 500 then terminates at block 532.

Returning again to block 512, if the process determines that the response is a configuration update, then the process moves to block 534 and creates a local backup of the old software configuration. This backup may be of the entire software configuration, or portions of the software configuration that will be replaced by the present configuration update. After backing-up the old configuration, the process 500 moves to block 536 and evaluates the new configuration. This evaluation may be configured to determine which portions of the software configuration will be updated, to detect any obvious errors in the new configuration, and to screen the new configuration for security threats, such as, malware and/or viruses.

The process then moves to decision state 544 and determines if the new configuration may be activated. If the new configuration may be activated, the process moves to block 546 and the new configuration is activated. The process then terminates at block 548.

If the process determines that the new configuration cannot be activated, the process moves to block 538 and the old, backup configuration is activated. After activating the backup configuration, the storage unit transmits an error message indicating that the new configuration cannot be activated at block 540. The process 500 then moves to block 542 and the storage unit 100 receives a new configuration message. The process then returns to block 536 and the new configuration is evaluated. From this block, the process moves to block 544 and proceeds as described above.

Returning again to block 502, if the designated time interval has not passed, the process moves to decision state 550 and determines if a new software configuration is required. If no new software configuration is required, then the process moves to decision state 552 and determines if a status message should be sent. A status message may comprise information relating to, for example, the status of the storage unit 100 and the status of the storage receptacles 132. This may include information relating to any required maintenance, the availability of storage receptacles 132, the number and identification of storage receptacles 132 occupied by an item, the number and identification of storage receptacles 132 reserved for receiving an item, the length of time that items have been in the occupied storage receptacles 132, and any other desired status information.

If the process 500 determines that a status message should be sent, then the message is sent at block 554, and the process terminates at block 556.

If a status message should not be sent, as decided at decision state 552, the process moves to decision state 558 and determines if a statistics message should be sent. A statistics message may include, for example, the average number of available storage receptacles 132, the average number of occupied storage receptacles 132, the average number of reserved storage receptacles, the number of customers who have used the storage receptacle, the average number of customers using the storage receptacle in a specified time period, the actual number of customers using the storage receptacle in a specified time period, the average amount of time an item is left in the storage receptacle 132 before being picked-up, or any other desired statistic relating to the storage unit 100. If the statistics message should be sent, then the process moves to block 560 and the message is sent and the process terminates at block 556.

If a statistics message should not be sent, then the process moves to decision state 562 and determines if an error message should be sent. An error message may report a malfunction of the hardware or software of the storage unit 100. In some embodiments, for example, an error message is sent when a door 136 of a storage receptacle 132 cannot be shut and/or re-secured. Similarly, in some embodiments, an error message is sent when some aspect of the software fails to properly operate. If an error message should be sent, then the process moves to decision state 564 and the error message is sent, after which the process terminates at block 566. An error message may be sent if a printer is out of paper, a scanner fails, a storage receptacle 132 fails, high heat or humidity are detected, vandalism detected, power failure, or other error conditions.

Returning again to block 550, if a new configuration is required, the process moves to block 568 and a request configuration message is sent. The process then moves to block 570 and a configuration message is received. The process then proceeds to back up the old configuration as depicted at block 534 and to evaluate the new configuration at block 536. The process then proceeds to decision state 544 and proceeds through the flow-chart as discussed above.

Figure 5A:
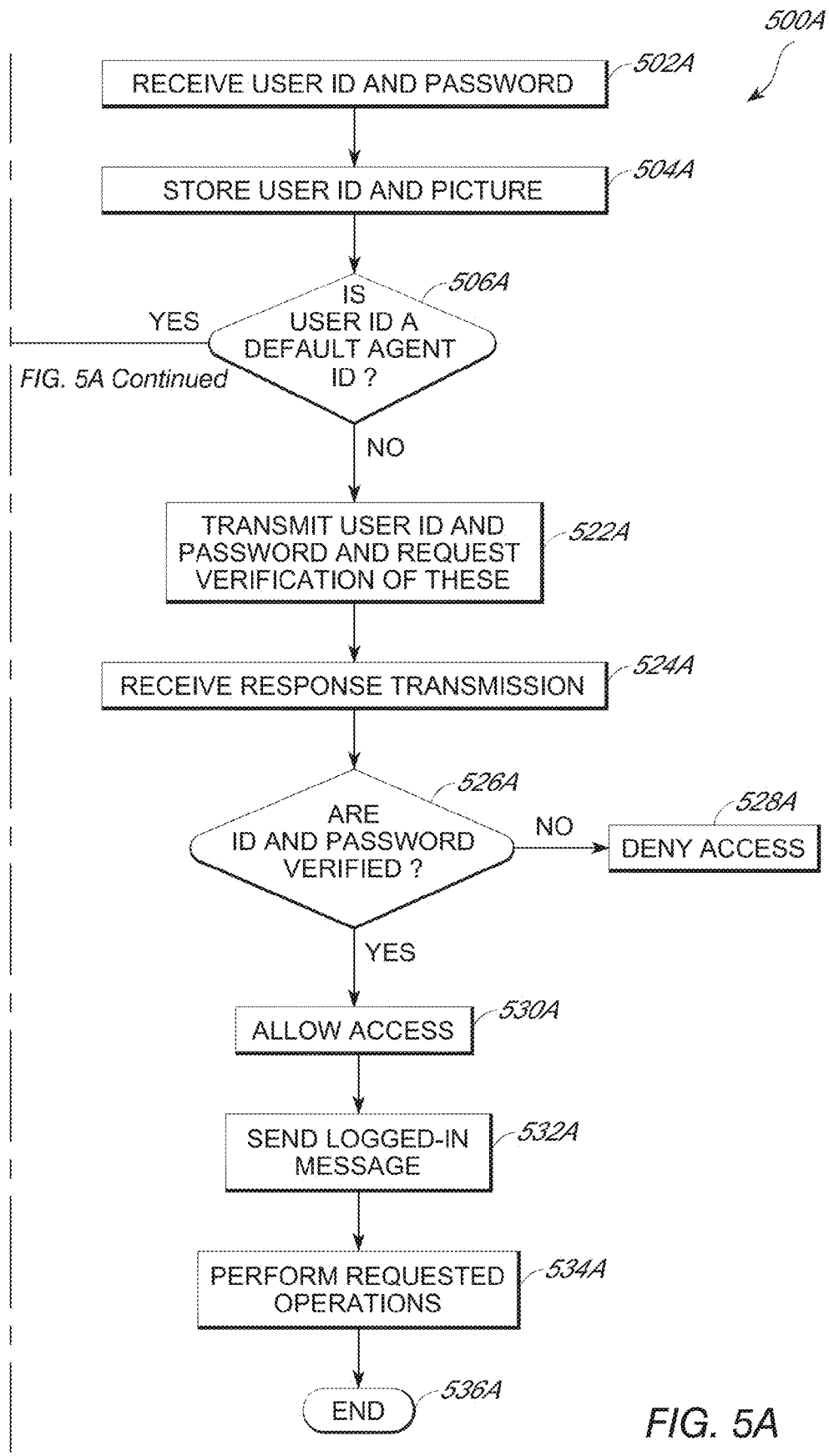
Figure 5A:
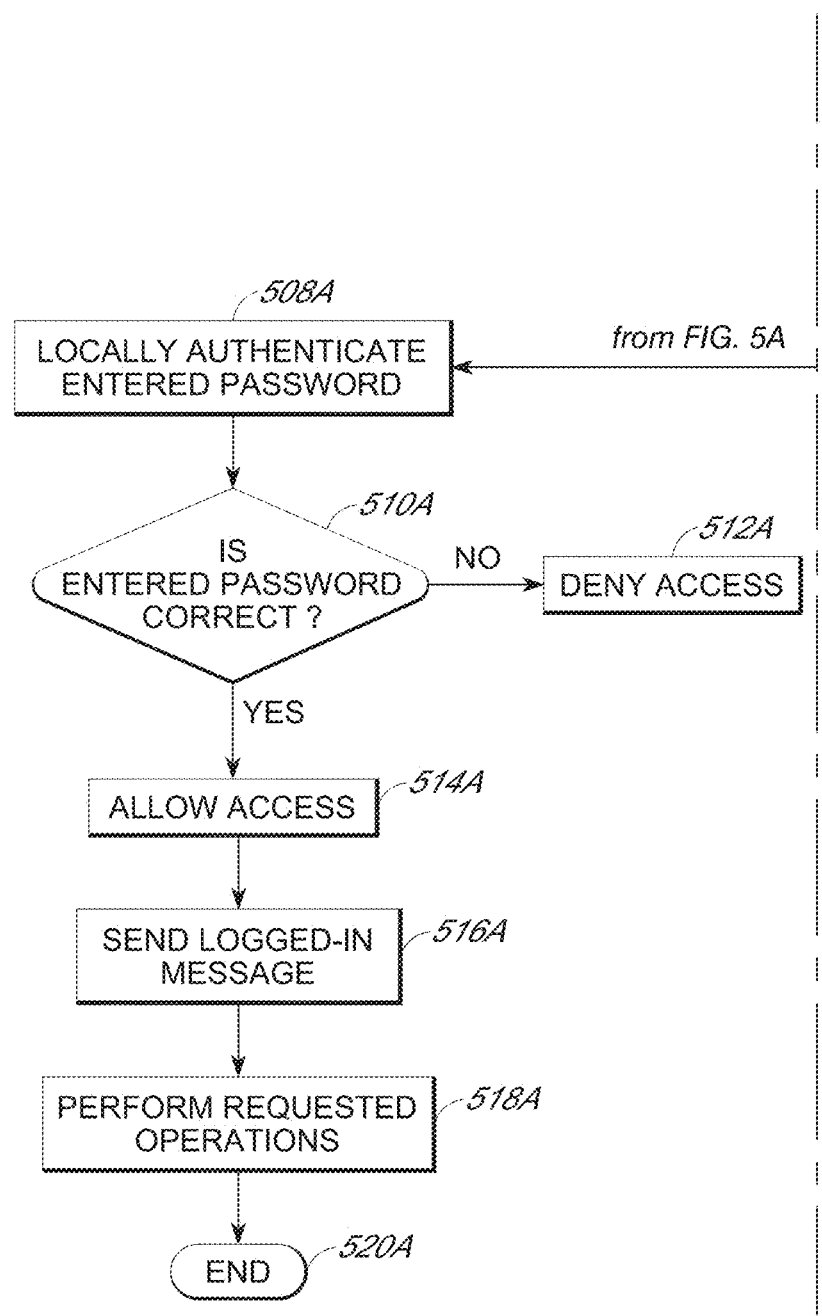

Some embodiments of a storage unit system 400 include security features to protect deposited items and to avoid accidental removal of the wrong item. One of these features is the user identification system. One process 500A used for user identification is depicted in FIG. 5A.

In some embodiments, the storage unit system 400 includes security features. For example, a storage unit 100 may comprise an accelerometer configured to identify an abrupt, sharp, or other unexpected movement of the storage unit 100, and communicate this acceleration as evidence of tampering or attempted tampering. The cameras associated with storage unit 100, including the camera on the control cabinet 146 and on the roof 124 may be motion activated and provide monitoring of transactions. These security measures may be provided to meet stringent standards as requested or required by a particular organization, such as, for example, the United States Postal Service. In some embodiments, the storage unit system, specifically the storage units 100, may be configured to meet underwriting laboratory (UL) requirements, ergonomic requirements, or specific industry standard requirements.

Process 500A begins at block 502A when the user identification and password are received. At block 504A the entered user identification and picture captured at the time of entry of the user identification are stored.

The process then proceeds to decision state 506A and determines whether the customer identification is a default agent identification. The decision may be based on a list of agent identification stored on database 171 in memory 170.

If the identification is an agent identification, then the process moves to block 508A and the identification and entered password are locally authenticated by the storage unit 100 where the identification and password were entered.

The process then proceeds to decision state 510 and determines if the entered password is correct. If the password is incorrect, the process moves to block 512A and access to the storage unit 100 is denied.

If the entered password is correct for the entered agent identification, then the process moves to block 514A and access is allowed. The process then moves to block 516A and the storage unit 100 transmits a logged-in message to the central management system 404. The logged-in message may include the date and time the user logged in to the storage unit. In some embodiments, the logged-in message may include the user identification, password, and/or image captured at the time of user log-in.

The process 500A then moves to block 518A and the storage unit performs the operations requested by the agent and outlined throughout the present specification. The process 500A then ends at block 520A.

Returning again to block 506A, if the user identification is not a default agent identification, then the process moves to block 522A and transmits the user identification and password to the customer directory 412 and requests verification of the identification and password by the customer directory 412. The process then moves to block 524A and receives the response transmission.

The process then moves to decision state 526A and determines if the identification and password are verified. If the identification and password are not verified, the process moves to block 528A and access to the storage unit is denied. In some embodiments, the identification and password are verified by comparing the transmitted user identification and password to prestored user identification and password contained in customer directory 412. A user may provide the prestored user identification and password upon signing up to use the storage system 400, or by registering as a customer of the storage system 400.

If the identification and password are verified, the process moves to block 530A and access to the storage unit is allowed. The process then moves to block 532A and the storage unit 100 sends a logged-in message to the central management system 404. The logged-in message may include the date and time the user logged in to the storage unit. In some embodiments, the logged-in message may include the user identification, password, and/or image captured at the time of user log-in.

The process 500A then moves to block 534A and the storage unit performs the operations requested by the user and outlined throughout the present specification. The process 500A then ends at block 536A.

Figure 5B:
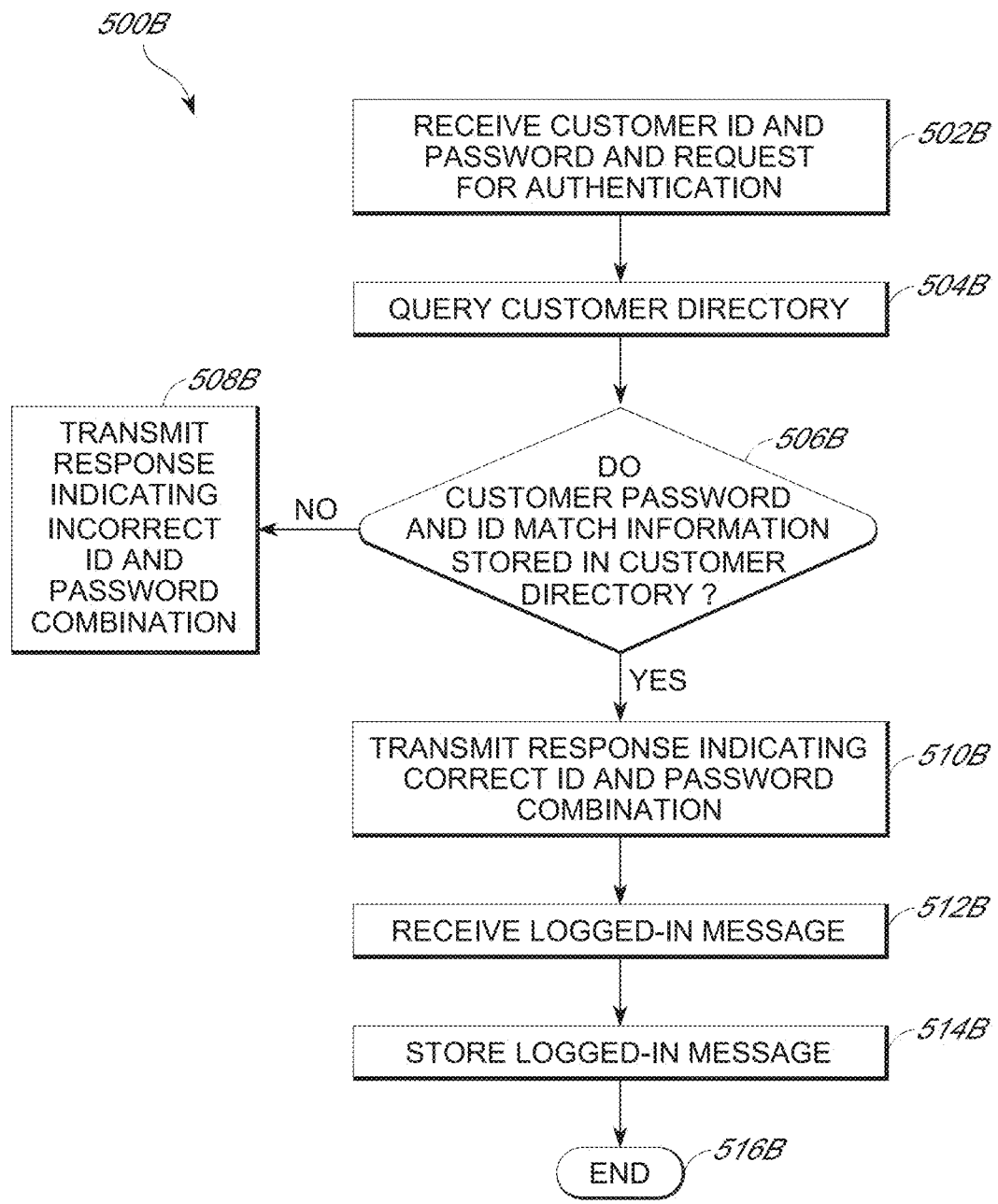

FIG. 5B depicts one embodiment of the process 500B of customer verification performed using the customer directory 412. The process 500B begins at block 502B when the customer identification and password and a request for authentication of the customer identification and password are received. The process 500B moves to block 504B and the customer directory 412 is queried.

The process 500B then moves to decision state 506B and determines if the customer identification and password match information stored in the customer directory 412. If the customer identification and password do not match the information stored in the customer directory, then the process 500B moves to block 508B and a response is transmitted to the storage unit 100 that indicates that the identification and password combination are incorrect.

If the customer identification and password match information in the customer directory 412, then the process 500B moves to block 510B, and the response is transmitted to the storage unit 100 indicating that the identification and password combination is correct.

The process 500B then moves to block 512B and a logged-in message is received from the storage unit 100 indicating that the customer has successfully logged-in. The logged-in message may include information relating to the user and the log-in, including, for example, the customer password, customer identification, customer image captured during log-in, date of log-in, time of log-in, or any other information related to the log-in. The process 500B then moves to block 514B and the logged-in message is stored, and then the process terminates at block 516B.

Figure 5C:
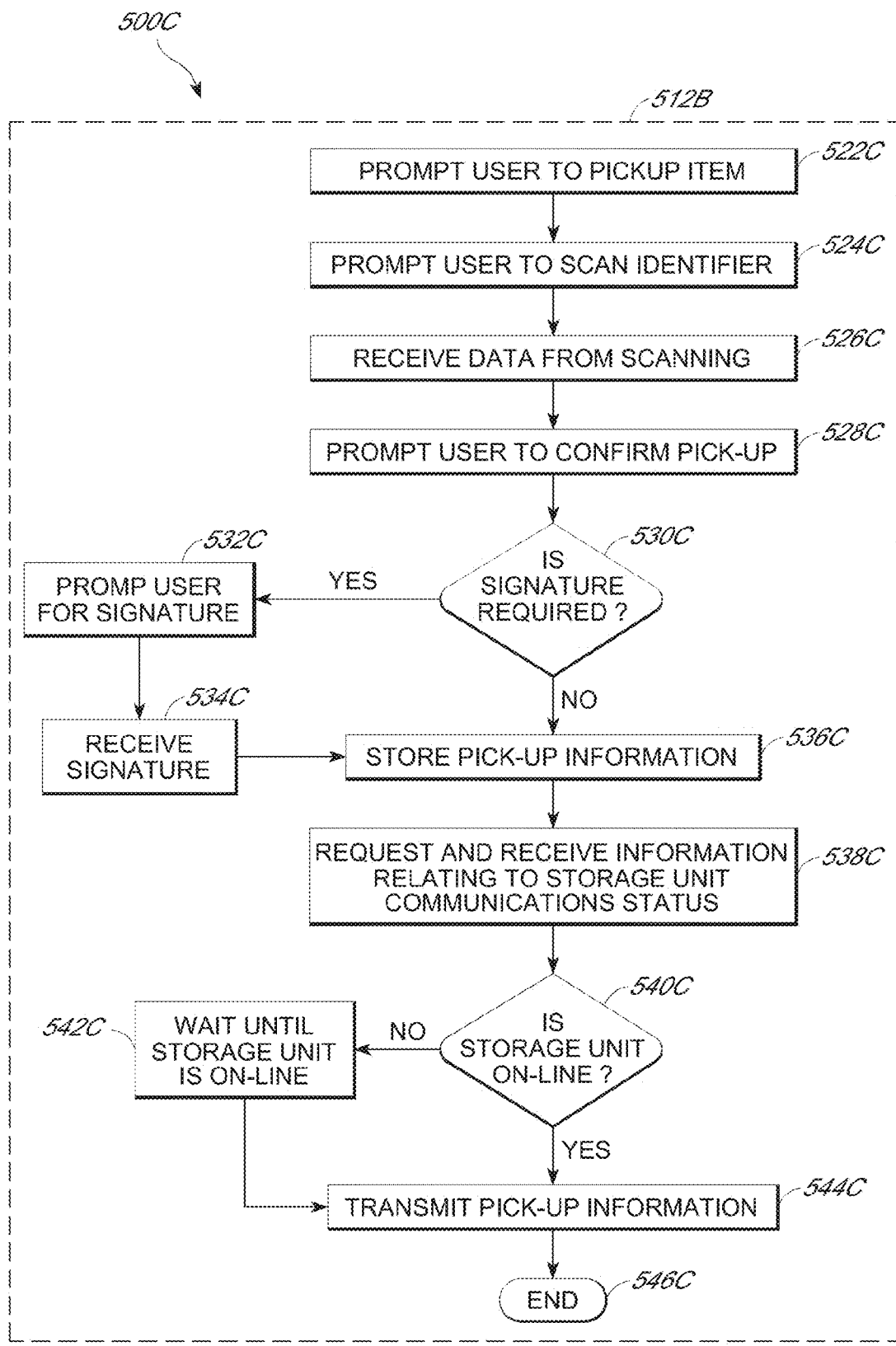

FIG. 5C provides further detail into the steps of some processes used in picking-up an item from a storage unit 100 when the storage unit 100 is functioning as part of a storage unit system 400. Specifically, FIG. 5C depicts one embodiment of a process 500C for requesting confirmation of item pick-up as depicted in block 312B of FIG. 3B. Accordingly, the steps of the present process 500C occur within block 312B of FIG. 3B.

As depicted in FIG. 5C, the process 500C for requesting confirmation of item pick-up begins at block 522C by prompting the user to pick-up the item. This prompt may be, for example, in addition to an indication of which storage receptacle 132 contains the item, and in addition to opening of the storage receptacle 132 containing the item.

After prompting the user to pick-up the item, the process 500C advances to block 524C where the user is prompted to scan an identifier on the item. In some embodiments, this may comprise, for example, scanning a computer readable code, receiving a radio frequency transmission, scanning a text string, or scanning any other identifying feature of the item.

After prompting the user to scan the identifier as depicted in block 524C, the process 500C advances to block 526C, where the storage unit 100 receives data from the scanning of the identifier.

After receiving data from the scanning of the identifier as depicted in block 526C, the storage unit 100 prompts the user to confirm the pick-up of the item at block 528C. The process 500C then advances to decision state 530C where it determines whether a user signature is required. If a signature is required, the storage unit 100 prompts the user to provide a signature as depicted in block 532C. The storage unit then receives the signature as depicted in block 534C.

After receiving the signature as depicted in block 534C, or after determining that no signature is required in decision state 530C, the process 500C moves to block 536C and stores pick-up-information. This information may include, for example, the user identification, the user password, the image captured at the time of log-in, the user image captured at the time of pick-up or pick-up confirmation, the item number, and/or any other information relating to the item pick-up.

The process 500C then moves to block 538C and requests and receives information relating to the communications status of the storage unit 100. The process then proceeds to decision state 540C and determines whether the storage unit is online and able to communicate with other components of the storage unit system 400. If the storage unit is not online, the process moves to block 542C and waits until the communications with the storage unit system 400 have been reestablished and the storage unit 100 is online. After the storage unit 100 returns online, or if the storage unit is online in decision state 540C, the process moves to block 544C and the storage unit transmits the confirmation to the other components of the storage unit system 400. The process then terminates at block 546C.

Figure 5D:
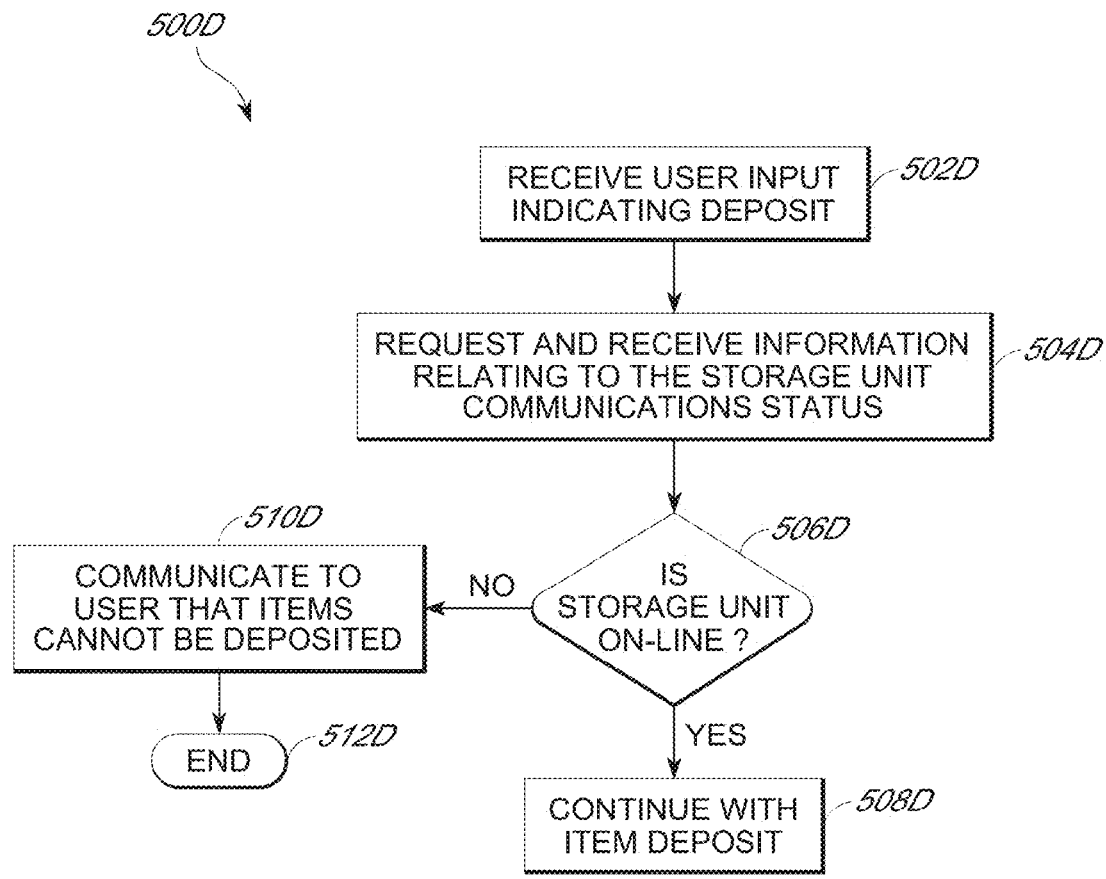

FIG. 5D depicts one embodiment of aspects of the process 500D for depositing items at a storage unit 100 that is functioning as part of a storage unit system 400. The process 500D begins at block 502D when the storage unit 100 receives a user input indicating intent to deposit an item. The process 500D moves to block 504D and requests and receives information relating to the storage unit 100 communications status, and specifically to the ability of the storage unit 100 to communicate with other components of the storage unit system 400.

The process then moves to decision state 506D and determines if the storage unit 100 is online and may communicate with other components of the storage unit system 400. If the storage unit is online, the process moves to block 508D, and the user continues with the deposit of the item following processes outlined in this specification.

If the storage unit 100 is not online and cannot communicate with other components of the storage unit system 400, then the process moves to block 510D and communicates to the user that items cannot be presently deposited. The process then terminates at block 512D.

Figure 5E:
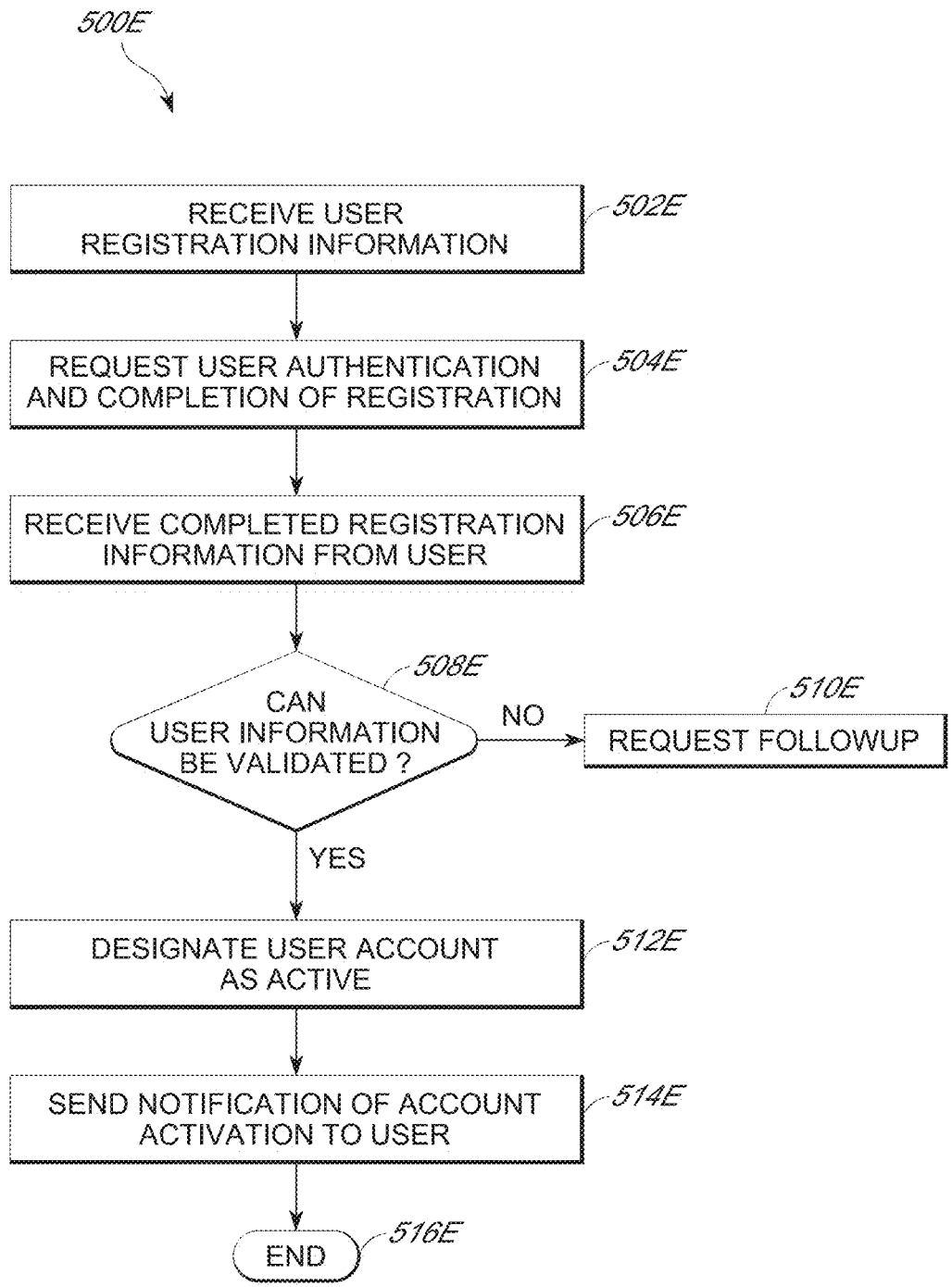

FIG. 5E depicts one embodiment of a process 500E for registering users to allow access to the storage units 402 of the storage unit system 400. Process 500E moves to block 502E and receives user registration information. In some embodiments, user registration information may be received in electronic or non-electronic form. In some embodiments, a user may fill out a registration form. This form may be, for example, delivered to an agent of the storage unit system 400 who can verify the user information. In another embodiment, the user can fill out and submit an electronic form located, for example, on a website. This user information may include, for example, a desired username, a desired password, the user's name, the user's address, the user's preferred storage unit 402 locations, the user's email address, the user's telephone number, and any other desired information.

The process then moves to block 504E and requests user authentication and completion of registration. The request may be made via any form of communication, including electronic communication, such as, for example, email, SMS, telecommunications, mail, or any other desired form of communication. The request for authentication and completion of registration may request verification of the already received information, further information about the user, and that the user contacts an agent of the storage unit system 400 for verification of user provided information.

The process then moves to block 506E and receives the completed and authenticated registration information from the user. The process then moves to decision state 508E and determines if the user information may be validated. In some embodiments, the user information is validated by comparison of user submitted information to public or secure information relating to the user. In some embodiments, the user information is validated by a comparison to secure information maintained by a postal agency such as, for example the United States Postal Service.

If the user information cannot be validated, the process 500E moves to block 510E and follow-up is requested from an agent 432 in order to determine whether the user information was correct, or whether there is an error in the system. If the used information is validated, process 500E proceeds to block 512E and the user account is designated as active. The process then moves to block 514E and notification of account activation is sent to the user. Following notification, the process ends in block 516E. In some embodiments, this may include sending a user identification and user password for accessing the storage units 400. In some embodiments, this includes providing a computer readable card or object containing information uniquely identifying the user. A person of skill in the art will recognize that a variety of methods of identifying a user may be used and the present disclosure is not limited to any specific form of user identification.

Figure 5F:
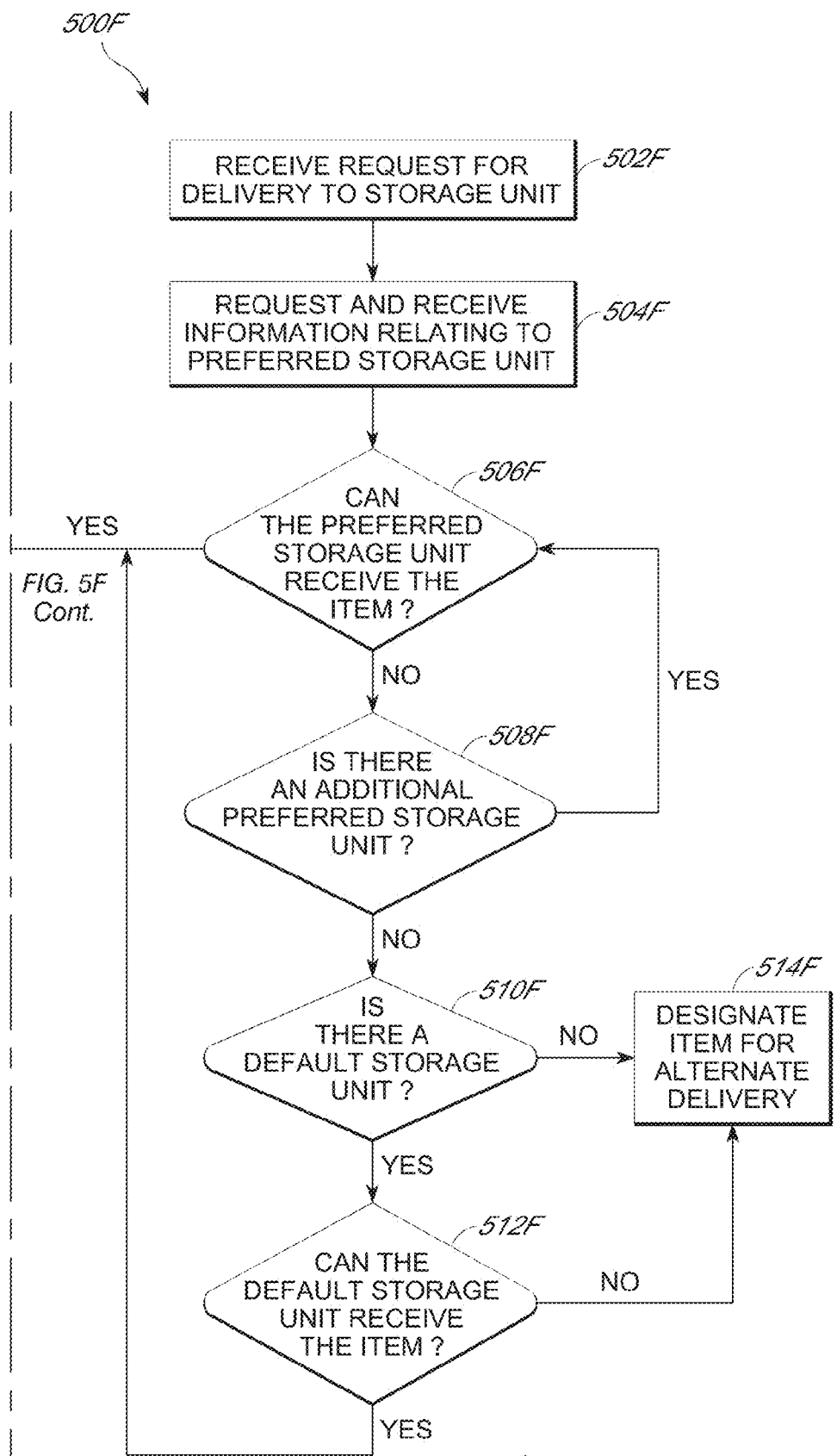
Figure 5F:
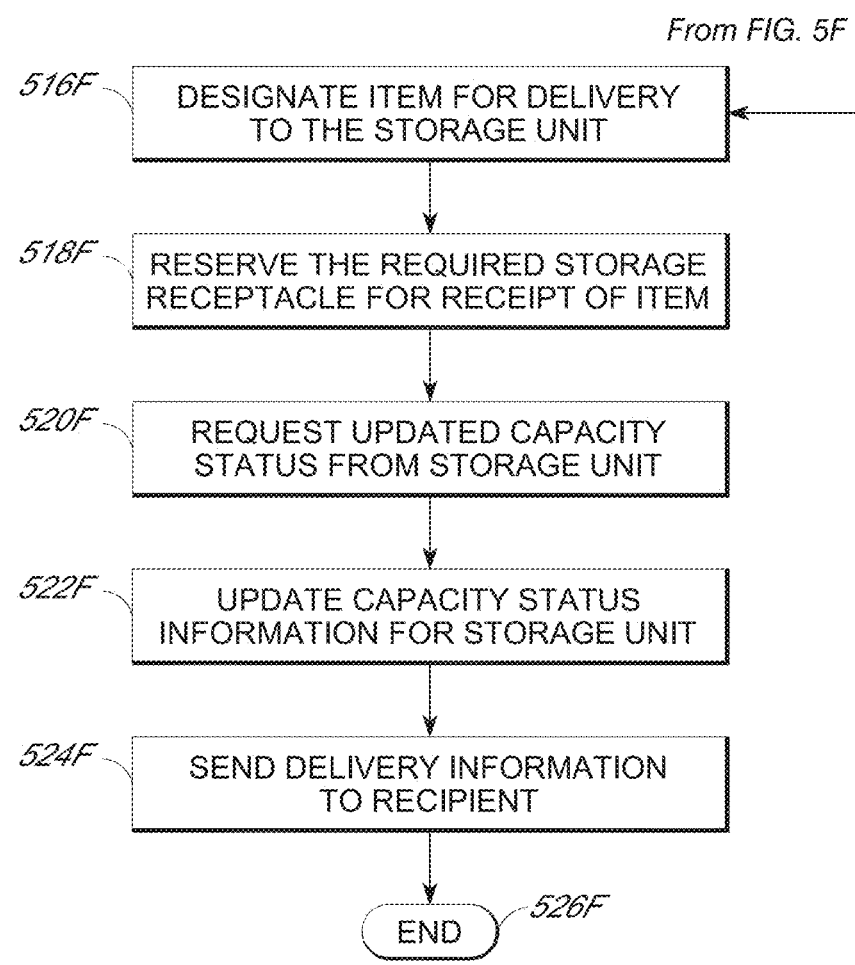

In some embodiments, the storage unit system 400 facilitates the delivery of an item by tailoring delivery to a recipient's delivery preferences. The delivery preferences of a recipient may be provided to the storage unit system 400 upon deposit of the item. In some embodiments, the delivery preferences of a recipient may be provided upon registering as a customer or user of the storage unit system 400, and the delivery preferences may be stored in the customer data 412. FIG. 5F depicts one embodiment of process 500F used in connection with a storage unit system for delivering an item. The process 500F begins at block 502F and receives a request for delivery of an item to a storage unit 402. The process 502F then proceeds to block 504F and requests and receives information relating to a preferred storage unit 402. The preferred storage unit may be indicated by a user or customer upon depositing the item, or by the user when registering or signing up to use the storage unit system 412. In some embodiments, a customer may specify one or more preferred storage units 402 for receiving item delivery. In some embodiments, these preferences are ranked from most preferential to least preferential. In some further embodiments, a user is assigned a default storage unit 402. The default storage unit 402 may comprise a vast number of storage receptacles 132, and may be located, at, for example, a post office. Advantageously, evaluation of the availability of preferred storage units 402 based on their preference rank results in placement of the item in the most preferred storage unit 402 with an available storage receptacle 132 of adequate size to hold the item.

The process 500F then moves to block 506F and determines if the preferred storage unit can receive the item. If the evaluated storage unit 100 cannot hold the item, the process 500F moves to decision state 508F and determines if the customer has an additional preferred storage unit 402. If the customer has an additional preferred storage unit, then the process returns to block 506F and determines if that next preferred storage unit 402 can receive the item.

Returning to decision state 508F, if there are no additional preferred storage units, the process 500F moves to decision state 510F and determines if a default storage unit 402 is available. If a default storage unit 402 is available, then the process 500F moves to decision state 512F and determines if the default storage unit 402 can receive the item. If the default storage unit 402 cannot receive the item, or if there is no default storage unit 402, then the process moves to block 514F and the item is designated for alternate delivery. In some embodiments, alternate delivery may comprise in person delivery, or delayed delivery when one of the preferred or default storage units 402 can receive the item.

Returning again to decision state 512F, if the default storage unit can receive the item, or if one of the preferred storage units can receive the item, then the process moves to block 516F and the item is designated for delivery to the available storage unit 402.

The process then proceeds to block 518F and reserves the required storage receptacle 132 in the desired storage unit 402 for receipt of the item. In some embodiments, this reservation may be made through communication with the central management system 404. In some embodiments, the reservation is made by communication with the storage unit 402 to which the item will be delivered. In some embodiments, the reservation is made by a communication to both the storage unit 402 to which the item will be delivered and to the central management system 404. The reservation is communicated to central server 430, which maintains a database of the status of each storage receptacle 132 within storage unit system 400. The status includes which storage receptacles 132 are available, which are occupied, and which have been reserved, thus preventing the storage unit system 400 from reserving a particular storage receptacle 132 to more than one user or customer.

The process 500F then proceeds to block 520F and requests updated capacity status from the storage unit 402 to which the item will be delivered. The updated capacity status is then stored in the database 414 in the central management system 404, updating the capacity information for the storage unit as depicted in block 522F.

The process then moves to block 524F and communicates delivery information to the recipient. This information may be communicated with any communication method, including, for example, electronic communication, telecommunication, or postal communication, and the process terminates at block 526F.

Figure 6:
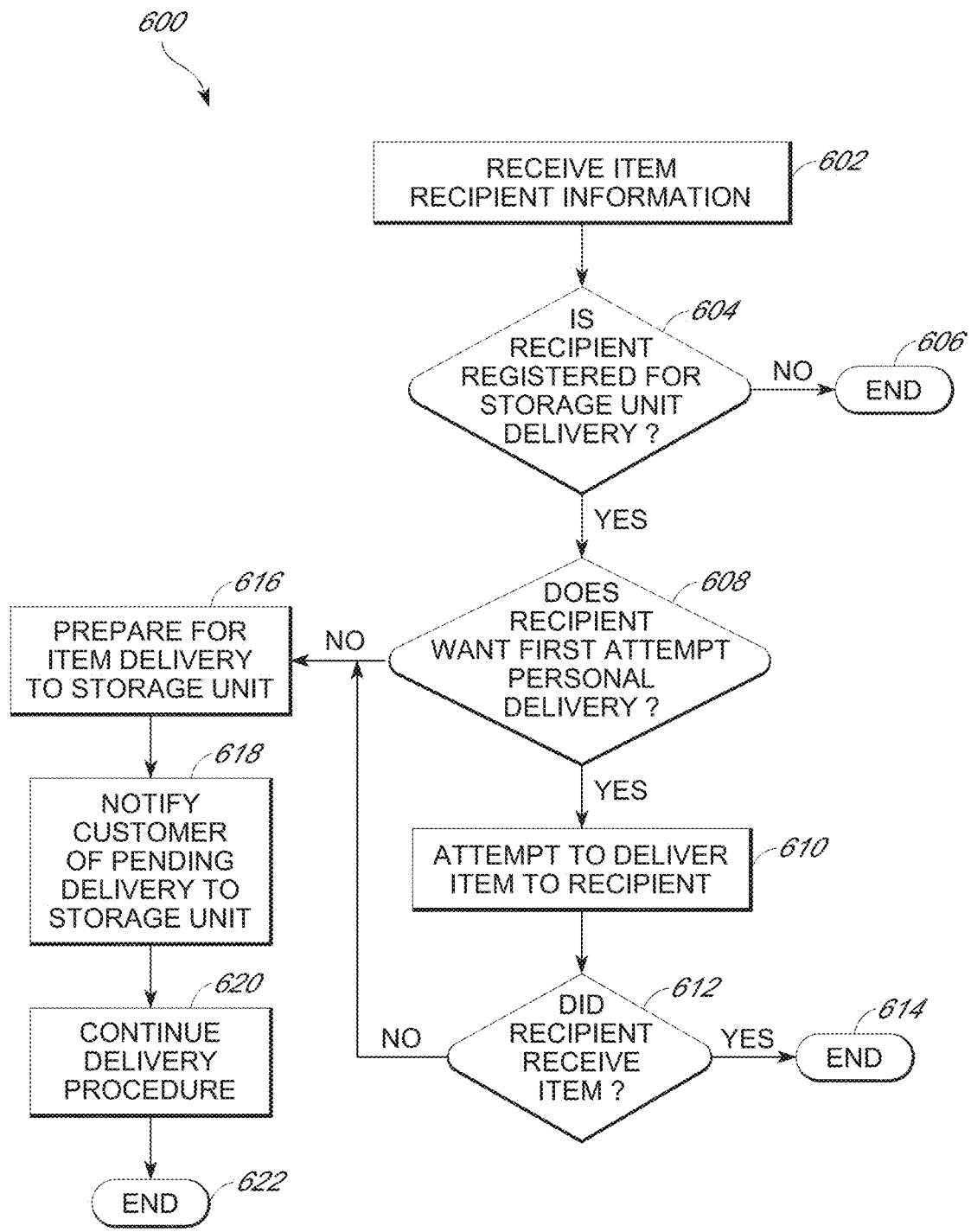
FIGS. 6-6A depict flow charts of different embodiments of a method of item delivery utilizing a storage unit system.

In some embodiments, the use of a storage unit system may affect methods of delivery an item. In some embodiments, the method of delivery is tailored to a customer preference. FIG. 6 depicts one exemplary process 600 for matching delivery to a customer's preference. The process 600 begins at block 602 and receives item recipient information. This information may include item information, recipient identification, recipient delivery preferences, recipient physical address, recipient storage unit address, and any other recipient information. The information may be provided by the user who deposits the item, or by a vendor or merchant who requests that an item be delivered via the storage unit system 400. The process then moves to decision state 604 and determines if the recipient is registered for storage unit delivery. If the recipient is not registered for storage unit delivery, the process is terminated at block 606.

If the recipient is registered for storage unit delivery, the process moves to decision state 608 and determines if the recipient has requested first attempt personal delivery. First attempt personal delivery occurs when the agent delivering the item makes a first attempt to deliver the item to the physical address or other specified location associated with the recipient. If the recipient wants first attempt personal delivery, then the process moves to block 610 and the agent attempts to deliver the item to the recipient. The process then moves to decision state 612 and determines if the recipient received the item by accessing pick-up confirmation information of control unit 144 or central server 430. If the recipient received the item, then the process terminates at block 614.

If the recipient did not receive the item, or if the recipient has noted that they do not desire first attempt personal delivery, then the process moves to block 616 and prepares for item delivery to a storage unit 402. In some embodiments, this may include placing a unique identification feature on the item, scanning the identification feature to enter the item into the system, entering the recipient information into the system so as to associate the recipient information with the item, and any other steps. In some embodiments, this information relating to the item identification and the recipient information is stored in the database 414 of the central management system 404.

The process then proceeds to block 618 and the customer is notified of the pending delivery to the storage unit 402. As mentioned above, this notification may be provided electronically, by telephone, or by writing. The process then proceeds to block 620 and the delivery procedure continues as outlined throughout this specification. After completion of the delivery procedure, the process terminates as depicted at block 622.

Figure 6A:
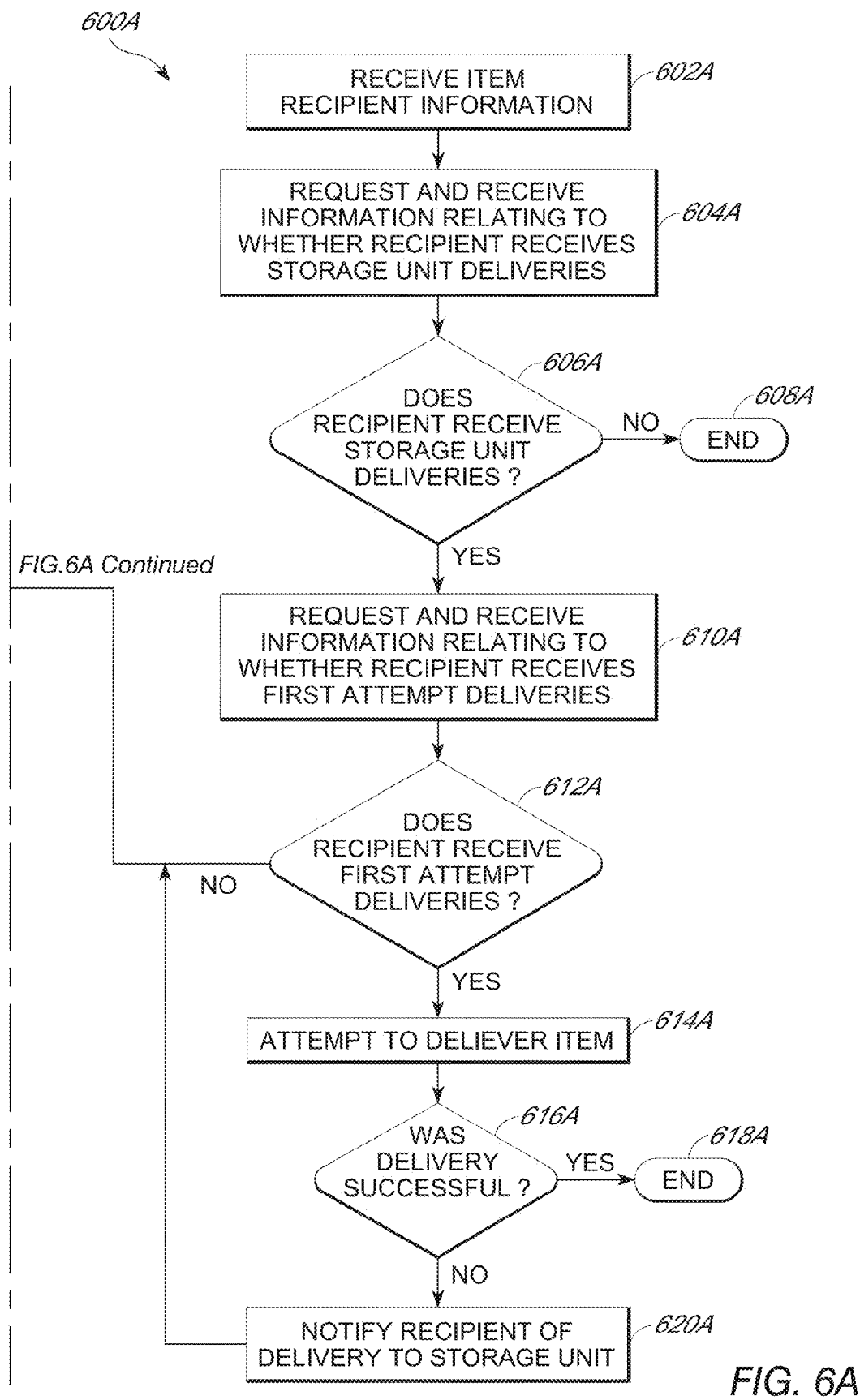
Figure 6A:
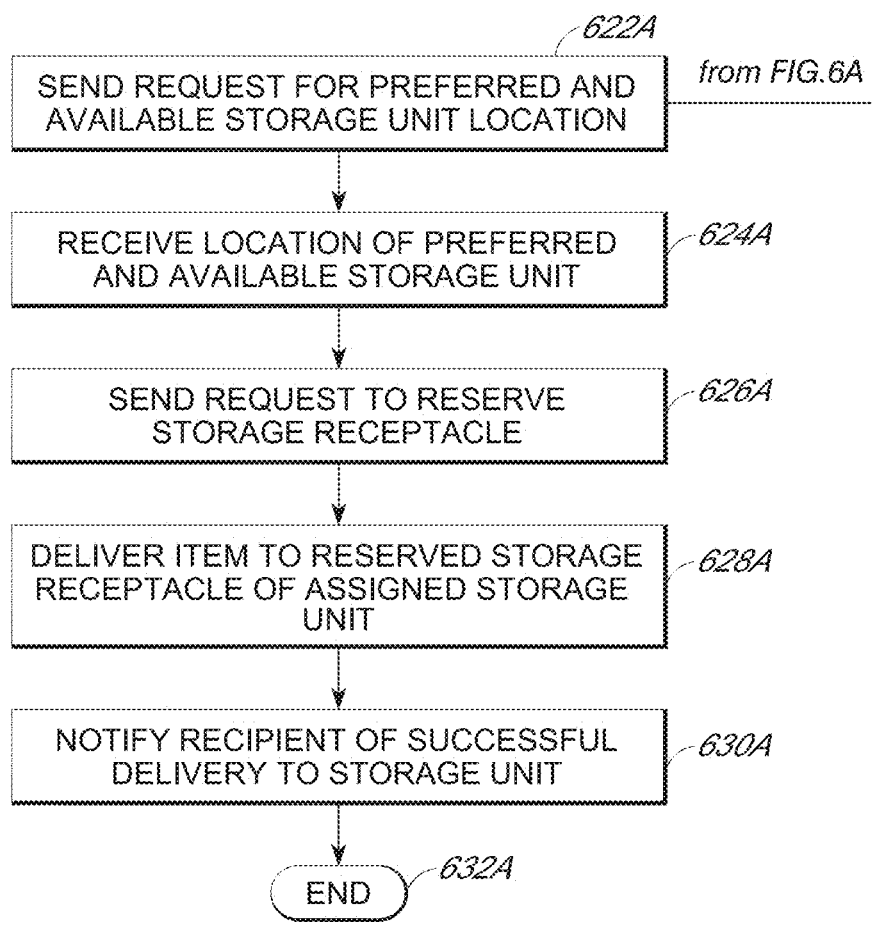

FIG. 6A depicts one embodiment of a process 600A used by an agent in delivering an item. The process 600A may be performed by the agent with a device configured to network communication such as, for example, a computer, a Smartphone, a tablet, a handheld device with network access, a wireless device with network access, or any other device with network communication capability. The process 600A begins at block 602A when item recipient information is received. The process 600A continues to block 604A and requests and receives information relating to whether the recipient receives storage unit deliveries.

The process 600A continues at decision state 606A and determines if the recipient receives storage unit deliveries. If the recipient does not receive storage unit deliveries, the process 600A terminates at block 608A. If the recipient receives storage unit deliveries, the process 600A continues at block 610A and requests and receives information relating to whether the recipient receives first attempt deliveries.

The process 600A continues to decision state 612A and determines if the recipient receives first attempt deliveries. If the recipient receives first attempt deliveries, the process 600A continues to block 614A when delivery of the item is attempted. At decision state 616A, the process 600A determines if the delivery of the item was successful based on delivery status provided by an agent 432. If the delivery was successful, the process 600A terminates at block 618A. If the delivery attempt was unsuccessful, then the process 600A moves to block 620A and the recipient is notified of the pending delivery to the storage unit 402.

After notifying the recipient of the pending delivery to the storage unit 402, or if the recipient does not receive first attempt deliveries, the process 600A continues to block 622A and sends a request for the location of the preferred and available storage unit 402. At block 624A, the process 600A receives information relating to the location of the preferred and available storage unit 402. The process 600A continues to block 626A and sends a request to reserve an available storage receptacle 132.

Figure 7:
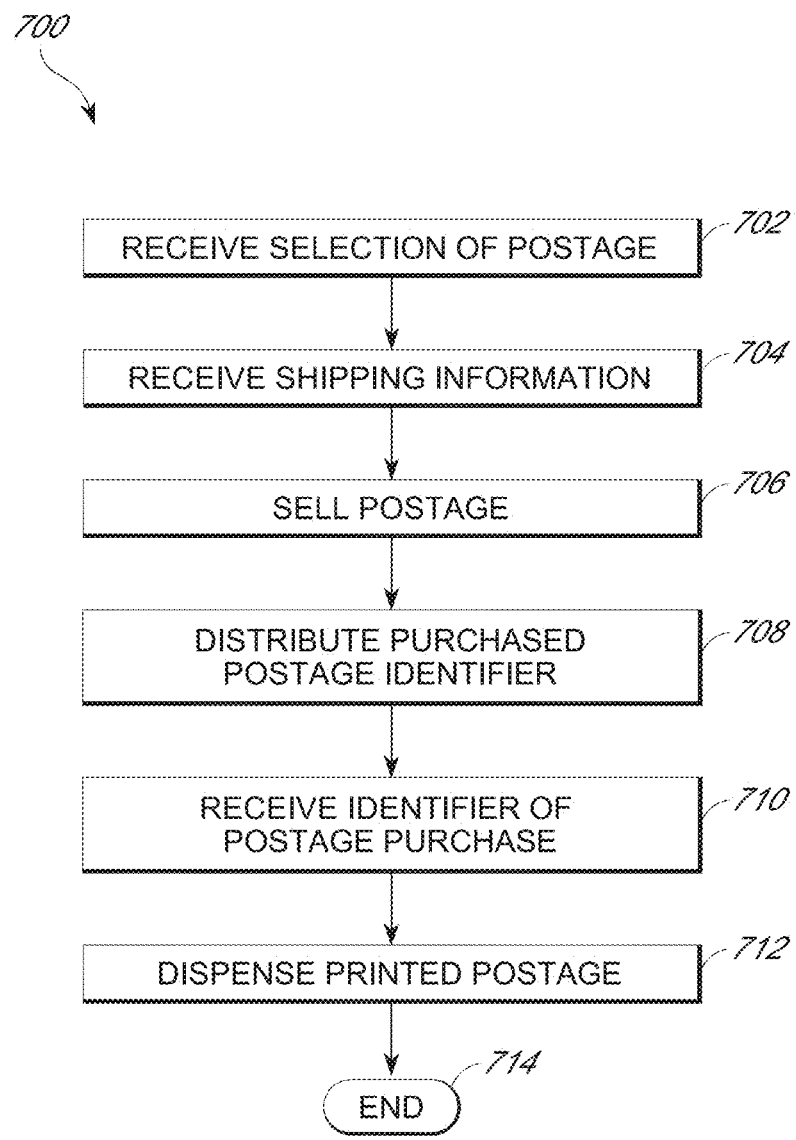
FIG. 7 depicts a flow chart of one embodiment of a method of registering for use of storage unit system.

The process 600A continues at block 628A where the item is delivered to the reserved storage receptacle 132 at the designated storage unit 402. At block 630A, the recipient is notified of the successful delivery of the item to the storage unit 402 and provided information relating to picking-up of the item from the storage unit 402. In some embodiments, this information may include a time frame in which pick-up is required, item identification information, any other information required to retrieve the item, and/or any other desired information. The process 600A then terminates at block 632A In some embodiments, the storage unit is configured for the sale of postage to facilitate customer deposit of items for delivery. In some embodiments, the storage unit 402 may be configured to receive indicia of a purchase of postage and to dispense postage to facilitate customer deposit of items for delivery. Some embodiments relate to a system in which the purchase of postage is remote from the storage unit 402, such as, for example over the internet, and postage is dispensed at the postage in response to inputting an identifier of the postage purchase to the storage unit 402. FIG. 7 depicts one embodiment of a process 700 that may be used in purchasing and obtaining postage. The process 700 begins at block 702 with the receipt of the selection of postage for purchase. This selection may comprise the designation of the item size and the desired time frame for delivery, the selection of postage of a specific value, or any other designation of postage type. The process 700 continues at block 704 and receives shipping information. This information may include, for example, the recipient name, the recipient address, the mailer name, the mailer address, and any other information required for transport of the item.

The process 700 continues at block 706 with the selling of the postage. This step may require payment processes, such as providing electronic payment information such as credit card or bank card number, payment of cash, or any other payment process. The process 700 continues at block 708 with the distribution of a purchased postage identifier. In some embodiments, the purchased postage identifier may comprise a unique identifier that identifies the specific transaction, the type of postage purchased, and, in some embodiments, other shipping details. In some embodiments, the identifier may comprise a text string, or a computer readable code such as, for example, a bar code, including linear barcodes, 2D barcodes, or any other barcode. In some embodiments, the identifier is printable, transmitted, such as, by email.

The process 700 continues at block 710 when the system receives the identifier of the postage purchase at a location capable of printing the postage. In some embodiments, this location is at, for example, a storage unit. In some embodiments, the identifier is entered into the postage printing components, for example, into the storage unit. In some embodiments, the identifier is manually entered into the storage unit 402. In some embodiments in which the identifier comprises a computer readable code, the identifier is scanned into the storage unit 402 via the scanner 150.

In response to receipt of the identifier of the postage purchase, the postage printing component may dispense the printed postage. In embodiments in which the storage unit 402 is the postage printing component, the printer 152 of the storage unit may print the postage. After printing the postage, the process may terminate at block 714.

In some embodiments, the method of FIG. 7 is used to make other payments associated with an item, such as, for example, payment of customs, payment of taxes, post office box payments, or any other payments. As shown above, these payments may be made at a location separate from the storage unit 402 and the storage unit 402 is used to print labeling indicative of the completion of these payments.

Further Uses

In some embodiments, the storage unit 402 and/or storage unit system 400 is used to facilitate new types of deliveries. In one embodiment, for example, a customer storage unit address is used to facilitate anonymous delivery of items. As the customer storage unit address does not identify the customer or their physical address, the customer storage unit address may allow delivery of items to a customer without disclosing the identity of the customer to the originator of the item. This anonymity may facilitate customer safety and privacy in all transactions, and may be particularly beneficial in electronic transactions, or transaction of sensitive items.

In some embodiments, a storage unit 402 may be used as an unmanned sales merchant office. In one such embodiment, a storage unit 402 may be wholly or partly assigned for use to a merchant, and items ordered from the merchant are delivered to the storage unit 402. In some embodiments, these deliveries are available to registered users of the storage unit. In other embodiments, these deliveries are available to unregistered recipients of the storage unit 402. In embodiments in which a recipient is unregistered, a unique identifier is be used to identify the recipient to allow the recipient to pick-up the delivered item. In some embodiments, a government issued identification is be used as the unique identifier. In other embodiments, the merchant provides a unique identifier, such as a transaction number, a code, a password, a computer readable identifier, or any other unique identifier to the item recipient. Upon inputting of the unique identifier, the storage unit 402 allows the recipient to access their item.

In another embodiment, the storage unit 402 is be used in connection with day- and/or time-specific deliveries. In such an embodiment, the storage unit includes instruction not to allow access to the contents of storage receptacles containing the items for day- and/or time-specific delivery until the designated day and/or time has passed. Delivery capability may beneficially facilitate sales and deliveries of items having a particular release date, such as the release date of a product, including, for example, a book, a video, a device, a toy, or any other item.

In one embodiment, the storage unit system 400 is configured to enable proactive inventory management at the storage unit 402 and/or to enable customers to determine availability of storage receptacles at the delivery location before sending an item. Advantageously, such inventory management increases efficiency of operations.

In one embodiment, the storage unit system 400 is configured to provide a vendor, business entity, or other entity the ability to reserve a particular storage receptacle 132 on a one-time basis or on a subscription basis.

In one embodiment, a portion or all of the storage receptacles 132 at a given storage unit 402 may be assigned to a specific customer. In this embodiment, a customer may be assigned a specific storage receptacle 132, and only items for that customer are delivered to that receptacle 132.

Those of skill will recognize that the various illustrative logical blocks, modules, circuits, and algorithm steps described in connection with the embodiments disclosed herein may be implemented as electronic hardware, software stored on a computer readable medium and executable by a processor, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The logical blocks, modules and flow chart sequences are illustrative only. A person of skill in the art will understand that the steps, decisions, and processes embodied in the flowcharts described herein may be performed in an order other than that described herein. Thus, the particular flowcharts and descriptions are not intended to limit the associated processes to being performed in the specific order described.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor reads information from, and write information to, the storage medium. In the alternative, the storage medium may be integral to the processor. The processor and the storage medium may reside in an ASIC.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

A person skilled in the art will recognize that each of these sub-systems may be inter-connected and controllably connected using a variety of techniques and hardware and that the present disclosure is not limited to any specific method of connection or connection hardware.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, microprocessor-based systems, a microcontroller or microcontroller based system, programmable consumer electronics, network PCs, minicomputers, mainframe computers, distributed computing environments that include any of the above systems or devices, and the like.

As used herein, instructions refer to computer-implemented steps for processing information in the system. Instructions may be implemented in software, firmware or hardware and include any type of programmed step undertaken by components of the system.

A microprocessor may be any conventional general purpose single- or multi-chip microprocessor such as a Pentium® processor, a Pentium® Pro processor, a 8051 processor, a MIPS® processor, a Power PC® processor, or an Alpha® processor. In addition, the microprocessor may be any conventional special purpose microprocessor such as a digital signal processor or a graphics processor. The microprocessor typically has conventional address lines, conventional data lines, and one or more conventional control lines.

The system may be used in connection with various operating systems such as Linux®, UNIX® or Microsoft Windows®.

The system control may be written in any conventional programming language such as C, C++, BASIC, Pascal, .NET (e.g., C#), or Java, and ran under a conventional operating system. C, C++, BASIC, Pascal, Java, and FORTRAN are industry standard programming languages for which many commercial compilers may be used to create executable code. The system control may also be written using interpreted languages such as Perl, Python or Ruby. Other languages may also be used such as PHP, JavaScript, and the like.

The foregoing description details certain embodiments of the systems, devices, and methods disclosed herein. It will be appreciated, however, that no matter how detailed the foregoing appears in text, the systems, devices, and methods may be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment may be included with other depicted embodiments in any combination. For example, any of the various components described herein and/or depicted in the Figures may be combined, interchanged or excluded from other embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations.

However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A system for distribution of an item, the system comprising:
    a plurality of storage units each comprising a plurality of receptacles;
    a first control unit associated with a first of the plurality of storage units, the first control unit configured to track availability status of each of the plurality of receptacles of the first storage unit, and to selectively allow access to at least one of the plurality of receptacles of the first storage unit;
    a user directory, the user directory including user provided delivery preferences, wherein the delivery preferences include a preference for a first attempt personal delivery, and a plurality of preferred delivery storage units including the first storage unit with identification of an order of preference of the preferred storage units; and
    a system control unit configured to communicatingly interact with the first control unit and with the user directory, wherein the system control unit receives information relating to the availability of the receptacles of the first control unit and directs transfer of items to the first of the plurality of storage units based on the availability of the receptacles;
    wherein the system control unit is further configured to determine whether delivery preferences for an intended recipient of the item are present in the user directory, and whether a first attempt personal delivery has been attempted, and to direct transfer of the one of the items to the first storage unit based on the order of preference of the preferred storage unit and the availability of a receptacle in the first storage unit; and
    wherein the system control unit is further configured to receive notification from the first control unit identifying the storage unit containing the item, and to provide the notification to the intended recipient of the item.

2. The system of claim 1, further comprising a first database at the system control unit.

3. The system of claim 2, wherein the first control unit is configured to transmit the availability status of at least one of the plurality of receptacles of the first storage unit to the system control unit.

4. The system of claim 3, wherein the first database comprises information relating to the availability of the plurality of receptacles of the first storage unit.

5. The system of claim 1, wherein the notification further comprises an identification of the receptacle which contains the item at the first storage unit.

6. A method of controlling a system for distribution of an item, the system including a plurality of storage units each comprising at least two receptacles and a local control unit, a system control unit, and a user directory, the method comprising:
    determining, in a processor of a first local control unit, the availability status of at least one of the at least two receptacles in a first of the plurality of storage units;
    transmitting a message to the system control unit, wherein the message includes the availability status of the at least one of the at least two receptacles in the first storage unit;
    determining, in the system control unit, whether recipient provided delivery preferences for an intended recipient of the item are stored in the user directory, the delivery preferences including: a preference for a first attempt personal delivery, and a plurality of preferred delivery storage units with identification of an order of preference of the preferred storage units;

determining in the system control unit whether a first attempt personal delivery for the item has occurred;

directing transfer of the item to the first storage unit if the first attempt personal delivery was unsuccessful and based on the order of preference and availability of a receptacle in the first storage unit; and notifying the intended recipient of the item that the item is in the first storage unit.

7. The method of claim 6, further comprising receiving, in the first control unit, recipient identification information.

8. The method of claim 7, further comprising allowing access to the first storage unit if the recipient identification information identifies a registered recipient.

9. A system for distribution of an item, the system including at least two receptacles and a user directory, the system comprising:
  means for determining the availability status of at least one of the at least two receptacles in a first of the plurality of storage units;
  means for transmitting a message, wherein the message includes the availability status of the at least one of the at least two receptacles in the first storage unit;
  means for determining whether recipient provided delivery preferences for an intended recipient of the item are stored in the user directory, the delivery preferences including a preference for a first attempt personal delivery, a plurality of preferred delivery storage units with identification of an order of preference of the preferred storage units and a default storage unit, and determining whether a first attempt personal delivery for the item has occurred;
  means for directing transfer of the item to the first storage unit if the first attempt personal delivery was unsuccessful and based on the order of preference and availability of a receptacle in the first storage unit; and
  means for notifying an intended recipient of the item identifying the first storage unit that contains the item.

10. A system for distribution of an item, the system comprising:
  a plurality of storage units, each comprising a receptacle;
  a control unit configured to selectively allow access to a receptacle of a first one of the plurality of storage units;
  a recipient directory, the recipient directory including recipient provided delivery preferences wherein the delivery preferences include a first attempt personal delivery, and a plurality of preferred delivery storage units with identification of an order of preference of the preferred storage units;
  wherein the control unit is configured to determine whether a first attempt personal delivery has occurred, and to direct transfer of the item to the receptacle of the first of the plurality of storage units based on the order of preference and the availability of the receptacle in the first storage unit; and
  wherein the control unit is further configured to allow access to the receptacle of the first storage unit if the first attempt personal delivery was unsuccessful.

11. The system of claim 10, further comprising a first database at the control unit.

12. The system of claim 11, wherein the first database comprises information relating to the availability of the receptacles of the first storage unit.

13. The system of claim 10, wherein the control unit is further configured to allow deposit of the item into the receptacle of the first storage unit if the first attempt personal delivery was unsuccessful.

14. The system of claim 13 wherein the control unit is further configured to process a notification to the intended recipient that the item is in the receptacle.

15. A method for distribution of an item, the method comprising:
  storing, in a recipient directory in a memory device, recipient provided delivery preferences wherein the delivery preferences include a first attempt personal delivery, and a plurality of preferred delivery storage units with identification of an order of preference of the preferred storage units;
  determining, using a control unit, whether a first attempt personal delivery has occurred;
  directing, if the first attempt personal delivery was unsuccessful, transfer of the item to a receptacle of a first of the plurality of storage units, based on the order of preference and the availability of the receptacle in the first storage unit; and
  allowing, using the control unit, access to the receptacle of the first storage unit if the first attempt personal delivery was unsuccessful.

16. The method of claim 15, further comprising receiving, in the control unit, recipient identification information.

17. The method of claim 16, further comprising allowing access to the receptacle of the first storage unit if the recipient identification information identifies a registered recipient.

18. The method of claim 15 further comprising allowing, using the control unit, deposit of an item into the receptacle of the first storage unit if the first attempt personal delivery was unsuccessful.

19. The method of claim 18 further comprising providing a notification to the intended recipient that the item is in the receptacle.

* * * * *